United States Patent
Minato et al.

(10) Patent No.: US 10,543,449 B2
(45) Date of Patent: Jan. 28, 2020

(54) SILENCER, EXHAUST VALVE, VALVE DEVICE, AIR DRYER, COMPRESSED AIR SUPPLY DEVICE FOR VEHICLE, AND COMPRESSED AIR SUPPLY SYSTEM

(71) Applicant: NABTESCO AUTOMOTIVE CORPORATION, Tokyo (JP)

(72) Inventors: Ichiro Minato, Tokyo (JP); Takuya Sugio, Tokyo (JP); Hiroyuki Murakami, Tokyo (JP); Hiroki Hasebe, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 115 days.

(21) Appl. No.: 15/878,246

(22) Filed: Jan. 23, 2018

(65) Prior Publication Data
US 2018/0154301 A1    Jun. 7, 2018

Related U.S. Application Data

(60) Continuation of application No. 15/230,129, filed on Aug. 5, 2016, now Pat. No. 9,908,077, which is a
(Continued)

(30) Foreign Application Priority Data

Nov. 15, 2010  (JP) ................................. 2010-255240
Nov. 15, 2010  (JP) ................................. 2010-255286
(Continued)

(51) Int. Cl.
*B01D 53/26*    (2006.01)
*B01D 53/04*    (2006.01)
(Continued)

(52) U.S. Cl.
CPC ..... *B01D 53/0446* (2013.01); *B01D 53/0407* (2013.01); *B01D 53/047* (2013.01);
(Continued)

(58) Field of Classification Search
CPC  B01D 53/04; B01D 53/0407; B01D 53/0446; B01D 53/047; B01D 53/26;
(Continued)

(56) References Cited

U.S. PATENT DOCUMENTS 2,606,628 A    8/1950  Hasselwander
4,026,685 A    5/1977  Grix
(Continued)

FOREIGN PATENT DOCUMENTS

EP    0 132 696 A2    2/1985
FR    2707931 A1    1/1995
(Continued)

OTHER PUBLICATIONS

JP Office Action dated Jan. 28, 2015 as received in Application No. 2010-255292.
(Continued)

*Primary Examiner* — Frank M Lawrence, Jr.
(74) *Attorney, Agent, or Firm* — Maschoff Brennan

(57) ABSTRACT

An air dryer includes a supporting base, a drying agent container, and an outer cover. The supporting base includes an inlet for receiving compressed air to be subject to a drying process and an outlet for delivering the processed compressed air that has undergone the drying process. The drying agent container is a container supported on the supporting base, contains a drying agent in the interior, and enables the drying process to be performed by passing the compressed air from the inlet through the drying agent. The outer cover surrounds the outer side of the drying agent container on the supporting base and defines a chamber for
(Continued)

storing the compressed air between itself and the drying agent container. The supporting base includes first and second mounting surfaces, which are oriented in different directions, and a plurality of inlets, which are oriented in different directions and receive the compressed air.

12 Claims, 22 Drawing Sheets

Related U.S. Application Data division of application No. 14/666,132, filed on Mar. 23, 2015, now Pat. No. 9,649,588, which is a continuation of application No. 13/885,387, filed as application No. PCT/JP2011/076612 on Nov. 14, 2011, now Pat. No. 9,017,460.

(30) Foreign Application Priority Data

| Nov. 15, 2010 | (JP) | 2010-255288 |
|---|---|---|
| Nov. 15, 2010 | (JP) | 2010-255292 |
| Jan. 5, 2011 | (JP) | 2011-000681 |
| Feb. 10, 2011 | (JP) | 2011-027261 |
| May 27, 2011 | (JP) | 2011-119435 |

(51) Int. Cl.

| B60T 17/00 | (2006.01) |
|---|---|
| B01D 53/047 | (2006.01) |
| F01N 1/24 | (2006.01) |
| F01N 3/08 | (2006.01) |
| F16K 1/00 | (2006.01) |
| F16K 1/12 | (2006.01) |

(52) U.S. Cl.
CPC ........... *B01D 53/26* (2013.01); *B01D 53/261* (2013.01); *B60T 17/004* (2013.01); *B60T 17/008* (2013.01); *F01N 1/24* (2013.01); *F01N 3/0807* (2013.01); *F16K 1/00* (2013.01); *F16K 1/126* (2013.01); *B01D 2257/80* (2013.01); *B01D 2258/06* (2013.01); *B01D 2259/40003* (2013.01); *B01D 2259/4566* (2013.01)

(58) Field of Classification Search
CPC .............. B01D 53/261; B01D 2257/80; B01D 2258/06; B01D 2259/40003; B01D 2259/4566; B60T 17/004; B60T 17/008; F01N 1/24; F01N 3/0807; F16K 1/00; F16K 1/126
USPC ...... 96/108, 109, 111, 147; 34/80, 472, 473; 137/485, 488
See application file for complete search history.

(56) References Cited

U.S. PATENT DOCUMENTS

| 4,487,617 | A | 12/1984 | Dienes et al. |
|---|---|---|---|
| 4,544,385 | A | 10/1985 | Tanaka |
| 4,572,725 | A | 2/1986 | Kojima |
| 4,655,801 | A | 4/1987 | Kojima et al. |
| 4,673,419 | A | 6/1987 | Kojima |
| 4,755,196 | A | 7/1988 | Frania et al. |
| 5,002,593 | A | 3/1991 | Ichishita et al. |
| 5,027,529 | A * | 7/1991 | Cramer ................ B01D 53/261 |
| | | | 34/562 |
| 5,145,495 | A * | 9/1992 | Elamin ................ B60T 17/004 |
| | | | 96/114 |
| 5,286,282 | A | 2/1994 | Goodell et al. |
| 5,286,283 | A | 2/1994 | Goodell |
| 5,403,387 | A | 4/1995 | Flynn et al. |
| 5,458,677 | A | 10/1995 | VanderMolen |
| 5,522,150 | A | 6/1996 | Schultz |
| 5,884,895 | A | 3/1999 | Wolz et al. |
| 5,953,915 | A * | 9/1999 | Weller ................... B01D 53/26 |
| | | | 60/403 |
| 7,097,696 | B2 | 8/2006 | Salzman et al. |
| 7,100,305 | B2 | 9/2006 | Hoffman |
| 7,121,016 | B2 * | 10/2006 | Burn ...................... B01D 53/26 |
| | | | 34/330 |
| 9,671,796 | B2 | 6/2017 | Minato |
| 2002/0189456 | A1 | 12/2002 | Hoffman et al. |
| 2004/0083893 | A1 | 5/2004 | Larsson |
| 2004/0154187 | A1 | 8/2004 | Hoffman et al. |
| 2005/0066540 | A1 | 3/2005 | Hoffman et al. |
| 2009/0038476 | A1 | 2/2009 | Blackwood et al. |
| 2011/0132464 | A1 | 7/2011 | Ferlin |
| 2014/0013956 | A1 | 1/2014 | Ericson et al. |

FOREIGN PATENT DOCUMENTS

| JO | 2009-119426 A | 6/2009 |
|---|---|---|
| JP | S56-133015 A | 10/1981 |
| JP | S59-154325 U | 10/1984 |
| JP | S61-187226 U | 11/1986 |
| JP | S61-187227 U | 11/1986 |
| JP | S62-004424 U | 11/1986 |
| JP | H04-004933 U | 1/1992 |
| JP | 10-016899 A | 1/1998 |
| JP | H11-169643 A | 6/1999 |
| JP | H11512988 A | 11/1999 |
| JP | 2005-090284 A | 4/2005 |
| JP | 2007-023939 A | 2/2007 |
| JP | 2007-136403 A | 6/2007 |
| JP | 2007-315209 A | 12/2007 |
| JP | 2008-213764 A | 9/2008 |
| JP | 2009-299871 A | 12/2009 |
| JP | 2010-221179 A | 10/2010 |
| JP | 2011-525159 A | 9/2011 |
| WO | 99/30947 A | 6/1996 |
| WO | 98 12089 A | 3/1998 |
| WO | 2007/047484 A1 | 4/2007 |

OTHER PUBLICATIONS

JP Office Action dated Oct. 28, 2014 as received in Application No. 2011-000681.

JP Office Action dated Sep. 16, 2014 as received in Application No. 2011-119435.

\* cited by examiner (A)

(B)

(C)

(A)

(B)

(A)

(B)

PRIOR ART

PRIOR ART

SILENCER, EXHAUST VALVE, VALVE DEVICE, AIR DRYER, COMPRESSED AIR SUPPLY DEVICE FOR VEHICLE, AND COMPRESSED AIR SUPPLY SYSTEM

CROSS-REFERENCE TO RELATED APPLICATIONS

This application is a continuation of U.S. application Ser. No. 15/230,129, filed Aug. 5, 2016, which is a divisional of U.S. application Ser. No. 14/666,132 filed Mar. 23, 2015, which is a continuation of U.S. application Ser. No. 13/885, 387, which is the U.S. national stage of International Application No. PCT/JP2011/076612, filed Nov. 14, 2011, which claims priority to Japan Applications No. 2010-255240 filed on Nov. 15, 2010; 2010-255286 filed on Nov. 15, 2010; 2010-255288 filed on Nov. 15, 2010; 2010-255292 filed on Nov. 15, 2015; 2011-000681 filed on Jan. 5, 2011; 2011-027261 filed on Feb. 10, 2011; and 2011-119435 and May 27, 2011. The foregoing patent applications are incorporated herein by reference

FIELD OF THE INVENTION

The present invention relates to an air dryer for performing a drying process on compressed air to be used as a drive source for pneumatic equipment. The present invention also relates to a silencer that reduces air exhaust noise from an exhaust valve in an air dryer performing a drying process on compressed air and to an air dryer that includes the silencer. The present invention further relates to an exhaust valve that discharges drain and air generated from a drying process in an air dryer performing the drying process on compressed air and to an air dryer that includes the exhaust valve. The present invention also relates to a regeneration valve device for an air dryer that has an air feeding time adjusting function and to an air dryer that includes the regeneration valve device. The present invention further relates to a compressed air supply device for a vehicle that supplies compressed air to an air brake device, air suspension device, and the like, installed in a vehicle. In particular, the present invention relates to a valve device that has an air feeding time adjusting function and to an air dryer that includes the valve device. The present invention also relates to a compressed air supply system that supplies compressed air. In the present description, "valve device" refers to a device with a configuration where switching between opening and closing of a valve is performed by moving a piston, arranged inside an enclosed chamber or inside a chamber that is an enclosed chamber, by changing a pressure of a fluid in a space at least at one side with reference to the piston. Also, "air dryer" refers to a device that removes moisture, oil, and the like, from a gas containing the moisture, oil, and the like, to dry the gas.

BACKGROUND OF THE INVENTION

Generally, in a large vehicle, such as a truck or bus, a pneumatic brake device using compressed air as a working fluid for actuating brake chambers is adopted. This type of brake device has a configuration where compressed air discharged from an air compressor is stored in an air tank and the compressed air in the air tank is supplied as necessary to each brake chamber. An air dryer for adsorbing moisture from the compressed air to perform a drying process is located between the air compressor and the air tank.

Conventionally, as this type of air dryer, a configuration has been proposed that includes a supporting base including an inlet receiving compressed air to be subject to the drying process and an outlet delivering processed compressed air that has undergone the drying process, a drying agent container, which is supported on the supporting base, contains a drying agent in the interior, and enables the drying process to be performed by passing the compressed air from the inlet through the drying agent, and an outer cover, which surrounds the outer side of the drying agent container on the supporting base and defines a chamber storing the compressed air between itself and the drying agent container (see, for example, Patent Document 1).

For example, an air dryer has been known that removes moisture and oil in compressed air delivered from an air compressor in a brake device for large automobile. This air dryer includes, in addition to an air intake inlet for taking in the compressed air (compressed air before removal of moisture and oil) from the air compressor and a processed air delivery outlet for delivering dried air that has undergone the moisture and oil removal process, a drain valve for discharging drain, containing the removed moisture, oil, and the like, together with air (see, for example, Patent Documents 1 and 3). In the present description, this drain valve will be referred to as an "exhaust valve" from the standpoint of discharging air.

With this exhaust valve, a loud air discharge noise (explosive noise) is generated when the valve is opened and therefore to reduce this noise, a silencer, such as described in Patent Document 2, is connected to the exhaust valve in some cases.

Conventionally, as described in Patent Document 4, a drying device (air dryer) has been known that is used in an air brake device of a vehicle to remove moisture in compressed air. The drying device includes a drying container filled with a regenerable drying agent and a regeneration tank storing dry compressed air from which moisture has been adsorbed by the drying agent. The device is configured such that the compressed air delivered from an air compressing device is dried by the drying agent in the drying container and stored in an air tank of the air brake device. In this process, some of the dry compressed air is stored in the regeneration tank inside the drying device. It is configured that the dry compressed air in the regeneration tank flows in reverse to enable regeneration of the drying agent inside the drying container.

Also conventionally, in a large vehicle, such as a truck or bus, a pneumatic type brake device or suspension device using compressed air as the working fluid is adopted, and a compressed air supply device for a vehicle that supplies compressed air to these respective devices is installed. The compressed air supply device for a vehicle includes an air compressor discharging the compressed air, an air dryer removing moisture and other foreign matter from the compressed air discharged from the air compressor, and an air tank storing the compressed air passed through the air dryer and supplies the compressed air in the air tank as necessary to the brake device and the suspension device.

As this type of compressed air supply device for a vehicle, a device is known one that includes a pressure governor located in an unloading pipe between the air compressor and the air tank. The pressure governor switches the operation of the air compressor to loading or unloading so that an air pressure inside the air tank is within a predetermined range. When the air compressor is unloaded, opens an exhaust valve of the air dryer to regenerate the drying agent inside the air dryer (see, for example, Patent Document 5).

Further conventionally, as described in Patent Document 4, the drying device (air dryer) has been known that is used in an air brake device of a vehicle to remove moisture in compressed air. The drying device includes the drying container filled with the regenerable drying agent and the regeneration tank storing the dry compressed air from which moisture has been adsorbed by the drying agent. The device is configured such that the compressed air delivered from the air compressing device is dried by the drying agent in the drying container and stored in the air tank of the air brake device. In this process, some of the dry compressed air is stored in the regeneration tank inside the drying device. It is configured that the dry compressed air in the regeneration tank flows in reverse to enable regeneration of the drying agent inside the drying container.

PRIOR ART DOCUMENT

Patent Document

Patent Document 1: Japanese Laid-Open Patent Publication No. 2007-136403
Patent Document 2: Japanese Laid-Open Patent Publication No. 2007-315209
Patent Document 3: Japanese Laid-Open Patent Publication No. 2009-119426
Patent Document 4: Japanese Patent No. 3167251
Patent Document 5: Japanese Laid-Open Patent Publication No. 2008-213764

SUMMARY OF THE INVENTION

Problems that the Invention is to Solve

Generally, this type of air dryer is mounted in a narrow space of a vehicle. In many cases, this space differs according to the vehicle model in which the air dryer is to be mounted. Therefore, with the conventional air dryer, for each vehicle in which the air dryer is to be mounted, a process of designing positions of a mounting portion and an inlet for compressed air in accordance with a mounting position in the vehicle and forming the mounting portion and the inlet on a supporting base is performed. The air dryer thus has problems of being poor in versatility and also being poor in productivity.

Accordingly, it is a first object (problem) of the present embodiment to provide an air dryer that is improved in versatility and productivity by enabling mounting on diverse mounting positions to be performed with the same configuration.

Also, although as described in Patent Document 2, the conventional silencer has a configuration where the air discharged from the exhaust valve is discharged through a filter member (noise absorbing material) so that a predetermined noise absorbing effect is obtained, the silencing effect is not necessarily sufficient. Also, the silencer is configured to be connected as an independent member to the exhaust valve and there is thus the disadvantage that a large occupied volume is required.

Accordingly, it is a second object (problem) of the present invention to provide a better silencing effect in a silencer provided in an air dryer that performs a drying process on compressed air and further to provide a silencer that does not require the ensuring of a large occupied volume.

To clarify a third problem (object) to be resolved by the present invention, a configuration of an exhaust valve according to a conventional art will now be described in detail with reference to FIG. 30. FIG. 30 is a cross-sectional view of the exhaust valve according to the conventional art.

In FIG. 30, reference numeral 350 denotes an air dryer that includes the exhaust valve according to the conventional art. The air dryer 350 includes, at an upper portion of a base member 352 that is its base, a drying portion 353. Compressed air discharged from a non-illustrated air compressor is taken into the interior of the air dryer 350 from an air intake port (non-illustrated) formed in the base member 352.

The compressed air taken into the interior of the air dryer 350, from which moisture and oil are removed in the drying portion 353, is output from an output port (non-illustrated) formed in the base member 352, stored in an external air tank, and the like, and used as necessary to drive an air driven device, such as an air brake, and the like. The configuration of the drying portion 353 is not required for explaining the problem of the present invention and therefore illustration and description of the detailed configuration of the interior of the drying portion 353 will be omitted.

Some of the compressed air from which moisture and oil have been removed in the air dryer 350 is also supplied to a pressure governor (non-illustrated) incorporated in the air dryer 350. The non-illustrated pressure governor outputs a control command pressure for opening the exhaust valve 356, which is located at a lower portion of the air dryer 350, when the dry-processed air delivered from the air dryer 350 reaches a predetermined upper limit pressure. In FIG. 30, reference numeral 55 denotes a control chamber to which the control command pressure is output.

When the exhaust valve 356 is opened, a state is attained where the compressed air supplied from the air compressor (non-illustrated) is discharged from the exhaust valve 356, that is, the supply of compressed air into the drying portion 353 is stopped. In this state, the air inside the drying portion 353 flows in a direction reverse to that during the drying process due to a pressure reduction action and an oil filter (non-illustrated) inside the drying portion 353 is thereby cleaned and the moisture and oil accumulated in the exhaust valve 356 are discharged to the exterior together with the air. Also in this state, the dry-processed air inside the drying portion 353 is discharged to the exterior while taking away moisture from a drying agent (non-illustrated) inside the drying portion 353 and the drying agent is thereby regenerated. Reference numeral 369 denotes a silencer that reduces an explosive noise that is generated in accompaniment with the rapid discharge of air.

When the control command pressure delivered from the non-illustrated pressure governor decreases and the pressure inside the control chamber 355 decreases, the exhaust valve 356 closes, and the compressed air is supplied into the drying portion 353, thereby returning to the compressed air drying process state in the drying portion 353.

With the conventional exhaust valve 356, a vertically moving valve body 57 is formed by a piston 358, a valve element (seal) 360, a base 361, a bolt 362, and an O-ring 359. In the present description, the assembly of components that moves vertically in the exhaust valve formed by the piston 358, valve element (seal) 360, base 361, bolt 362, and O-ring 359 (in the case of the conventional art) will be referred to as the "valve body."

The piston 358 is formed of a metal material to take on a T-like shape and is formed by a piston upper portion 358a of large diameter and a piston lower portion 358b of small diameter.

The valve element 360 is formed integral to the base 361 by mold forming and is coupled to the piston 358 by the bolt 362 to arrange the valve body 357. The valve element (seal) 360 is formed of an elastic material and the base 361 is formed of a metal material.

Reference numeral 363 denotes a valve seat and the exhaust valve 356 is configured to open and close by the valve element 360 moving into contact with and away from the valve seat 363 in accordance with the vertical movement of the valve body 357. The valve seat 363 is formed by an opening formed in a valve base 364, and the valve base 364 is housed in an opening 352a formed in the base member 352 and is fixed by a C-ring, denoted by reference numeral 367, so as not to fall off in the lower direction. Reference numeral 366 denotes an O-ring that exhibits a sealing function.

Also, reference numeral 365 denotes a return spring that urges the piston 358 in the upper direction (valve closing direction).

Some of the compressed air, supplied from the air compressor in a loaded state, is supplied to a pressure chamber 354 to generate a predetermined pressure, and this pressure is applied to both the piston upper portion 358a and the valve element (seal) 360. That is, an upward pressing force is applied to the piston upper portion 358a and a downward pressing force is applied to the valve element 360.

However, when the air compressor is in the loaded state, the exhaust valve 356 must be maintained in a valve closed state, that is, when the air compressor is in the loaded state, the force pressing the valve body 357 in the valve closing direction must be dominant. A pressure receiving area of the piston upper portion 358a must thus be formed to be greater than a pressure receiving area of the valve element (seal) 360, and the piston 358 thus has the T-like shape with which the diameter of the upper portion is large as illustrated. The exhaust valve 356 is thereby made capable of maintaining the closed valve state without fail when the air compressor is in the loaded state.

However, on the other hand, the need to increase the pressure receiving area of the piston upper portion 358a makes it necessary to enlarge the opening 352a (formed in the base member 352) for housing the component parts of the exhaust valve 356, and the need to reduce the pressure receiving area of the valve element (seal) 360 makes it necessary to arrange the valve base 364 as a separate member and to form the valve seat 363 thereat.

By the above reasons, with the conventional exhaust valve 356, the valve base 364 is made large because of the opening 352a must be made large and this causes increase of cost. In addition, a predetermined strength must be ensured at the C-ring 367 for fixing the valve base 364 because a high pressure is applied to the valve base 364 when the air compressor is in the loaded state, and this causes further increase of cost.

Also, the piston 358 has the T-like shape with the upper portion of large diameter due to the above reasons and therefore, due to reasons of assembly, the valve body 357, which moves vertically, cannot be made an integral configuration. In particular, the piston 358 and the base 361 cannot be formed integrally and the valve body 57 thus has to be formed by the numerous separate members of the piston 358, valve element 360, base 361, and bolt 362 as described above.

The present invention has been made in view of such circumstances and a third object (problem) thereof is to achieve simplification of structure and low cost in an exhaust valve provided in an air dryer that performs a drying process on compressed air supplied from an air compressor.

Although using the air tank outside the drying device and not providing the regeneration tank inside the drying device may be considered, the dry compressed air inside air tank will continue to flow in reverse if the regeneration tank is simply eliminated.

There is thus a need to make only the necessary amount of dry compressed air for regenerating the drying agent flow in reverse, and a valve device that includes an air feeding time adjusting function for restricting the amount flowing in reverse may be considered.

FIGS. 31(A) and 31(B) are cross-sectional views illustrating problems of a valve device that includes an air feeding time adjusting function that the applicant is considering. Of these, FIG. 31(A) is a diagram showing a manner in which a valve (544, 549) is switched from a closed state to an open state. On the other hand, FIG. 31(B) is a diagram showing a manner in which the valve (544, 549) is switched from the open state to the closed state.

As shown in FIG. 31(A), the valve device 540 includes a chamber (volume chamber) 543, a piston 541, a valve element 544, a valve seat portion 549, and a compression coil spring 545. Of these, the chamber (volume chamber) 543 is configured such that the pressure of air acts on it. Also, the piston 541 is configured to slide in the interior of the chamber (volume chamber) in the axial direction of the piston 541. Specifically, an O-ring 546 is mounted on the outer periphery of the piston 541 and the O-ring 546 is configured to be in contact with the inner surface of the chamber (volume chamber) 543.

Yet further, the valve element 544 is located at a first end (lower side in the drawing) of the piston 541 so as to be integrally movable with the piston 541. By the valve element 544 contacting the valve seat portion 549 located at an opening at the first end of the chamber (volume chamber) 543, the valve (544, 549) is put in the closed state. On the other hand, the valve (544, 549) is configured to be put in the open state by the valve element 544 separating from the valve seat portion 549. Also, the compression coil spring 545 is located at a second end (upper side in the drawing) in the movement direction of the piston 541 in the chamber (volume chamber) 543 and is configured to urge the piston 541 toward the first end (lower side in the drawing). The valve (544, 549) is thus in a closed state in the normal state in which the pressure of air is not acting on the interior of the chamber (volume chamber) 543.

Also, for adjusting the air feeding time, the piston 541 has a hole portion 542 of comparatively small diameter formed therein for controlling the time from the point at which the valve (544, 549) is opened and air begins to flow in reverse to the point at which the valve is closed. The hole portion 542 is configured such that the air can be made to flow from one side to another side in accordance with the difference between the pressure of the air at the first end (lower side in the drawing) inside the chamber (volume chamber) with reference to the piston 541 and the pressure of the air at the second end (upper side in the drawing). As the configuration of an air feeding time adjusting means, the time from the point at which the valve (544, 549) is opened and the air begins to flow in reverse to the point at which the valve is closed is determined by the opening diameter of the hole portion 542.

Yet further, the valve seat portion 549 at the first end (lower side in the drawing) of the chamber (volume chamber) 543 is connected to a first flow passage 547. The first flow passage 547 is also connected to the air tank. On the other hand, the second end (upper side in the drawing) of the chamber (volume chamber) 543 is connected to a second flow passage 548. The second flow passage 548 is also connected to a drying container (non-illustrated) and is further connected via the drying container to an exhaust valve (non-illustrated) and a compressor (non-illustrated).

The compressed air is delivered from the second flow passage 548 into the second end (upper side in the drawing) of the chamber (volume chamber) 543 with reference to the piston 541. The pressure of the air at the second end (upper side in the drawing) of the chamber (volume chamber) 543 with reference to the piston 541 then becomes greater than the pressure of the air at the first end (lower side in the drawing). The air at the second end (upper side in the drawing) of the chamber (volume chamber) 543 thus gradually flows into the first end (lower side in the drawing) of the chamber (volume chamber) 543 via the hole portion 542. The air thus accumulates in the first end (lower side in the drawing) of the chamber (volume chamber) 543 and the pressure of the air at the first end (lower side in the drawing) increases gradually.

The pressure of the air at the first end (lower side in the drawing) of the chamber (volume chamber) 543 then gradually moves the piston 541 to the second end (upper side in the drawing) against the urging force of the compression coil spring 545. When the piston 541 moves to the second end (upper side in the drawing), the valve (544, 549) is put in the open state. After the valve (544, 549) is opened, a set pressure is reached at the air tank and the exhaust valve is opened by a pressure governor (non-illustrated). The compressed air from the second flow passage 548 is thus discharged from the exhaust valve. The air from the air tank connected to the first flow passage 547 then begins to flow in reverse to the second flow passage 548 via the valve (544, 549) and the second end (upper side in the drawing) of the chamber (volume chamber) 543.

As shown in FIG. 31(B), the air feeding time adjusting function begins to operate from the point at which the valve (544, 549) is opened and the air begins to flow in reverse. Specifically, the pressure of the air at the second end (upper side in the drawing) of the chamber (volume chamber) 543 with reference to the piston 541 becomes lower than the pressure of the air at the first end (lower side in the drawing). The air at the first end (lower side in the drawing) thus gradually flows out to the second end (upper side in the drawing) via the hole portion 542. The pressure of the air at the first end (lower side in the drawing) thus decreases gradually. When the magnitude of the force by which the piston 541 is pressed by the pressure of the air at the first end (lower side in the drawing) becomes less than the magnitude of the force by which the compression coil spring 545 presses the piston 541, the piston 541 is gradually moved to the first end (lower side in the drawing) by the urging force of the compression coil spring 545.

During this process, the valve (544, 549) is in the open state and the air from the first flow passage 547 continues to be delivered to the second flow passage 548 via the valve (544, 549) and the second end (upper side in the drawing) of the chamber (volume chamber) 543. When a predetermined time (for example, 30 seconds) elapses from the point at which the valve (544, 549) is opened and the air begins to flow in reverse, the valve element 544 contacts the valve seat portion 549 so that the valve (544, 549) is switched to the closed state and the flow of air from the first flow passage 547 is stopped. It is configured that, as the air feeding time adjusting function, the air can be made to flow in reverse via the valve (544, 549) for the predetermined time (for example, 30 seconds).

However, the configuration is such that in switching the valve (544, 549) from the closed state to the open state in the stage before the air feeding time adjusting function begins to operate, the air is made to flow into the first end (lower side in the drawing) of the chamber (volume chamber) 543 only via the hole portion 542. The switching of the valve (544, 549) from the closed state to the open state thus requires a time (for example, of 30 seconds) that is substantially equal in length to the time (for example, of 30 seconds) during which the air feeding time adjusting function is activated to switch from the open state to the closed state.

In other words, in the valve device 540 that makes use of the time in which the air in the volume chamber at the first end (lower side in the drawing) of the chamber (volume chamber) 543 with reference to the piston 541 is exhausted, a time of substantially the same length as the exhausting time is required for putting the air into the volume chamber at the first end (lower side in the drawing).

Although the time required for regeneration of a drying agent differs variously according to system and is determined by the opening diameter of the hole portion 542 in the present configuration, the time for filling the volume chamber with air (time until the valve (544, 549) is opened) is also determined by the opening diameter of the hole portion 542 in the present configuration. The timing of regeneration of the drying agent is thus influenced by the air filling time and therefore, a requirement of rapid air filling and flexibility of time setting of the air feeding time adjusting function for the regeneration process cannot be achieved at the same time. For example, if only 15 seconds are available as the time for filling with air, sufficient air filling cannot be performed for activating the air feeding time adjusting function for 30 seconds and the air feeding time adjusting function is activated incompletely for just 15 seconds. The drying agent cannot be regenerated sufficiently in this case.

The present invention has been made in view of such circumstances and a fourth problem (object) thereof is to provide a regeneration valve device for an air dryer that takes into consideration the simultaneous achievement of the requirement of rapid air filling and flexibility of time setting of the air feeding time adjusting function for the drying agent regeneration process.

An air dryer captures, in its interior, the moisture and oil in compressed air discharged from an air compressor and in regenerating a drying agent, an exhaust valve is opened to discharge drain water, which contains oil, together with the compressed air through the exhaust valve.

However, with a conventional configuration, a drying agent regenerating operation is executed by an air pressure signal for opening the exhaust valve being output from a pressure governor when the air compressor is unloaded, that is, when the air pressure inside an air tank reaches a predefined upper limit value. The regeneration operation is thus executed when the condition is met, even in a location where the discharge of drain water is undesirable in terms of sanitation management, for example, in a food factory or a precision parts factory, and it is thus desired to avoid performing the drying agent regeneration in such a location where the discharge of drain water is undesirable.

A fifth object (problem) of the present invention is thus to provide a compressed air supply device for a vehicle by which the timing of a drying agent regeneration operation can be controlled easily.

In FIG. 31, the piston 541 has a large diameter portion on which the O-ring 546 is mounted and a small diameter portion at a vicinity of the valve element. The large diameter portion and the small diameter portion slide while contacting the inner side, and the like, of the volume chamber 543 in this configuration. Sliding is performed at locations that differ in the magnitude of diameter and there is thus a possibility for axial deviation to occur in which the attitude of the piston 541 inclines with respect to the direction of movement. There is then a possibility for increase of sliding load due to a twisting action caused by the axial deviation. Yet further, there is a possibility for the rubber O-ring 546, and the like, which are generally mounted on the piston 541 (including the shaft and other portions of small diameter), to degrade significantly rapidly due to the increase of sliding load.

The present invention has been made in view of such circumstances and a sixth problem (object) thereof is to provide a valve device that takes into consideration the sliding of a piston for performing opening and closing of a valve having an air feeding time adjusting function and an air dryer that includes the valve device.

Means for Solving the Problems

To achieve the first objective, the present invention provides an air dryer including a supporting base, a drying agent container, and an outer cover. The supporting base includes an inlet for receiving compressed air to be subject to a drying process and an outlet for delivering the processed compressed air that has undergone the drying process. The drying agent container is a container supported on the supporting base, contains a drying agent in the interior, and enables the drying process to be performed by passing the compressed air from the inlet through the drying agent. The outer cover surrounds the outer side of the drying agent container on the supporting base and defines a chamber for storing the compressed air between itself and the drying agent container. The air dryer is characterized in that the supporting base includes first and second mounting surfaces, which are oriented in different directions, and a plurality of inlets, which are oriented in different directions and receive the compressed air.

With this configuration, the supporting base includes the first and second mounting surfaces that are oriented in different directions and the plurality of inlets that are oriented in different directions and receive the compressed air. Therefore by selection of one of the first and second mounting surfaces and any of the plurality of inlets, the variation of combinations of the mounting surface and the inlet can be increased and mounting of the air dryer on diverse mounting positions can be performed easily with the same configuration. Also, improvement of the versatility and productivity of the air dryer is achieved because the air dryer of the same configuration can be mounted on diverse mounting positions.

In this configuration, the first and second mounting surfaces may be formed on mutually adjacent surfaces among the side surfaces of the supporting base, and the inlets may be collectively located at a corner portion of the supporting base that is positioned away from the mounting surfaces. With this configuration, the first and second mounting surfaces are formed on mutually adjacent surfaces among the side surfaces of the supporting base and therefore the supporting base can be easily changed in position with respect to and mounted on a mounting target. Also, the plurality of inlets are collectively located at the corner portion of the supporting base that is positioned away from the first and second mounting surfaces and therefore in connecting piping to the inlets, the piping connecting process can be performed readily without interference of the piping and the mounting target on which the mounting surface is mounted.

The outlet may be located at a side surface of the supporting base opposite from the first mounting surface, and a wet tank or a protection valve may be selectively mountable on the outlet. With this configuration, the outlet for delivering the compressed air is provided at the side surface that differs from the first and second mounting surfaces and a process of mounting equipment on the outlet can thus be performed easily.

Further, the wet tank or the protection valve is selectively mountable on the outlet, so that the equipment mounted on the outlet can be selected in accordance with mounting conditions of the supporting base and the arrangement of peripheral equipment, thereby enabling realization of diverse air circuit layouts.

A plurality of planned opening portions may be provided in correspondence to the inlets, and a hole may be formed in a planned opening portion in accordance with mounting conditions of the supporting base. With this configuration, it suffices to bore a hole in the planned opening portion for the inlet to be actually used and working processes are thus reduced correspondingly and workability is improved. Further, with this configuration, a hole is not bored in a planned opening portion for an inlet that is not used and the process of closing off this inlet is made unnecessary and air leakage from the inlet is prevented reliably.

A first aspect of the present invention for resolving the second problem is a silencer including an expansion chamber, having a plurality of inner walls respectively facing a plurality of slits that are discharge outlets for drain and air from an exhaust valve in an air dryer that performs a drying process on compressed air, and a noise absorbing material housing chamber connected to the expansion chamber and housing a noise absorbing material.

With the present aspect, the silencer for reducing air discharge noise from the exhaust valve in the air dryer that performs the drying process on compressed air has a configuration where the air discharged from the slits, which discharge the drain and air, hits different inner walls inside the expansion chamber. That is, the discharged air from the exhaust valve is branched into a plurality of flow passages and hits the inner walls inside the expansion chamber under respectively different conditions, thereby enabling the "noise range" in the process of discharge of air from the plurality of slits to be dispersed, and a better silencing effect can thereby be obtained.

The plurality of inner walls respectively facing the plurality of slits does not necessarily signify an embodiment where different inner walls correspond in a one-to-one manner with the plurality of slits, and in addition to such an embodiment, for example, an embodiment where there is not less than two facing slits (slit openings) with respect to one inner wall is also included. That is, it suffices that there be present an expansion chamber having a plurality of inner walls and a plurality of slits that discharge air toward at least two inner walls.

A second aspect of the present invention is characterized in that, in the first aspect, at least either the angles or the distances by which the air discharged from the plurality of slits hits the different inner walls inside the expansion chamber differ.

This aspect is configured such that at least either the angles or the distances by which the air discharged from the plurality of slits hits the different inner walls inside the expansion chamber differ and therefore the above-described actions and effects of the second aspect are obtained even more effectively.

A third aspect of the present invention is characterized in that in the first and second aspects, the noise absorbing material is a porous material.

With this aspect, the noise absorbing material is a porous material and an even better silencing effect is obtained by the silencing effect due to the discharged air passing through numerous pores.

A fourth aspect of the present invention is characterized in that in any one of the first to third aspects, a final discharge outlet that discharges the drain and the air to the exterior has a shape that opens only vertically downward.

With this aspect, the final discharge outlet that discharges the drain and the air to the exterior has a shape that opens only vertically downward and by the air discharge noise thus being emitted downward, the air discharge noise is made even more difficult to hear.

A fifth aspect of the present invention is characterized in that in any one of the first to fourth aspects, at least the discharge outlet of the exhaust valve at which the slits are formed, the expansion chamber, and the noise absorbing material housing chamber are formed integrally on a base member forming a base of the air dryer.

With the present aspect, at least the discharge outlet of the exhaust valve at which the slits are formed, the expansion chamber, and the noise absorbing material housing chamber are formed integrally on the base member forming the base of the air dryer and therefore cost reduction of the air dryer with silencer is achieved and the volume occupied by the silencer can also be reduced.

Also, by forming the components of the silencer integrally on the base member forming the base of the air dryer, the strength is ensured readily and an even better silencing effect is obtained by making the discharged air hit a rigid body.

A sixth aspect of the present invention is an air dryer that performs a drying process on compressed air and is characterized by the silencer according to any one of the first to fifth aspects that reduces air discharge noise from an exhaust valve discharging drain generated by the drying process. With the present aspect, the same actions and effects as those of any one of the first to fifth aspects are obtained in the air dryer.

The first aspect of the present invention for resolving the third problem provides a valve that discharges drain and air generated by a drying process in an air dryer that performs the drying process on compressed air supplied from an air compressor. The valve is an exhaust valve configured to receive the pressure of the compressed air supplied from the air compressor in a valve closed state and to open when receiving a control command pressure from a pressure governor when the compressed air reaches a predefined pressure and characterized by a valve body pressed in a valve opening direction by the pressure of the compressed air and an urging means urging the valve body in a valve closing direction against the pressure of the compressed air and having a configuration where the valve closed state is maintained against the pressure of the compressed air by the urging force of the urging means. When the control command pressure is received from the pressure governor, the control command pressure opens the valve against the urging force of the urging means.

Unlike the conventional configuration, the present aspect is configured such that the valve body of the exhaust valve has a structure of being pressed not in the valve closing direction but in the valve opening direction by the pressure of the compressed air supplied from the air compressor. The valve closed state is maintained by the urging force of the urging means when the air compressor is in the loaded state and therefore the piston forming the valve body is not required to be formed to a T-like shape that is large in diameter at an upper portion from the standpoint of pressure receiving area as in the conventional art.

There is thus no need to ensure a large opening for housing the valve body and a valve base, which thus has to be made large in diameter conventionally, can be made compact or the valve base itself is made unnecessary. The need to arrange the valve body from several members due to reasons of assembly is also eliminated and an integral configuration is made possible. By the above reasons, the structure of the exhaust valve is simplified and cost reduction can also be achieved.

The second aspect of the present invention is characterized in that the valve body is formed by a piston member, sliding in valve opening and closing directions, and a valve element, contacting a valve seat, being formed integrally and the valve seat is formed using a portion of a base member forming a base of the air dryer.

With this configuration, the piston member, which slides in the valve opening and closing directions, and the valve element, which contacts the valve seat, are formed integrally so that the valve that moves in vertical directions is reduced in cost. Also, the valve seat is formed using a portion of the base member of the air dryer; that is, the valve seat is integral to the base member so that the exhaust valve can be made even simpler in structure to achieve cost reduction.

A third aspect of the present invention is an air dryer that performs a drying process on compressed air and is characterized by the exhaust valve according to the first or second aspect that discharges either or both of drain and air generated by the drying process.

With this aspect, the same first or second actions and effects described above are obtained in the air dryer.

To solve the fourth problem, a regeneration valve device for an air dryer according to the first aspect of the present invention is characterized by a chamber, a piston, a valve, an urging means, a hole portion, and an auxiliary flow passage. The chamber is located between a drying portion that performs a drying process on a compressed gas supplied from a gas compressor and a gas tank that stores the dry compressed gas that has undergone the drying process. The pressure of the gas acts on the chamber. The piston moves inside the chamber and defines the interior of the chamber into a first end space on the side corresponding to the gas tank and a second end space on the side corresponding to the drying portion. The valve is put in a closed state by the piston moving toward the first end and put in an open state by the piston moving toward the second end. The urging means urges the piston in the direction in which the valve is closed. The hole portion is formed in the piston and makes the gas flow from one side to another side in accordance with the difference between the pressure of the gas inside the first end space and the pressure of the gas inside the second end space. The auxiliary flow passage has a restricting means that allows the flow of gas in the direction from the second end space to the first end space of the chamber and restricts the flow of gas in the direction from the first end space to the second end space in the flow passage.

With this aspect, when the gas is delivered from the gas compressor into the second end space inside the chamber, the gas delivered into the second end space can flow into the first end space inside the chamber via the hole portion and the auxiliary flow passage. Therefore in comparison to the configuration where the gas flows in only via the hole portion (see FIG. 31), the amount flowing in per unit time is increased. Consequently, the time required for accumulating the gas in the first end space in the chamber to move the piston to the second end to switch the valve to the open state is shortened. That is, the valve is put in the open state when making gas of a sufficient amount flow into the first end space in the chamber and there is thus no possibility of the air feeding time adjusting function starting to operate in an incomplete state.

On the other hand, after the valve is switched to the open state and the dry compressed gas in the gas tank begins to flow in reverse, the gas in the first end space in the chamber flows out gradually to the second end space via the hole portion. The pressure in the first end space in the chamber is decreased by the outflow of the gas. In this process, the urging force of the urging means moves the piston to the first end and by this movement of the piston, the valve is put in the closed state. The dry compressed gas in the gas tank can thus be made to flow in reverse for just a predetermined time.

That is, in the configuration for controlling the length of the time of reverse flow by the hole portion, the requirement of rapid air filling and flexibility of time setting of the air feeding time adjusting function for a drying agent regeneration process is achieved at the same time.

The second aspect of the present invention is characterized by the following configuration. In the first aspect, the auxiliary flow passage is formed by a clearance between the outer peripheral surface of a flange portion of the piston and the inner peripheral surface of the chamber. The restricting means is formed by a cup seal housed in a recessed portion formed along the outer peripheral surface of the flange portion such that an opening portion faces the first end space. The cup seal enlarges and reduces the opening portion by elastic deformation. The gas flows into the first end space via the hole portion and additionally via the auxiliary flow passage due to the opening portion of the cup seal reducing to open the clearance when the gas flows from the second end space in the chamber into the first end space. The gas flows out to the second end space only via the hole portion due to the opening portion of the cup seal enlarging to close the clearance when the gas flows out from the first end space in the chamber to the second end space.

With this aspect, in addition to the same actions and effects as the first aspect, a check valve function is achieved by a simple structure and at low cost.

The third aspect of the present invention is characterized by the following configuration. In the first or second aspect, the gas is delivered from the drying portion to the second end space in the chamber. The gas is delivered into the second end space flowing into the first end space in the chamber. The pressure in the first end space in the chamber increases. The piston is moved by the pressure to the second end against the urging force of the urging means and the valve is put in the open state by the movement of the piston. By the gas in the first end space in the chamber flowing out to the second end space via the hole portion and the pressure in the first end space in the chamber decreasing due to the outflow of the gas, the urging force of the urging means moves the piston to the first end and the valve is put in the closed state by the movement of the piston.

With this aspect, in addition to the same actions and effects as the first or second aspect, the valve can be put in the open state by feeding the gas from the drying portion into the second end space inside the chamber. Also, the time from the point at which the gas begins to flow out to the point at which the valve is switched to the closing state can be adjusted by means of the opening diameter of the hole portion.

An air dryer according to the fourth aspect of the present invention is an air dryer that includes a drying portion having a regenerable drying agent and a regeneration valve device connected to a first end of a flow passage in the drying portion. The air dryer of the fourth aspect is characterized by the following configuration: The regeneration valve device is the regeneration valve device according to any one of the first to third aspects, a gas compressor and a gas discharge portion are connected to the second end of the flow passage in the drying portion. The valve of the regeneration valve device is put in the open state by the gas being delivered by the gas compressor to the first end space inside chamber via the hole portion and the auxiliary flow passage of the regeneration valve device. By the gas discharge portion being put in an atmosphere released state, the dry compressed gas inside the gas tank is delivered to the drying portion via the valve of the regeneration valve device and discharged from the gas discharging portion.

With the present aspect, the air dryer includes the regeneration valve device of any one of the first to third aspects. The same actions and effects as any one of the first to third aspects can thus be obtained in the air dryer. Also, by the gas discharge portion being put in the atmosphere released state, the air feeding time adjusting function begins to operate and the dry compressed gas inside the gas tank can be used for regeneration of the drying agent for just a predetermined time.

To achieve the fifth object, the compressed air supply device for a vehicle according to the first aspect of the present invention is characterized in that the compressed air supply device for a vehicle, which includes an air compressor installed in a vehicle and an air dryer removing moisture and other foreign matter contained in the compressed air discharged from the air compressor and supplies the compressed air that has passed through the air dryer to a load of the vehicle. The compressed air supply device includes a regenerating means regenerating a drying agent in the air dryer at a predetermined timing, a vehicle speed detecting means detecting the vehicle speed of the vehicle, and a regeneration inhibiting means inhibiting the regeneration of the drying agent regardless of the predetermined timing if the detected vehicle speed is slower than a predetermined reference speed.

The second aspect of the present invention is characterized in that in the first aspect, the regenerating means includes an exhaust valve arranged in the air dryer, a regeneration solenoid valve applying an air pressure for control to the exhaust valve via a control line, and a regeneration control means opening the regeneration solenoid valve at the predetermined timing to apply the air pressure to the exhaust valve to open the exhaust valve and perform regeneration control of the drying agent in the air dryer.

Also, the third aspect of the present invention is characterized in that in the first or second aspect, a humidity sensor is located downstream of the drying agent in the compressed air supply device for a vehicle. If the humidity level detected by the humidity sensor indicates a humidity level not less than a threshold set in advance, the regeneration of the drying agent is forcibly executed even if the regeneration of the drying agent is inhibited.

Also, the fourth aspect of the present invention is characterized in that in the first or second aspect, a humidity sensor is located downstream of the drying agent. When the humidity level detected by the humidity sensor indicates a humidity level not less than a threshold set in advance, the regeneration of the drying agent is put on standby until the inhibition of regeneration of the drying agent is cancelled.

To achieve the sixth problem, the valve device according to the first aspect of the present invention is a valve device that opens and closes a bypass flow passage bypassing a flow passage of gas between a gas compressor and a gas tank storing the gas supplied from the gas compressor. The valve device is characterized by a volume chamber and a first valve. The internal pressure of the volume chamber is increased by gas being supplied from at least one of either of the gas compressor and the gas tank and is decreased by gas flowing out over a predetermined time from a hole portion in accompaniment with pressure reduction on the side corresponding to the gas compressor. The first valve is in communication with the volume chamber, opens the bypass flow passage due to pressure reduction on the side corresponding to the gas compressor in a state where a predetermined pressure is reached at the volume chamber, and thereafter closes the bypass flow passage due to reduction of the internal pressure of the volume chamber. The first valve is configured to open and close the bypass flow passage by a piston sliding inside a cylinder portion formed independently of the volume chamber.

With the present aspect, the cylinder portion is arranged independently of the volume chamber. The volume chamber is required to accumulate a predetermined amount of gas and must thus be made rather large in size. On the other hand, the cylinder portion is not required to accumulate a predetermined amount of gas like the volume chamber and therefore does not need to be made large in size. The diameter of the piston thus does not have to be made large. The piston can thus be formed so that locations of the same diameter of the piston contact and slide along the inner side of the cylinder portion.

Consequently, axial deviation, in which the attitude of the piston inclines with respect to the movement direction when locations that differ largely in diameter contact and slide, is prevented from occurring. Also, increase of the sliding load due to a twisting action due to axial deviation is prevented. Yet further, the possibility for a rubber piston ring, which is generally mounted on the piston, to degrade due to the increase of sliding load is reduced. The valve device can thereby be improved in durability.

The second aspect of the present invention is characterized in that, in the first aspect, at least three ring-shaped sealing members are arranged at appropriate intervals along the movement direction of the piston on the outer periphery of the piston to partition the interior of the cylinder portion into at least four portions of first to fourth spaces in that order in the movement direction of the piston. A first opening in communication with the gas compressor side flow passage in the bypass flow passage and a second opening in communication with the gas tank side flow passage in the bypass flow passage are formed at a predetermined interval in the movement direction of the piston in the inner wall of the cylinder portion. The first space is a space that is constantly in communication with the volume chamber regardless of the position of the piston. The fourth space is a space having the first opening at its inner side regardless of the position of the piston. The second space is a space that is constantly put in communication with the fourth space by a communication passage formed inside the piston. The third space is a closed space. The piston is urged in the direction of closing the first valve by an urging means.

The first valve is put in the closed state by a state where the second opening is positioned inside the third space being maintained by balancing of the pressure acting on the piston in the first space and the pressure acting on the piston in the fourth space in the state where the gas is supplied from the gas compressor. The first valve is put in the open state when, due to pressure reduction on the side corresponding to the gas compressor, the pressure acting on the piston in the first space overcomes the pressure acting on the piston in the fourth space to move the piston until the second opening is positioned inside the second space. The first valve is thereafter put in the closed state when, due to reduction of the internal pressure of the volume chamber, the pressure acting on the piston in the first space decreases and the piston is returned by the urging force of the urging means until the second opening is positioned inside the third space.

With the present aspect, in addition to the same actions and effects as the first aspect, the gas pressure in the space at the first end inside the cylinder portion is balanced with the gas pressure in the space at the second end before the outflow of gas from the hole portion begins. In this state, the position of the piston is stabilized with a spring of small force.

Also, by generation of a difference between the gas pressure in the first space inside the cylinder portion and the gas pressure in the fourth space, the piston is moved and the first valve is changed from the open state to the closed state.

Yet further, when the predetermined time elapses, the gas pressure in the first space inside the cylinder portion and the gas pressure in the fourth space are balanced again. In this state, the piston is configured to be moved by the urging force of the urging means.

Consequently, the urging force of a spring, which is an example of the urging means, may be made comparatively small. Also, spring relaxation, in which a spring having a comparatively strong urging force loses its urging force, does not have to be considered because the urging force of the spring is made comparatively small.

Also, the first valve is put in the open state by moving the piston until the second opening is positioned inside the second space and the first valve is put in the closed state by the piston being returned until the second opening is positioned inside the third space. Consequently, the switching can be performed with a simple configuration.

The third aspect of the present invention is characterized by, in the first or second aspect, a second valve for filling gas into the volume chamber and a third valve for discharging the gas from the volume chamber via the hole portion are included.

With the present aspect, in addition to the same actions and effects as the first and second aspects, the volume chamber can be filled with gas in a short time in comparison to a configuration not having the second valve and the third valve.

The fourth aspect of the present invention is characterized in that in the third aspect, the gas discharged from the volume chamber via the hole portion is released to the atmosphere.

With the present aspect, in addition to the same actions and effects as the third aspect, the gas in the volume chamber is discharged to a location without residual pressure and the gas pressure in the volume chamber can thus always be returned to the original gas pressure. Consequently, the closed state is returned to reliably after the open state has been attained once. Also, variation of the length of time required to return to the closed state from the point at which the open state is attained is made small and the length of time is stabilized.

The air dryer according to the fifth aspect of the present invention is an air dryer that includes a drying portion having a regenerable drying agent and a regeneration valve device connected to a first end of a flow passage in the drying portion. The air dryer is characterized in that the regeneration valve device is the valve device according to any one of the first to fourth aspects, the drying portion is located between the regeneration valve device and both the gas compressor and the gas discharge valve. The drying agent is dried using the gas in the gas tank that flows in reverse when the gas discharge valve is opened and the first valve opens the bypass flow passage.

With the present aspect, the regeneration valve device of the air dryer is the valve device of any one of the first to fourth aspects. The same actions and effects as any one of the first to fourth aspects can thus be obtained in the air dryer.

The valve device according to the sixth aspect of the present invention is characterized by a volume chamber, an intake inlet and an exhaust outlet provided in the volume chamber, and a valve in communication with the volume chamber and opening or closing for a predetermined time in accordance with a change of pressure in the volume chamber.

Gas (air) of high pressure is contained in the volume chamber. The high pressure gas is supplied to the intake inlet from the compressor. The high pressure gas supplied to the volume chamber is discharged from the exhaust outlet. The volume chamber is in communication with the valve. A piston type, ball valve type, or diaphragm type may be used as the valve.

For example, with the piston type, the high pressure gas from the volume chamber is made to flow into a chamber at a first side with respect to the movement direction of the piston and a spring, rubber, or other urging means is located in a chamber at a second side.

While the piston is pushed by the high pressure gas, the piston is moved toward the urging means against the force of the urging means. As the high pressure gas inside the volume chamber is vented from the exhaust outlet, the piston is pushed by the force of the urging means and moved to the side opposite to the urging means.

A plurality of flow passages are put in communication with the movement space of the piston, and communication and closure among the flow passages is selected according to the piston movement.

For example, the valve may be configured such that the flow passages are put in communication when the volume chamber is filled with the high pressure gas and the piston is on the side corresponding to the urging means and the flow passages are closed by the piston while the piston is moving to the side opposite to the urging means as the high pressure gas is vented from inside the volume chamber.

In contrast, the valve may be configured such that the flow passages are closed by the piston when the volume chamber is filled with the high pressure gas and the piston is on the side corresponding to the urging means, and the flow passages are put in communication while the piston is moving to the side opposite to the urging means as the high pressure gas is vented from inside the volume chamber.

The time of pressure reduction in the volume chamber can be adjusted by adjusting the size of the exhaust outlet of the volume chamber and the movement time of the piston can thus be adjusted to control the opening/closing time of the valve.

Also, the exhaust outlet and the intake inlet of the volume chamber may be a single common port and a solenoid valve, and the like, may be used on the side corresponding to the compressor to perform the filling of the volume chamber with the high pressure gas and the release to atmosphere. In place of the high pressure gas, the volume chamber may be filled with a vacuum pressure gas by connecting a vacuum pump (vacuum source) to the intake inlet.

With a vacuum pressure gas, gas of the atmosphere, and the like, flows into the volume chamber from the exhaust outlet of the volume chamber. The volume chamber is in communication with the valve. As with the high pressure gas, a piston type, ball valve type, or diaphragm type may be used as the valve.

For example, with the piston type, a chamber at a first side with respect to the movement direction of the piston is put in communication with the volume chamber and set to vacuum pressure, and a spring, rubber, or other urging means is located in the chamber at the first side.

The second side of the piston is pushed by the atmospheric pressure or other pressure higher than the vacuum pressure gas and the piston is thus moved toward the urging means against the force of the urging means. As the vacuum pressure inside the volume chamber increases, the piston is pushed by the force of the urging means and is moved to the side opposite to the urging means.

A plurality of flow passages are put in communication with the movement space of the piston and communication and closure among the flow passages can be selected according to the piston movement.

For example, the valve may be configured such that the flow passages are put in communication when the volume chamber is at the vacuum pressure and the piston is at the urging means side and the flow passages are closed by the piston when the pressure inside the volume chamber increases and the piston moves to the side opposite to the urging means.

In contrast, the valve may be configured such that the flow passages are closed by the piston when the volume chamber is at the vacuum pressure and the piston is on the side corresponding to the urging means, and the flow passages are put in communication while the piston is moving to the side opposite to the urging means as the pressure inside the volume chamber increases.

The time of pressure increase in the volume chamber can be adjusted by adjusting the size of the exhaust outlet of the volume chamber and the movement time of the piston can thus be adjusted to control the opening/closing time of the valve.

Also, the exhaust outlet and the intake inlet of the volume chamber may be a single common port and a solenoid valve, and the like, may be used on the side corresponding to the vacuum pump to perform vacuum drawing and release to atmosphere of the volume chamber.

The compressed air supply system device according to the seventh aspect of the present invention is characterized by the following configuration. An air dryer is located in a supply flow passage between a gas compressor and a gas tank storing a gas supplied from the gas compressor. A check valve allowing the flow of gas from on the side corresponding to the air dryer to on the side corresponding to the gas tank is located in the supply passage between the gas tank and the air dryer. An intake inlet and an exhaust outlet are provided in a volume chamber. The system includes a valve in communication with the volume chamber and opening and closing in accordance with the pressure inside the volume chamber. The valve is provided for opening and closing a purge flow passage that puts a point between the gas tank and the check valve and a point between a drying agent of the air dryer and the check valve in communication.

The intake inlet of the volume chamber is put in communication with the supply flow passage between the gas compressor and the drying agent of the air dryer or the supply flow passage between the drying agent of the air dryer and the check valve, and the interior of the volume chamber is filled with the high pressure gas from the gas compressor. Also, the intake inlet of the volume chamber may be put in communication with the supply flow passage between the check valve and the gas tank via a valve. By being put in communication via the valve, the high pressure gas inside the gas tank is prevented from being vented more than necessary from the exhaust outlet of the volume chamber.

The valve has an open configuration to supply the high pressure gas to the volume chamber until a predetermined amount or a predetermined pressure is attained and a piston type, diaphragm type, ball valve type, or solenoid type may be used. The valve may be located in an intake flow passage to the intake inlet of the volume chamber that is in communication with the supply flow passage between the gas compressor and the drying agent of the air dryer or the supply flow passage between the drying agent of the air dryer and the check valve. Reverse flow of the high pressure gas inside the volume chamber from the intake flow passage to on the side corresponding to the supply flow passage can thereby be prevented. As the supply source of the high pressure gas to the volume chamber, supplying can be performed by a second gas compressor that is independent of the gas compressor.

A piston type, ball valve type, or diaphragm type may be used as the valve.

For example, with the piston type, the high pressure air from the volume chamber flows into a chamber at a first side with respect to the movement direction of the piston and a spring, rubber, or other urging means is located in the chamber at a second side.

While the piston is pushed by the high pressure air from inside the volume chamber, the piston is moved toward the urging means against the force of the urging means. As the high pressure air inside the volume chamber is vented from the exhaust outlet, the piston is pushed by the force of the urging means and is moved to the side opposite to the urging means.

The movement space of the piston is put in communication with a purge flow passage in communication with the supply flow passage between the check valve and the gas tank and a purge flow passage in communication with the supply flow passage between the drying agent of the air dryer and the check valve.

With the two purge flow passages in communication with the movement space of the piston, communication and closure is selected according to the piston movement. For example, the valve may be configured such that the purge flow passages are put in communication when the volume chamber is filled with the high pressure air and the piston is on the side corresponding to the urging means and the flow passages are closed by the piston while the piston is moving to the side opposite to the urging means as the high pressure air is vented from inside the volume chamber.

In contrast, the valve may be configured such that the flow passages are closed by the piston when the volume chamber is filled with the high pressure air and the piston is on the side corresponding to the urging means, and the flow passages are put in communication while the piston is moving to the side opposite to the urging means as the high pressure air is vented from inside the volume chamber.

Also, the time of pressure reduction in the volume chamber can be adjusted by adjusting the size of the exhaust outlet of the volume chamber using a throttle, and the like, and the movement time of the piston can thus be adjusted to control the opening/closing time of the valve.

Instead of being released to the atmosphere, the exhaust outlet of the volume chamber may be put in communication with the supply flow passage between the check valve and the gas compressor or with the purge flow passage from the valve to on the side corresponding to the air dryer. The volume chamber can thereby be put in communication with the atmosphere in linkage with the releasing of the supply flow passage or the purge flow passage to the atmosphere by purging of the air dryer and the purging time of the air dryer is adjusted by a simpler structure.

Also, if the time for high pressure gas filling by the throttle for exhausting time adjustment of the volume chamber does not present a problem, the exhaust outlet and intake inlet of the volume chamber may be a common port (hole). The volume chamber may be arranged as a valve not only for high pressure gas but also for vacuum pressure.

Effects of the Invention

With the present invention, the supporting base includes the first and second mounting surfaces that are oriented in different directions and the plurality of inlets that are oriented in different directions and receive the compressed air, and therefore by selection of one of the first and second mounting surfaces and any of the plurality of inlets, the variation of combinations of the mounting surface and the inlet is increased and mounting of the air dryer on diverse mounting positions can be performed easily with the same configuration. Also, improvement of the versatility and productivity of the air dryer is achieved because the air dryer of the same configuration can be mounted on diverse mounting positions.

Further, with the present invention, the regeneration inhibiting means that inhibits the regeneration of the drying agent regardless of the predetermined timing if the detected vehicle speed is slower than the reference speed is included. The timing of the drying agent regeneration operation can thus be controlled easily based on the vehicle speed, and the regeneration operation is suppressed at locations, for example, within factory premises, where the traveling speed is restricted and the discharge of drain water is undesirable.

DETAILED DESCRIPTION OF THE PREFERRED EMBODIMENTS

A preferred embodiment of the present invention for achieving the first object will now be described with reference to the drawings.

Figure 1:
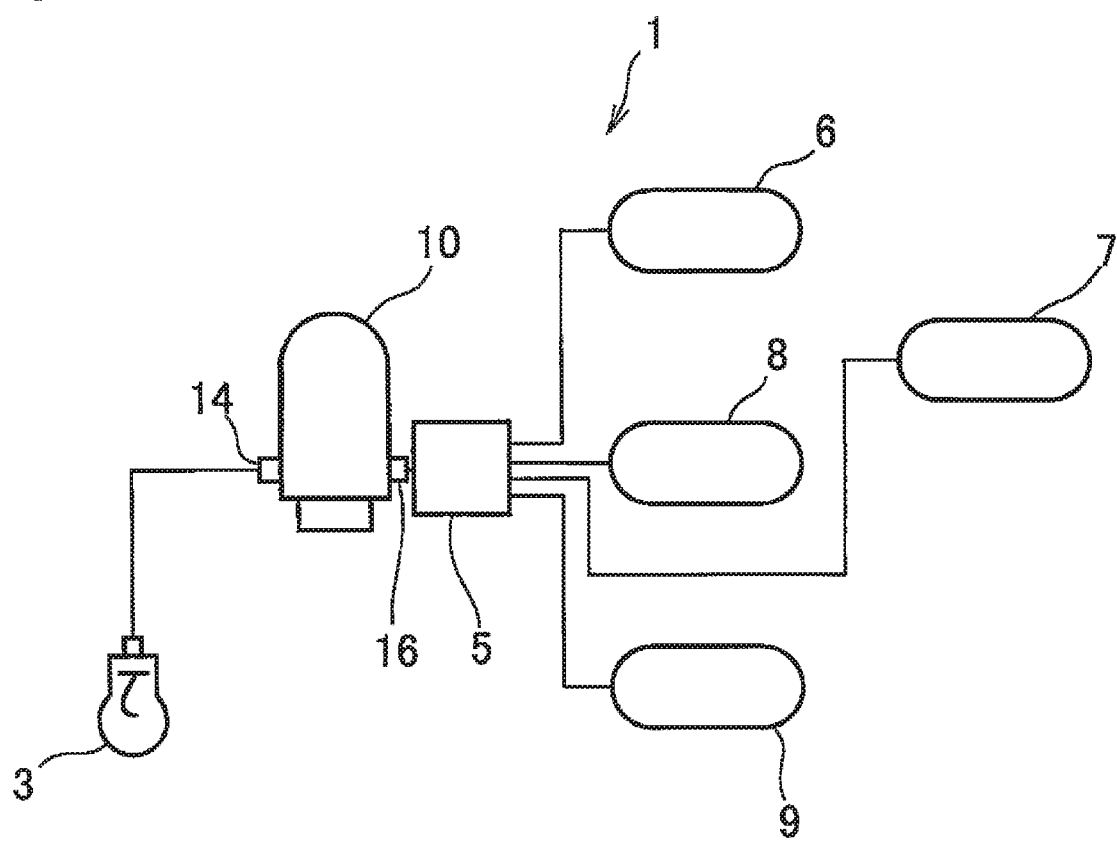
FIG. 1 is a circuit diagram of an air circuit using an air dryer according to the present embodiment.

FIG. 1 is a circuit diagram of an example of an air circuit using an air dryer according to the present embodiment. The air circuit 1 includes an air dryer 10, an air compressor 3 is connected to an inlet 14 of the air dryer 10, and pressurized air is supplied from the air compressor 3. A protection valve 5 is connected to an outlet 16 of the air dryer 10, and air tanks 6, 7, 8, and 9 are connected respectively to four exhaust ports of the protection valve 5. Brake circuits (service brake circuits and a parking brake circuit) and compressed-air-driven accessories (horn and clutch driving mechanisms, and the like) of a vehicle are respectively connected to the air tanks 6 to 9, and the brake circuits and the accessories are driven by the compressed air being supplied from the corresponding air tanks 6 to 9. The protection valve 5 integrally includes a plurality of pressure protection valves respectively corresponding to the air tanks (brake circuits) 6 to 9 and systems respectively including the air tanks 6 to 9 are made independent of each other. Therefore, the protection valve 5 functions in a manner such that when the pressure of the compressed air in any of the air tanks 6 to 9 decreases (when pressure loss occurs), the pressure protection valve corresponding to the air tank is closed to protect the other air tanks (that is, the brake circuits) in which pressure loss has not occurred.

Figure 2:
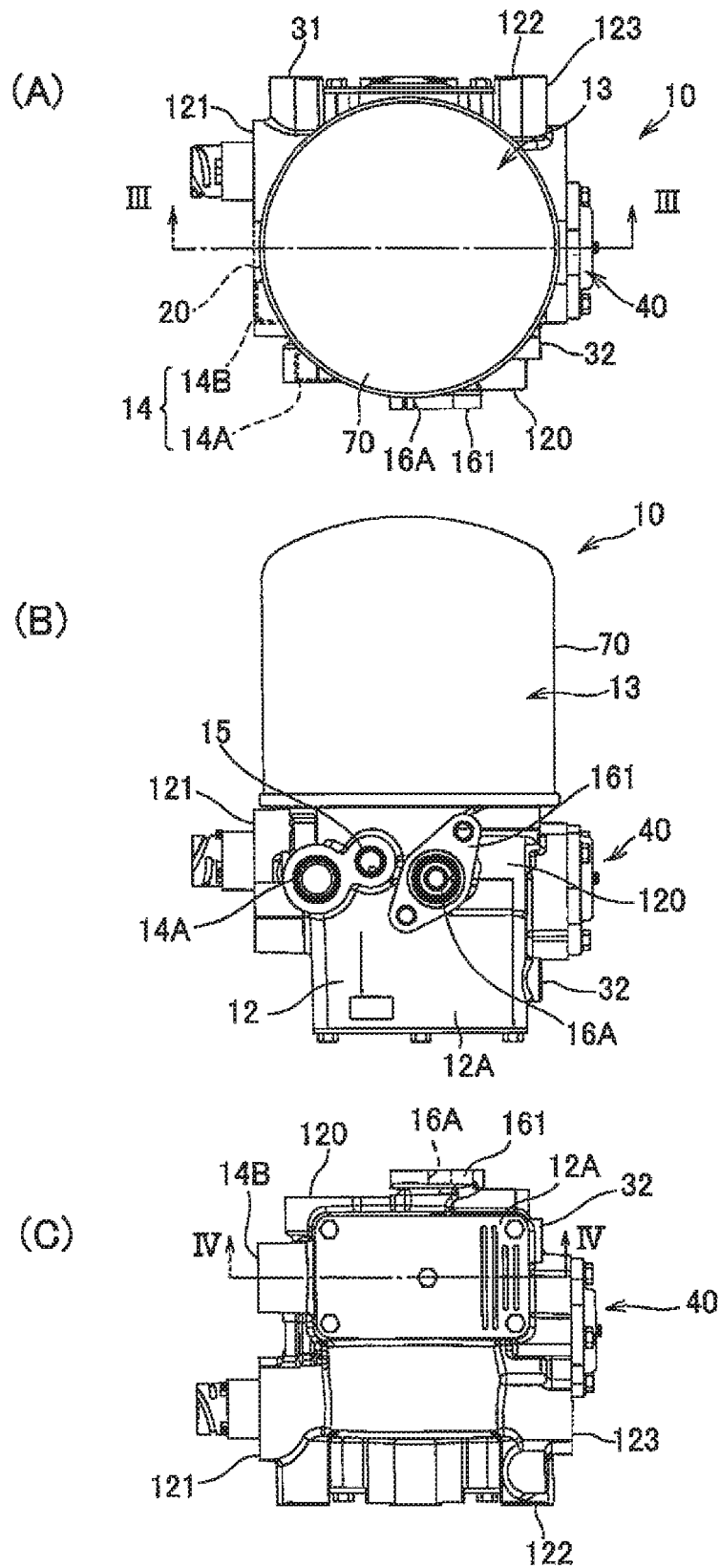
FIG. 2 shows the outer appearance of the air dryer, with (A) being a plan view, (B) being a front view, and (C) being a bottom view.

FIG. 2 shows three views of the air dryer 10, with (A) being a plan view, (B) being a front view, and (C) being a bottom view.

As shown in FIG. 2B, the air dryer 10 includes a supporting base 12 positioned at a bottom portion and a dryer main body 13 supported on the supporting base 12. The supporting base 12 is a metal molded part made of aluminum or an alloy thereof. In the present configuration, the supporting base 12 is provided with a first inlet 14A and a second inlet 14B, which receive compressed air to be subject to a drying process. The first inlet 14A and the second inlet 14B are put in communication inside the supporting base 12 and are located in the supporting base 12 so as to be oriented in different directions. Specifically, the first inlet 14A is formed on a front surface 120 of the supporting base 12 as shown in FIGS. 2A and 2B and the second inlet 14B is formed on a left side surface 121 of the supporting base 12 as shown in FIGS. 2A and 2C. Accordingly, in performing a process of connecting a supply piping for supplying the compressed air to the air dryer 10, it suffices to make a connection with one of either of the first inlet 14A and the second inlet 14B, thereby facilitating the routing of the supply piping and enabling the piping connecting process to be performed easily.

Further, as shown in FIG. 2A, the first inlet 14A and the second inlet 14B are collectively located at a corner portion, at which the front surface 120 and the left side surface 121 of the supporting base 12 intersect and which is positioned away from a rear surface 122 and a right side surface 123 of the supporting base 12, which function as mounting surfaces to be described below. Accordingly, in connecting the supply piping to the first inlet 14A or the second inlet 14B, the supply piping connecting process can be performed readily without interference of the supply piping with a member (for example, a vehicle body frame) that is to be a mounting target on which a mounting surface is mounted.

Also, as shown in FIG. 2B, a control air inlet 15 and a first outlet 16A are arranged in lateral alignment with the first inlet 14A on the front surface 120 of the supporting base 12, and a flange 161 for mounting of the protection valve 5 is formed at a periphery of the first outlet 16A.

In the present configuration, a second outlet in communication with the first outlet 16A is provided and this will be described below.

Figure 3:
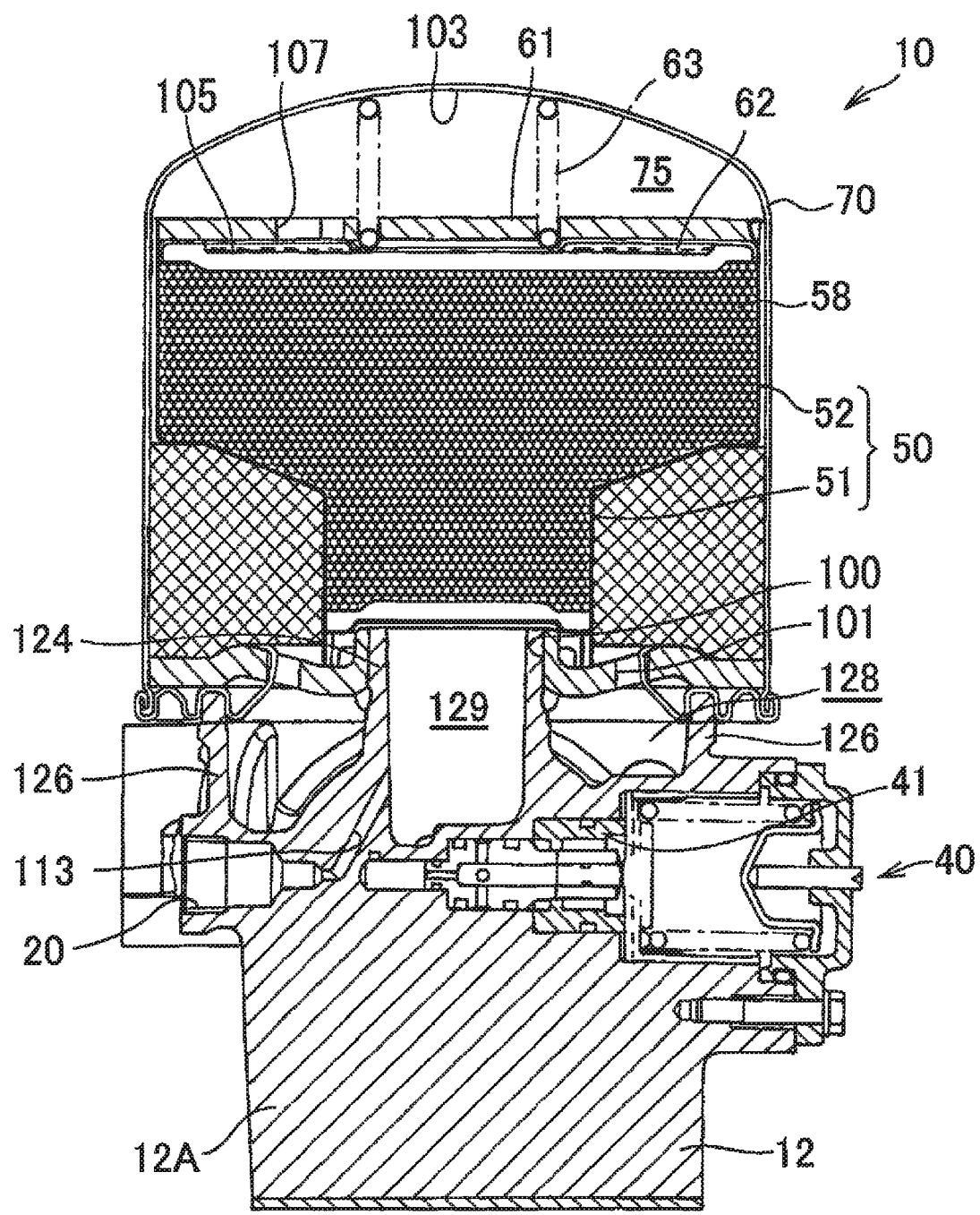
FIG. 3 is a cross-sectional view taken along line of FIG. 2A.

The internal configuration of the air dryer 10 will now be described. FIG. 3 is a cross-sectional view taken along line III-III of FIGS. 2A and 4 is a cross-sectional view taken along line Iv-Iv of FIG. 2C.

As shown in FIG. 3, the supporting base 12 integrally includes a projecting portion 12A at the bottom surface and includes an inner ring portion 124 and an outer ring portion 126, which are concentric at the upper surface. The inner ring portion 124 is formed to be higher than the outer ring portion 126. Over the interval between the inner ring portion 124 and the outer ring portion 126, the upper surface of the supporting base 12 is recessed largely so as to form a ring-shaped space 128 thereat. As shown in FIG. 4, the ring-shaped space 128 is put in communication with a lateral hole 111, extending substantially horizontally inside the projecting portion 12A, through vertical holes 110, extending downward from the ring-shaped space 128, and the lateral hole 111 is in communication with the second inlet 14B. Further, one of the vertical holes 110 is in communication with the first inlet 14A. The ring-shaped space 128 is thereby used as a space in which the compressed air, flowing into the supporting base 12 through the first inlet 14A or the second inlet 14B, is temporarily stored.

The upper surface of the supporting base 12 surrounded by the inner ring portion 124 is also recessed largely to form a columnar inner space 129. The inner space 129 is put in communication with the interior of the dryer main body 13 by the inner ring portion 124 penetrating into the dryer main body 13 and is used as a space for storing the compressed air for which the drying process has ended.

Figure 4:
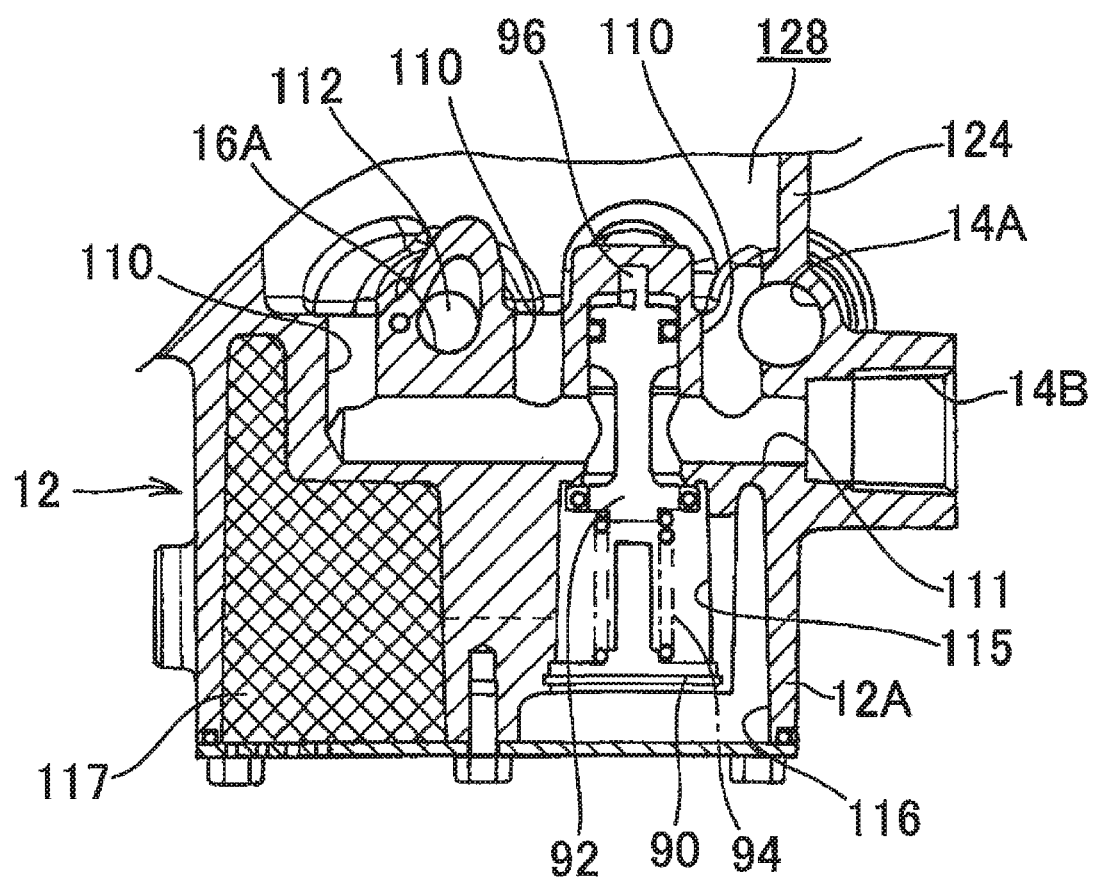
FIG. 4 is a view taken along line IV-IV of FIG. 2C.
Figure 6:
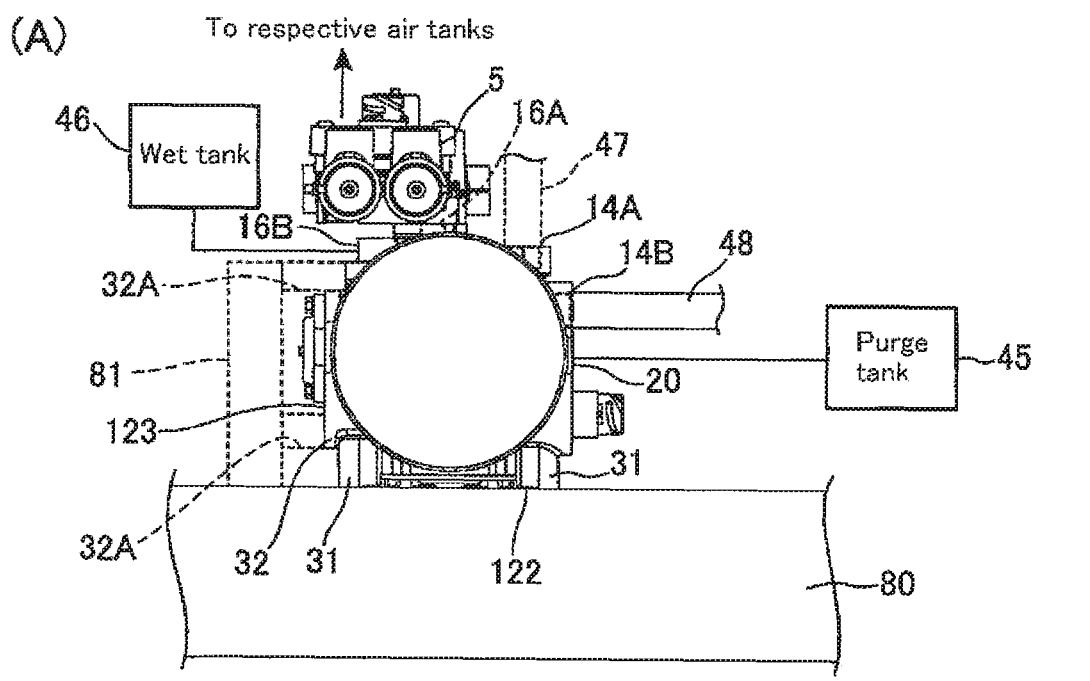
FIG. 6 shows a mode of mounting of the air dryer, with (A) being a diagram of a state of mounting on a rear surface of a supporting base and (B) being a diagram of a state of mounting on a right side surface of the supporting base.
Figure 6:
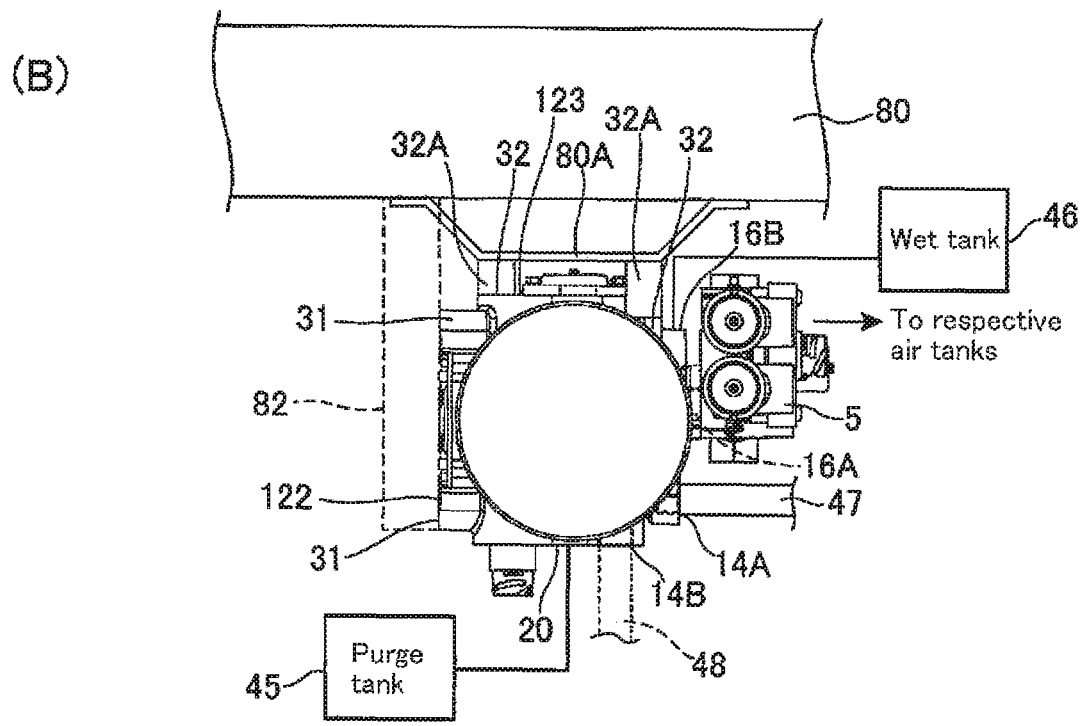

As shown in FIG. 4, the inner space 129 is put in communication with the first outlet 16A through a communicating hole 112 extending from the inner space 129. Also, as shown in FIG. 3, the inner space 129 is put in communication with a purge opening 20, provided in the left side surface 121 of the supporting base, through a purge hole 113. For example, a purge tank 45 (see FIG. 6) having a function of regenerating a drying agent may be connected to the purge opening 20.

As shown in FIG. 3, the dryer main body 13 includes a drying agent container 50 and an outer cover 70, which are positioned on the supporting base 12. The drying agent container 50 is a container that contains a granular drying agent 58 in the interior and a lower portion 51 is formed to be smaller in diameter than an upper portion 52. A filter element 57, which removes oil and dust in air, is located at a periphery of the lower portion 51. The outer cover 70 surrounds the outer side of the drying agent container 50 and defines a chamber 75 for storing compressed air between itself and the drying agent container 50. The large diameter upper portion 52 is formed to be slightly smaller than the inner diameter of the outer cover 70 and a gap between these serves as an air flow passage. A lower lid 60 that holds the filter element 57 is fixed to a lower portion of the outer cover 70, and the lower lid 60 includes a fitting hole 100 in which the inner ring portion 124 of the supporting base 12 is fitted and a plurality of small diameter hole portions 101 formed in a periphery of the fitting hole 100 and being in communication with the ring-shaped space 128.

An upper lid 61 is provided at an upper portion of the drying agent container 50. An opening 107, which puts the chamber 75 and the drying agent container 50 in communication, is formed in the upper lid 61. A check valve 62, which closes the opening 107, is arranged at the upper lid 61. The check valve 62 is urged to be in close contact with a lower surface 105 of the upper lid 61 by a spring member 63 fixed to an inner upper surface 103 of the outer cover 70.

The compressed air to be subject to the drying process flows into the ring-shaped space 128 from the first inlet 14A or the second inlet 14B and through the lateral hole 111 and the vertical holes 110 of the supporting base 12. Then from the ring-shaped space 128, the compressed air flows into the dryer main body 13 through the small diameter hole portions 101 and compressor oil and dust are removed by the filter element 57. The compressed air from which the oil, and the like, have been removed flows into the drying agent container 50 by the check valve 62 opening and is dehumidified by passing through the drying agent 58 inside the drying agent container 50. The dehumidified and dried compressed air reaches the protection valve 5 through the inner space 129, the communicating hole 11, and the first outlet 16A and is stored in the external air tank 6, 7, 8, and 9 through the protection valve 5.

In accompaniment with such a drying process, drain containing moisture, compressor oil, and dust is generated. The air dryer 10 includes a drain valve 90 for discharging such drain. As shown in FIG. 4, the drain valve 90 is located inside a drain valve housing hole 115 intersecting the lateral hole 111 and includes a control piston 92, which is integral to a valve member. The control piston 92 receives a force due to a valve spring 94 and a force in accordance with the pressure in a control chamber 96. A control command pressure from a pressure governor 40 (FIG. 3) built into the supporting base 12 is applied to the control chamber 96. As shown in FIG. 3, the pressure governor 40 includes a piston 41 that moves in accordance with a pressure change of the air pressure inside an air tank (that is, the pressure of the dried compressed air delivered from the outlet). The pressure governor 40 opens and closes a valve in accordance with the movement of the piston 41 to maintain the air pressure inside air tank within a predefined pressure range. When the pressure governor 40 opens the valve, it outputs the control command pressure to the control chamber 96 of the drain valve 90. When the control command pressure is output from the pressure governor 40, the control piston 92 moves and opens the drain valve 90. In accordance with the opening and closing of the drain valve 90, the drain containing moisture and oil is discharged, along with compressed air, to the exterior through an exhaust space 116 formed in the projecting portion 12A. To reduce the noise accompanying the discharge, a silencer 117 is provided in the exhaust space 116.

An air dryer such as described above is generally mounted in a narrow space of a vehicle. In many cases, this space differs according to the vehicle model on which the air dryer is to be mounted. Therefore with the conventional air dryer, for each vehicle on which the air dryer is to be mounted, a process of designing positions of a mounting portion and an inlet for compressed air that are in accordance with a mounting position in the vehicle and forming the mounting portion and the inlet on a supporting base is performed. The air dryer thus has problems of being poor in versatility and also being poor in productivity.

Figure 5:
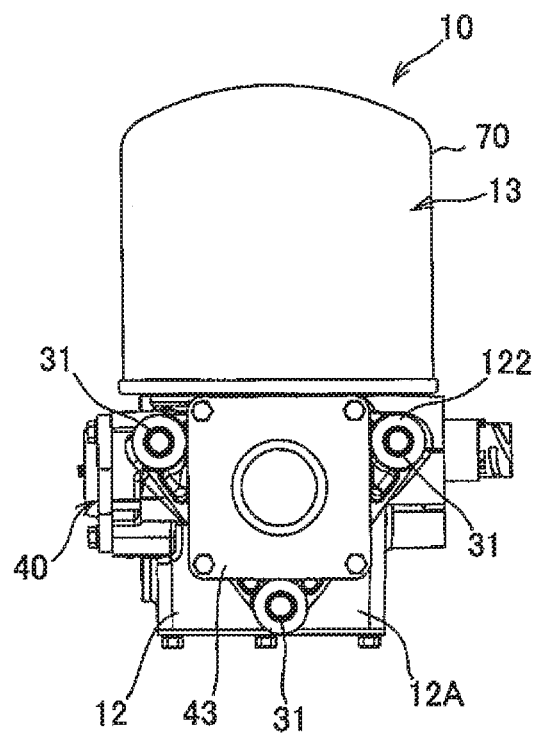
FIG. 5 shows the outer appearance of the air dryer, with (A) being a rear view, (B) being a left side view, and (C) being a right side view.
Figure 5:
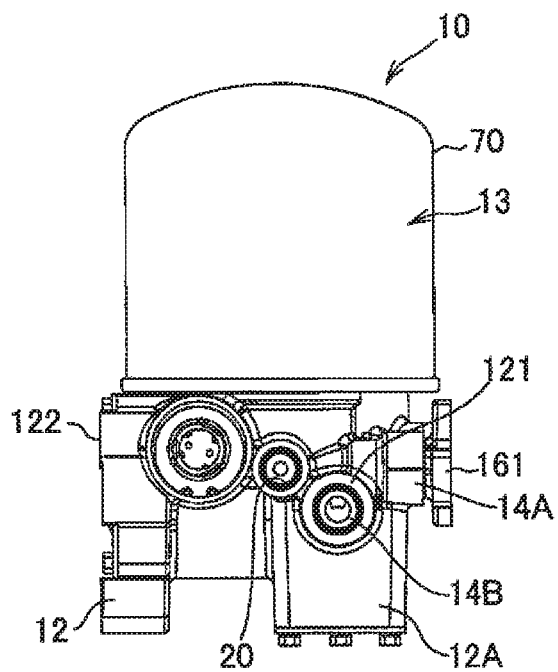
Figure 5:
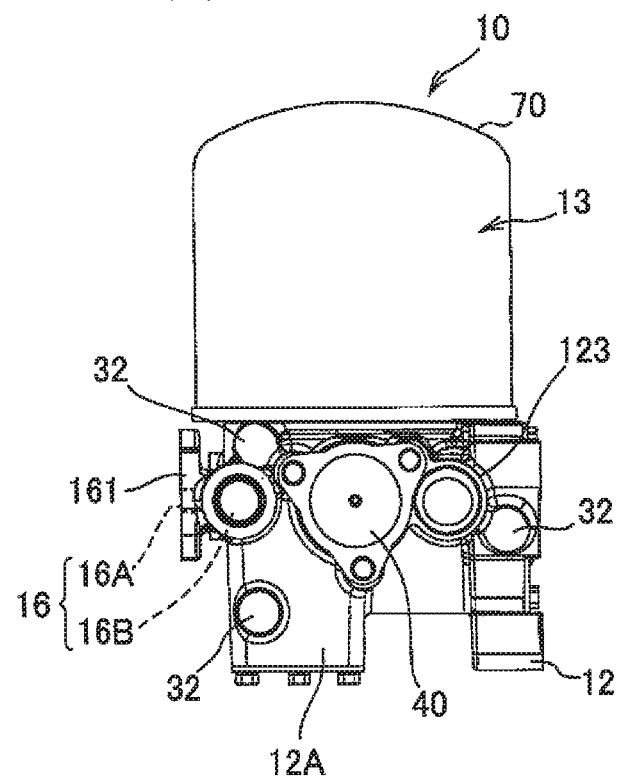

To resolve the above, the supporting base 12 of the air dryer 10 according to the present configuration includes a first mounting surface and a second mounting surface that are oriented in different directions. Specifically, as shown in FIGS. 5A and 5C, first mounting portions 31 are formed on the rear surface 122 of the supporting base 12 as the first mounting surface and second mounting portions 32 are formed on the right side surface 123 as the second mounting surface adjacent to the rear surface 122.

The first mounting portions 31 are provided in a triangular formation surrounding a periphery of a rectangular member 43 provided at the rear surface 122 of the supporting base 12, and threaded holes in which fixing bolts are screwed are formed in the first mounting portions 31. On the other hand, the second mounting portions 32 are formed in a triangular formation surrounding a periphery of the pressure governor 40, and threaded holes in which fixing bolts are screwed are also formed in the second mounting portions 32 as well. As shown in FIG. 2B, with the second mounting portions 32, end surfaces of the second mounting portions 32 are located at positions lower than the pressure governor 40 and therefore when mounting the air dryer 10 using the second mounting portions 32, collar members 32A (FIG. 6), through which fixing bolts penetrate, may be located between a vehicle body frame 80 (FIG. 6) or other mounting target member and the second mounting portions 32.

The second outlet 16B is formed in a corner portion of the right side surface 123 of the supporting base 12 that intersects the front surface 120, and the second outlet 16B is in communication with the first outlet 16A inside the supporting base 12. For example, a wet tank 46 (see FIG. 6) having a function of removing and accumulating moisture and oil in a simplified manner by expansion of the compressed air may be connected to the second outlet 16B.

Modes of mounting the air dryer 10 will now be described.

FIG. 6A is a diagram of a state of mounting the air dryer 10 on the vehicle body frame 80 using the rear surface 122 of the supporting base 12 and FIG. 6B is a diagram of a state of mounting the air dryer 10 on the vehicle body frame 80 using the right side surface 123 of the supporting base 12.

In FIGS. 6A and 6B, the vehicle body frame 80 is a frame of high rigidity that extends in the front/rear direction of a vehicle and the air dryer 10 is generally mounted on a side surface of the vehicle body frame 80 in many cases.

When as shown in FIG. 6A, the air dryer 10 is mounted on the vehicle body frame 80 via the first mounting portions 31 provided on the rear surface 122 of the supporting base 12, the first inlet 14A has its opening oriented in the width direction of the vehicle body and the second inlet 14B has its opening oriented in the front/rear direction of the vehicle body. Therefore, for example, by connecting a second supply piping 48 to the second inlet 14B, the second supply piping 48 is arranged along the vehicle body frame 80 and the piping can thus be routed in a neatly arranged manner without the second supply piping 48 projecting greatly in the vehicle width direction. Also, even in this case, by connecting the first supply piping 47 to the first inlet 14A, for example, piping connection that circumvents equipment (not illustrated) located adjacent to the air dryer 10 can be performed easily.

Also, if the air dryer 10 cannot be mounted directly on the vehicle body frame 80, a bracket 81 extending in the vehicle width direction from the vehicle body frame 80 may be provided as indicated by broken lines in FIG. 6A and the air dryer 10 may be mounted on the bracket 81 using the right side surface 123 of the supporting base 12. In this case, the collar members 32A are preferably located between the second mounting portions 32 provided on the right side surface 123 and the bracket 81. With this configuration, the air dryer 10 is mounted in the same attitude as in the case of mounting on the vehicle body frame 80 using the rear surface 122 of the supporting base 12.

On the other hand, if the air dryer 10 is to be mounted on the vehicle body frame 80 using the right side surface 123 of the supporting base 12, a stay 80A is fixed to the vehicle body frame 80 as shown in FIG. 6B and mounting on the stay 80A is performed via the second mounting portions 32 provided on the right side surface 123 of the supporting base 12. Similarly in this case, the collar members 32A are preferably located between the second mounting portions 32 provided on the right side surface 123 and the bracket 81. The supporting base 12 of the air dryer 10 may be mounted directly on the vehicle body frame 80.

In the present mode, the first inlet 14A has its opening oriented in the front/rear direction of the vehicle body. The second inlet 14B has its opening oriented in the width direction of the vehicle body. Therefore, for example, by connecting the first supply piping 47 to the first inlet 14A, the first supply piping 47 is arranged along the vehicle body frame 80 and the piping can thus be routed in a neatly arranged manner without the first supply piping 47 projecting greatly in the vehicle width direction. Also, even in this case, by connecting the second supply piping 48 to the second inlet 14B, for example, piping connection that circumvents equipment (not illustrated) located adjacent to the air dryer 10 can be performed easily.

Also, if the air dryer 10 cannot be mounted directly on the vehicle body frame 80 and the stay 80A, a bracket 82 extending in the vehicle width direction from the vehicle body frame 80 may be provided as indicated by broken lines in FIG. 6B and the air dryer 10 may be mounted on the bracket 82 using the rear surface 122 of the supporting base 12. With this configuration, the air dryer 10 is mounted in the same attitude as in the case of mounting on the vehicle body frame 80 using the right side surface 123 of the supporting base 12.

As described above, the present embodiment includes the supporting base 12, the drying agent container 50, and the outer cover 70. The supporting base 12 includes the inlet 14 receiving the compressed air to be subject to the drying process and the outlet 16, which delivers the processed compressed air that has been subject to the drying process. The drying agent container 50 is supported on the supporting base 12, contains the drying agent 58 in the interior, and enables the drying process to be performed by passage of the compressed air from the inlet 14 through the drying agent 58. The outer cover 70, surrounds, on the supporting base 12, the outer side of the drying agent container 50 and defines the chamber 75 for storing the compressed air between itself and the drying agent container 50. The supporting base 12 includes the rear surface 122 as the first mounting surface and the right side surface 123 as the second mounting surface, which are oriented in different directions and respectively have the first mounting portions 31 and the second mounting portions 32 formed thereon. The supporting base 12 also includes the first inlet 14A and the second inlet 14B, which are oriented in different directions and receive the compressed air. By selecting, in the process of mounting the supporting base 12 on the vehicle body frame 80 that is the mounting target, one of either the rear surface 122 or the right side surface 123 and one of either the first inlet 14A or the second inlet 14B, the variation of combinations of the mounting surface and the inlet is increased and mounting of the air dryer 10 on diverse mounting positions can be performed easily with the same configuration. Also, improvement of the versatility and productivity of the air dryer 10 is achieved because the air dryer 10 of the same configuration is mounted on diverse mounting positions.

Also, with the present embodiment, the first and second mounting surfaces are formed on the mutually adjacent rear surface 122 and right side surface 123 among the side surfaces of the supporting base 12 and therefore the supporting base 12 can be easily changed in position with respect to and mounted on the mounting target. Also, the first inlet 14A and the second inlet 14B are collectively located at the corner portion, at which the front surface 120 and the left side surface 121 of the supporting base 12 intersect and which is positioned away from the rear surface 122 and the right side surface 123, and therefore in connecting the supply piping to either the first inlet 14A or the second inlet 14B, the piping connecting process can be performed readily without interference of the supply piping and the vehicle body frame 80 on which the rear surface 122 or the right side surface 123 is mounted.

Also, with the present embodiment, the first outlet 16A is located on the front surface 120 of the supporting base 12, which faces the rear surface 122 of the supporting base 12, and therefore a process of mounting equipment, such as the protection valve 5, and the like, on the first outlet 16A can be performed easily.

Although the best embodiment for carrying out the present invention has been described above, the present invention is not restricted to the described embodiment and various modifications and changes are possible based on the technical idea of the present invention. For example, although in the present embodiment, between the first inlet 14A and the second inlet 14B, a sealing stopper (non-illustrated) is located at the inlet that is not used, the present invention is not restricted thereto. For example, a plurality of planned opening portions corresponding to a plurality of inlets may be provided in a manufacturing stage and a hole may be bored in any of the planned opening portions to form an inlet in accordance with the mounting conditions of the supporting base 12.

With this configuration, a hole is bored in the planned opening portion for the inlet that is known in advance to be actually used and working processes are reduced and workability is improved correspondingly. Further, with this configuration, a hole is not bored in the planned opening portion for an inlet that is not used and the process of closing off this inlet with a sealing stopper, and the like, is made unnecessary and air leakage from the inlet is prevented reliably.

Also, although the present embodiment is arranged with the flange 161 being formed at the periphery of the first outlet 16A provided on the front surface 120 of the supporting base 12, the protection valve 5 being mounted on the flange 161, and the wet tank 46 being connected to the second outlet 16B provided on the right side surface 123 of the supporting base 12, the present invention is not restricted thereto, and the wet tank 46 or the protection valve 5 may be made selectively mountable on the first outlet 16A. If the wet tank 46 is to be mounted on the first outlet 16A, the protection valve 5 may be mounted in series to the wet tank 46. With this configuration, the equipment mounted on the first outlet 16A can be selected in accordance with the mounting conditions of the supporting base 12 and the arrangement of peripheral equipment and diverse air circuit layouts is realized.

An embodiment of the present invention for achieving the second object will now be described based on drawings. The embodiment described below is merely an embodiment and the embodiment will be described on the premise that it is not restrictive of the present invention.

Figure 7:
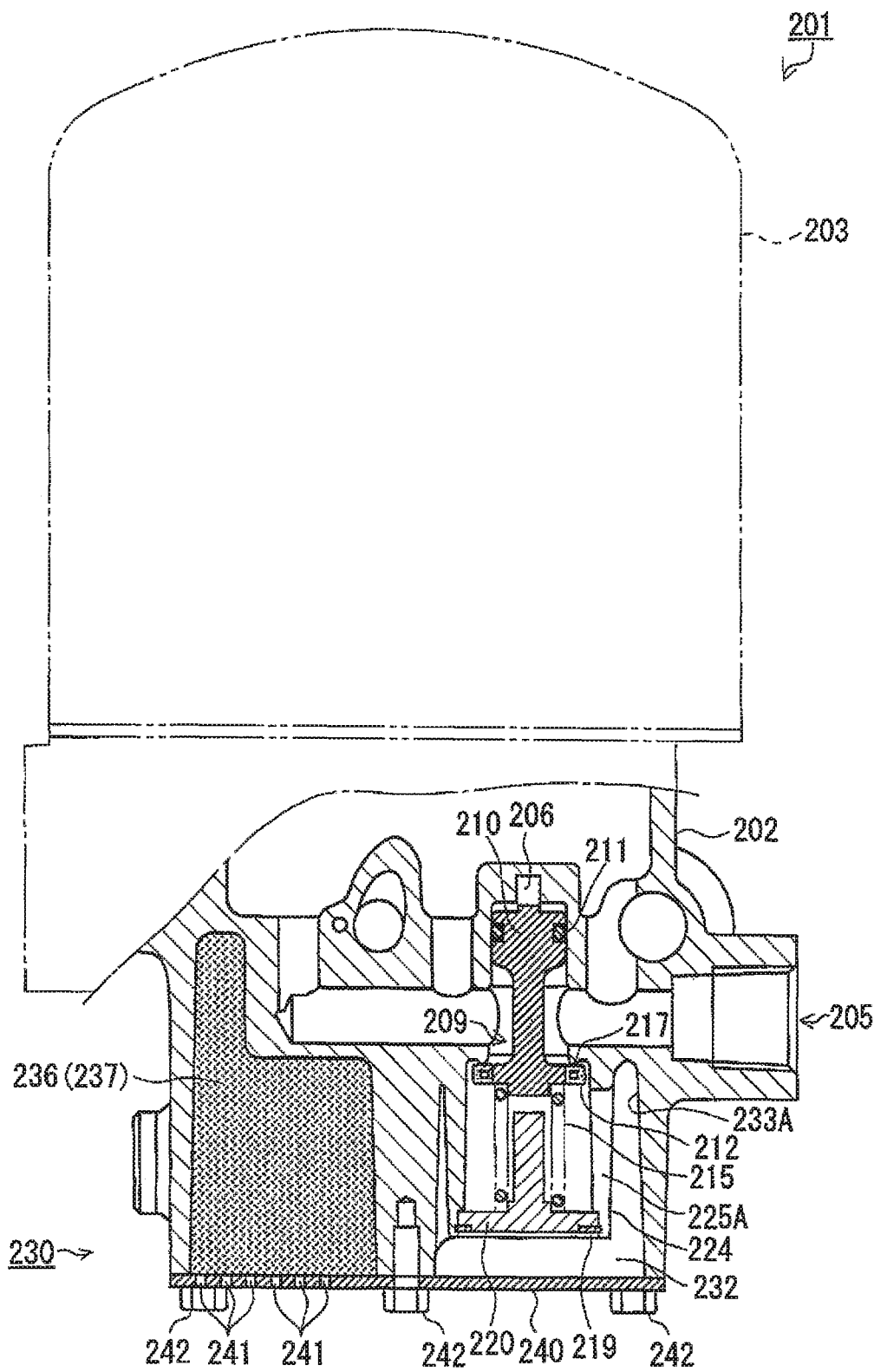
FIG. 7 is a cross-sectional view of a portion of an air dryer and a silencer according to the present invention.
Figure 8:
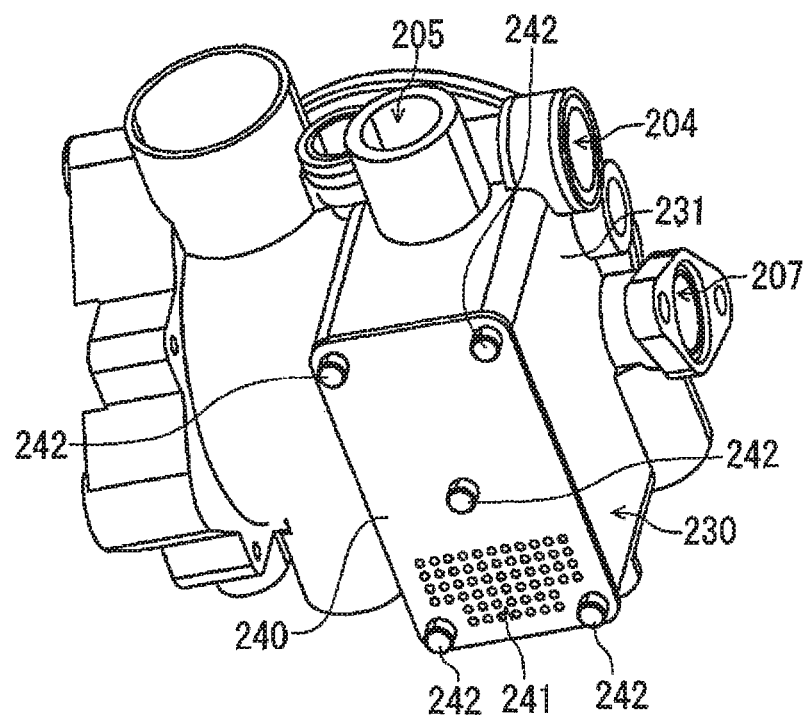
FIG. 8 is a perspective view of the silencer according to the present invention, with (A) showing the silencer as viewed from below and (B) showing a state where a lid member forming the silencer is opened.
Figure 8:
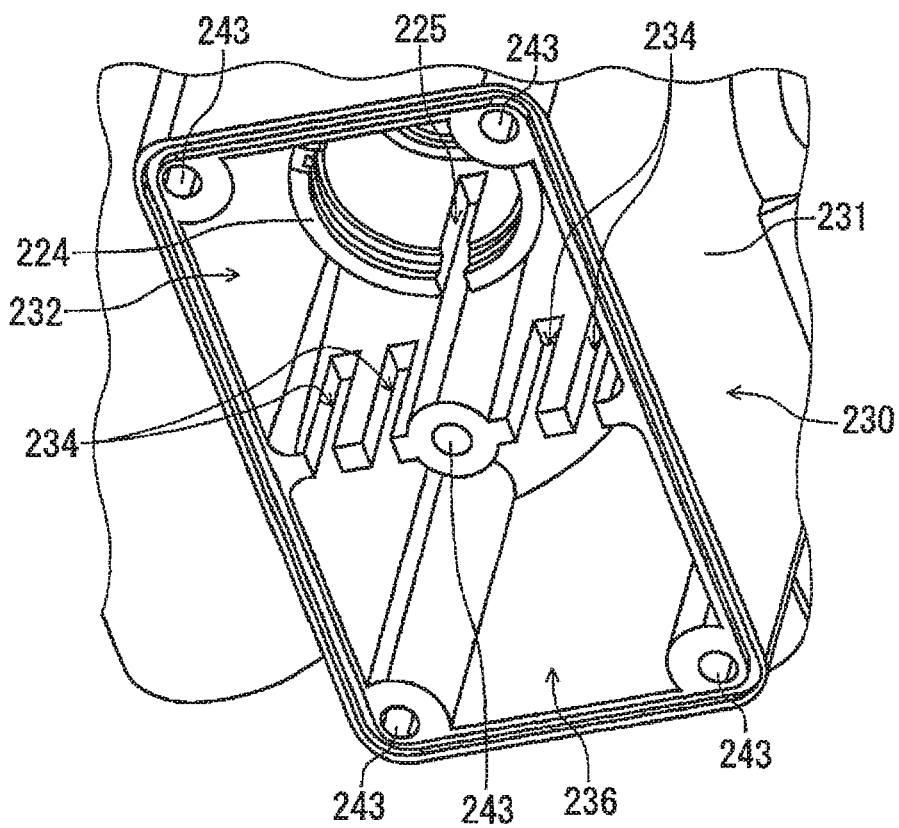
Figure 9:
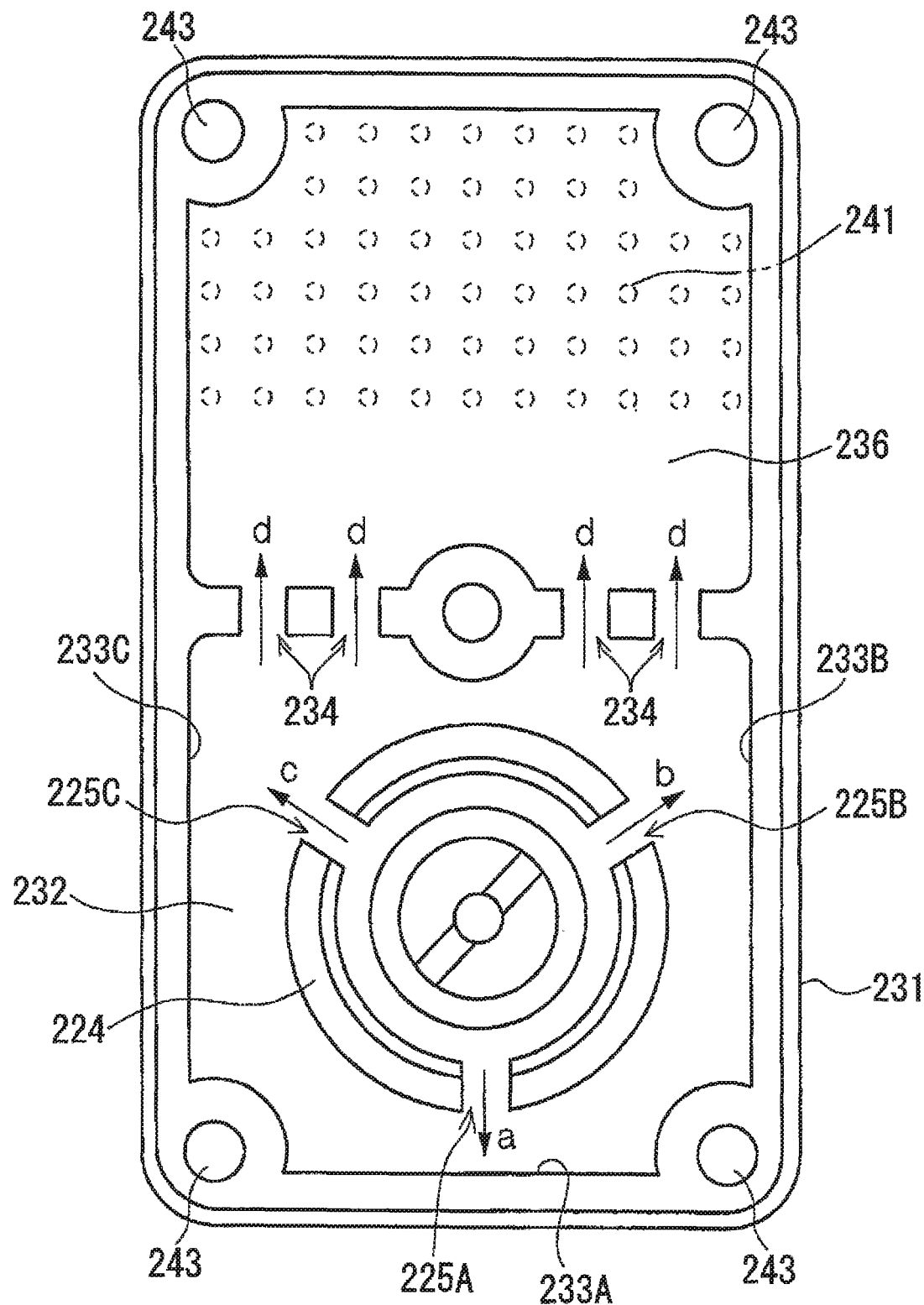
FIG. 9 is a plan view of the state where the lid member forming the silencer according to the present invention is opened.

FIG. 7 is a cross-sectional view of a portion of an air dryer 201 according to the present invention and a silencer 230 according to the present invention, FIG. 8(A) is a perspective view of the silencer 230 as viewed from below, FIG. 8(B) is a perspective view of a state where a lid member 240 forming the silencer 230 is opened, and FIG. 9 is a plan view of the silencer 230 in the state where the lid member 240 is opened. In the drawings, lines are omitted as necessary to prevent the drawings from becoming complicated.

The air dryer 201 includes a drying portion 203 at an upper portion of a base member 202 (for example, a metal molded part made of aluminum or an alloy, and the like) that is to be a base. Compressed air discharged from a non-illustrated air compressor is taken into the interior of the air dryer 201 from a first air intake port 204 (FIG. 8(A)) formed in the base member 202. In addition to the first air intake port 204, the compressed air discharged from the non-illustrated compressor is also taken in from a second air intake port 205 and is guided to an exhaust valve 209 to be described below.

The compressed air taken into the interior of the air dryer 201, and moisture and oil are removed from the air in the drying portion 203 The air is then output from an output port 207 (FIG. 8A), stored in a non-illustrated external air tank, and used as necessary for driving an air driven device, such as an air brake, and the like The configuration of the drying portion 203 is the same as that of a publicly known configuration and therefore illustration and description of the detailed configuration of the interior thereof will be omitted.

Some of the compressed air, from which moisture and oil have been removed in the air dryer 201, is also supplied to a pressure governor (non-illustrated) built into the air dryer 201. The non-illustrated pressure governor outputs a control command pressure for opening the exhaust valve 209, which is located at a lower portion of the air dryer 201, to a control chamber 206 when the compressed air supplied from the compressor to the air dryer 201 reaches a predetermined upper limit pressure.

When the exhaust valve 209 is opened, the air inside the drying portion 203 is discharged to the exterior from a final discharge outlet (micropores 241) via an expansion chamber 232 and a noise absorbing material housing chamber 236 to be described below. The exhaust in this process is rapid and the rapid exhaust cleans an oil filter (non-illustrated) inside the drying portion 203 and also discharges drain, which contains moisture, oil, and the like, and has accumulated in an upper portion of a valve element 212 of the exhaust valve 209, to the exterior.

Also, the dry-processed air inside the drying portion 203 flows in reverse through a drying process passage (non-illustrated) inside the drying portion 203 to be discharged to the exterior while taking up moisture from a drying agent (non-illustrated) inside the drying portion 203 and regeneration of the drying agent is thereby achieved. When the control pressure from the pressure governor decreases and the exhaust valve 209 closes due to a decrease of the pressure inside the control chamber 206, the interior of the drying portion 203 returns to the compressed air drying process state.

The exhaust valve 209 and a configuration (a principal portion of the present invention) at the downstream side of an exhaust flow passage with respect to the exhaust valve 209 will now be described. The exhaust valve 209 includes a valve body formed by integrally mold-forming a piston 210 formed of a metal material and a valve element 212 formed of an elastic material. Reference numeral 211 denotes an O-ring for sealing.

Also, reference numeral 217 denotes a valve seat, and the opening and closing of the exhaust valve 209 are performed by switching between a state where the valve element 212 is pressure-contacted against the valve seat 217 and a state where the valve element 212 is separated from the valve seat 217 by vertical movement of the piston 210.

Reference numeral 15 denotes a return spring that urges the valve body, which is formed by the piston 210 and the valve element 212, in a closing direction and the valve body is thereby maintained in a closed valve state when the air compressor is in the loaded state. Reference numeral 220 denotes a seat for the return spring 15 and reference numeral 19 denotes C-ring for fixing the seat 220.

Until the dry air stored in the non-illustrated air tank reaches a predetermined pressure, that is, until the control command pressure (pressure inside the control chamber 206) from the non-illustrated pressure governor reaches the predetermined pressure, the exhaust valve 209 must be maintained in the valve closed state. Also, when the control command pressure (pressure inside the control chamber 206) from the non-illustrated pressure governor reaches the predetermined pressure, the exhaust valve 209 must be put in the valve open state without fail.

The pressure receiving area of the exhaust valve 209 for receiving the control pressure from the pressure governor (pressure inside the control chamber 206), the pressure receiving area of the exhaust valve 209 for receiving the pressure of the compressed air taken in from the second air intake port 205, and the urging force of the return spring 15, which urges the piston 210, are designed based on the above standpoints.

Next, a primary discharge outlet for exhaust air from the exhaust valve 209 is formed by slits 225A to 225C formed in a cylindrical body 224. That is, the cylindrical body 224 is formed integral to the base member 202, the plurality of slits (225A to 225C) extending in the cylindrical axis direction (vertical direction in FIG. 7) are formed at predetermined intervals in the circumferential direction, and drain and air are discharged from the slits 225A to 225C.

The cylindrical body 224 is configured such that its periphery is surrounded by a silencer case portion 231, which forms the silencer 230, and the inner side of the silencer case portion 231 is defined as the expansion chamber 232. That is, the expansion chamber 232 is in a state of being connected to the primary discharge outlet that discharges the air (and the drain) from the exhaust valve 209.

In the present embodiment, the silencer case portion 231, which defines the expansion chamber 232, is also formed integral to the base member 202 as is the cylindrical body 224, and the silencer case portion 231 (the expansion chamber 232 and the noise absorbing material housing chamber 236 to be described below) is formed to have a rectangular shape.

By the configuration described above, the exhaust air discharged from the slits 225A to 225C is made to enter the expansion chamber 232 and is particularly made to hit inner walls 233A to 233C of the expansion chamber 232 (the flow of the exhaust air at this point is indicated by arrows a, b, and c in FIG. 9).

The slits 225A to 225C respectively face the inner walls 233A to 233C of the expansion chamber 232, and the air discharged from the respective slits 225A to 225C is made to hit different inner walls 233A to 233C inside the expansion chamber 232.

That is, the discharged air from the exhaust valve 209 is branched into a plurality of flow passages and hits the inner walls inside the expansion chamber 232 under respectively different conditions, thereby enabling the "noise range" in the process of discharge of air from the plurality of slits 225A to 225C to be dispersed, and a better silencing effect can thereby be obtained.

By arranging so that at least either the angles or the distances by which the air discharged from the plurality of slits 225A to 225C hits the different inner walls 233A to 233C inside the expansion chamber 232 differ, an even better silencing effect is obtained. Also, the respective slits 225A to 225C may be formed to differ in slit width.

However, there is an adverse effect on air discharge if the total air discharging ability of the slits 225A to 225C is lower than the ability to discharge air from the exhaust valve 209, and it is thus preferable to set the number and opening sizes of the slits at least so as not to hinder the ability to discharge air from the exhaust valve 209.

Although three slits (slits 225A to 225C) are formed in the present embodiment, the number of slits is obviously not restricted thereto. Also, the respective positions at which the slits are formed as shown in FIG. 9 are obviously an example and the positions are not restricted thereto. Also, although the inner walls 233A to 233C are configured to be in one-to-one correspondence with the respective slits 225A to 225C in the present embodiment, the configuration is not restricted thereto and, for example, a single inner wall may be configured to correspond to a plurality of slits.

Next, the noise absorbing material housing chamber 236 is connected to the expansion chamber 232. As with the expansion chamber 232, the noise absorbing material housing chamber 236 is defined by the silencer case portion 231 and the exhaust air is configured to pass through slits 34 formed between the expansion chamber 232 and the noise absorbing material housing chamber 236 (the flow of the exhaust air in this process is indicated by arrows d in FIG. 9).

A noise absorbing material 237 (illustrated by hatching in FIG. 7 and omitted from illustration in FIGS. 8 and 9 for simplification of the drawings) is provided in the noise absorbing material housing chamber 236 and further reduction of the air exhaust noise is achieved by the noise absorbing material 237.

Any of various materials may be used as such a noise absorbing material 237 and in the present embodiment, a porous material, such as a sponge, and the like, is used. By using a porous material, such as a sponge, and the like, an even better silencing effect is obtained by the discharged air passing through numerous pores. However, this is just one example and any of other various noise absorbing materials may be used and, for example, crushed aluminum, and the like, may be used.

Next, the expansion chamber 232 and the noise absorbing material housing chamber 236 are formed to a closed space by the lid member 240, and the numerous micropores 241 forming the final discharge outlet for discharging the drain and air to the exterior are formed so that openings thereof are directed vertically downward at positions of the lid member 240 corresponding to the noise absorbing material housing chamber 236.

Since all the numerous micropores 241 for discharging air to the exterior in the final stage are formed to open only vertically downward in the present embodiment, the air discharge noise is emitted downward and the air discharge noise can thereby be made difficult to hear. Reference numeral 242 denotes bolts for fixing the lid member 240 to the base member 202 and reference numeral 243 denotes bolt holes therefor.

As described above, with the silencer 230 according to the present embodiment, a high silencing effect is obtained by a synergistic effect of the air discharge noise attenuating effect due to the discharged air from the exhaust valve 209 hitting the inner walls 233A to 233C inside the expansion chamber 232 and the noise absorbing effect due to the noise absorbing material 37.

Also, with the present embodiment, the cylindrical body 224 forming the primary discharge outlets (slits 225A to 225C), the expansion chamber 232, and the noise absorbing material housing chamber 236 are formed integrally on the base member 202 forming the base of the air dryer 201. Therefore cost reduction of the air dryer with silencer is achieved and the volume occupied by the silencer 230 itself is reduced.

Also, by forming the components of the silencer 230 integrally on the base member 202 forming the base of the air dryer 201, the strength is ensured readily and an even better silencing effect is obtained by making the discharged air hit a rigid body. However, the present invention is not restricted to such an embodiment, and obviously, the respective components of the silencer 230 may be arranged as members independent of the base member 202, and the silencer 230 may be configured to be mounted on the base member 202 when being arranged as an independent body. In such cases, the slits 225A to 225C described with the present embodiment may also be formed not in the base member 202 but at the silencer 230.

An embodiment of the present invention for achieving the third object will now be described based on drawings. The embodiment described below is merely an embodiment and will be described on the premise that it is not restrictive of the present invention.

Figure 10:
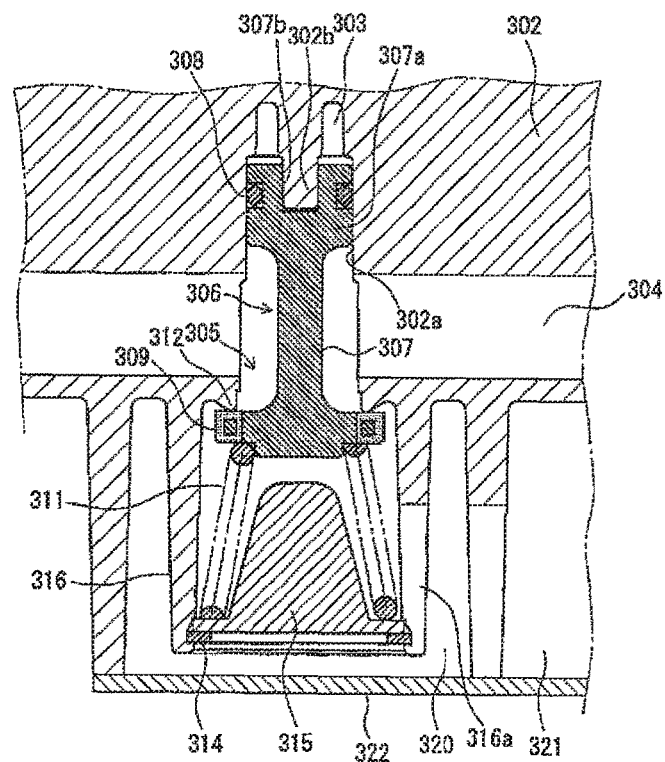
FIG. 10 is a cross-sectional view of an exhaust valve according to the present invention (valve closed state)
Figure 11:
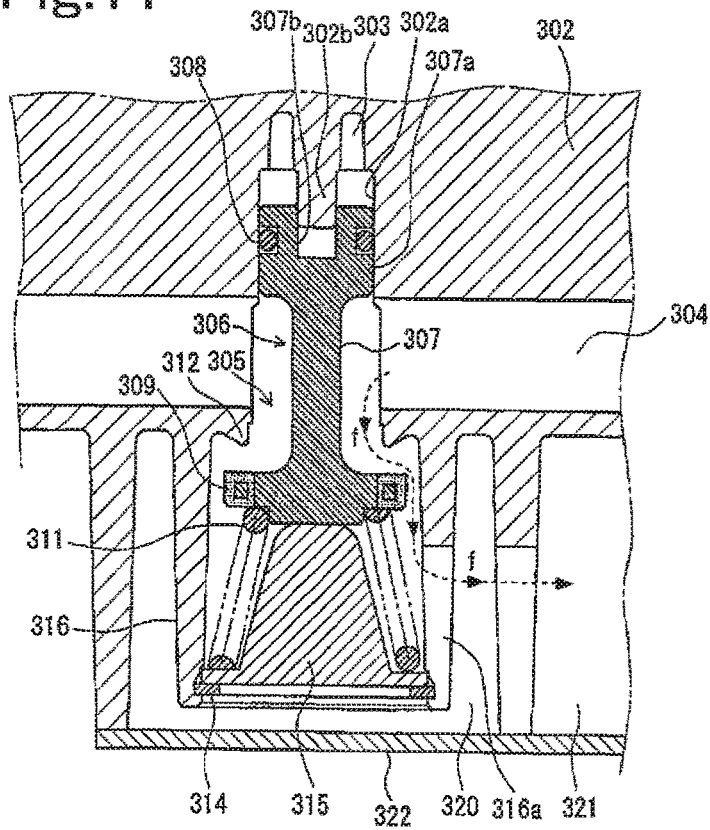
FIG. 11 is a cross-sectional view of the exhaust valve according to the present invention (valve open state)

FIGS. 10 and 11 are cross-sectional views of an exhaust valve 305 according to the present invention, with FIG. 10 showing a valve closed state and FIG. 11 showing a valve open state. In the drawings, lines are omitted as necessary to prevent the drawings from becoming complicated. Also, other configurations of the air dryer except the exhaust valve 305 are the same as those of the air dryer according to the conventional art described with reference to FIG. 12 and therefore illustration of such components will be omitted in FIGS. 10 and 11 and description thereof will also be omitted below.

In FIGS. 10 and 11, reference numeral 303 denotes a control chamber to which a control command pressure is output from a pressure governor (non-illustrated), reference numeral 305 denotes a pressure chamber receiving the pressure of compressed air supplied from an air compressor (non-illustrated), and these respectively correspond to the control chamber 355 and the pressure chamber 354 in the exhaust valve 356 according to the conventional art described with reference to FIG. 12.

Reference numeral 302 denotes a base member (for example, a metal molded part made of aluminum or an alloy, and the like) that makes up a base of the air dryer, and an upper portion 307a of a piston 307 to be described below is inserted in a manner enabling sliding up and down in an opening 302a formed in the base member 302. A projecting guide portion 302b is formed on the base member 302, a guided hole 307b is formed in an upper portion of the piston 307, and by the guide portion 302b entering the guided portion 307b, the piston 307 is guided by the guide portion 302b during vertical movements of the piston 307.

Also, with the present embodiment, a valve seat 312 is cited as a characteristic point of the configuration formed in the base member 302. That is, the valve seat 312 is formed using a portion of the base member 302, in other words, is formed integral to the base member 302.

Next, with the exhaust valve 305 according to the present invention, the piston 307 and a valve element (seal) 309 are formed integrally by mold forming, and a valve body 306 is formed by the piston 307 and the valve element 309. The valve element (seal) 309 is formed of an elastic material and the piston 307 is formed of a metal material.

Figure 12:
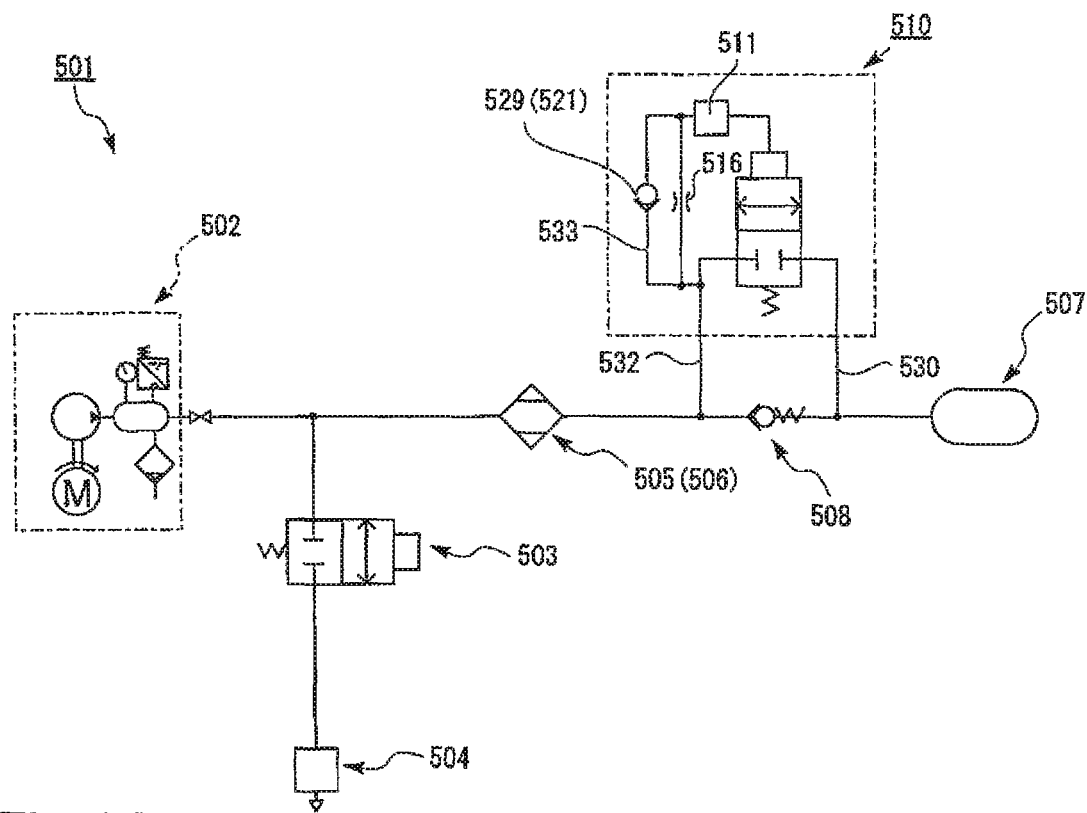
FIG. 12 is a diagram of a piping of a vehicle that includes a valve device according to the present embodiment.

Unlike the exhaust valve 356 according to the conventional art shown in FIG. 12, the exhaust valve 305 according to the present invention is arranged so as to receive a pressing force in a valve opening direction by the air pressure received from the pressure chamber 304. Therefore in the loaded state of the air compressor (non-illustrated), the exhaust valve 305 is configured to be maintained in a valve closed state by the urging force of a return spring (which urges the piston 307 in the valve closed state) as an urging means indicated by reference numeral 311.

When receiving the control command pressure from the pressure governor (non-illustrated), the pressure inside the control chamber 303 causes the exhaust valve 305 to move downward against the urging force of the return spring 311 and the valve open state is attained where the compressed air is discharged via a pathway indicated by arrows fin FIG. 11. Reference numeral 316 denotes a cylindrical body formed integral to the base member 302, reference numeral 315 denotes a seat of the return spring, and reference numeral 314 denotes a C-ring fixing the seat 315.

Also, reference numeral 316a denotes a slit formed in the cylindrical body 16 and reference numeral 320 denotes an expansion chamber. The air discharged via the exhaust valve 305 is guided via the slit 316a and the expansion chamber 320 to a noise absorbing material housing chamber indicated by reference numeral 321. The noise absorbing material housing chamber 321 is filled with a noise absorbing material, such as a porous material, and the like, and the exhaust air is discharged to the exterior via the noise absorbing material and from a non-illustrated discharge hole formed in a lid member 22.

The exhaust valve 305 must be maintained in the valve closed state until the control pressure (pressure inside the control chamber 3) from the non-illustrated pressure governor reaches a predetermined pressure. Also, when the control pressure (pressure inside the control chamber 3) from the non-illustrated pressure governor reaches the predetermined pressure, the valve open state must be attained without fail.

The pressure receiving area of the valve body 306 for receiving the control pressure from the pressure governor (pressure inside the control chamber 303), the pressure receiving area of the valve body 306 for receiving the pressure of the compressed air in the pressure chamber 304, and the urging force of the return spring 311 which urges the valve body 306, are designed based on the above standpoints.

As described above, with the exhaust valve 305 according to the present invention, the valve body 306 has the structure of being pressed not in the valve closing direction but in the valve opening direction by the pressure of the compressed air supplied from the air compressor. The valve closed state is maintained by the urging force of the return spring 311 when the air compressor is in the loaded state so that the piston 307 is not required to be formed to a T-like shape that is large in diameter at an upper portion from the standpoint of pressure receiving area as in the exhaust valve according to the conventional art described with reference to FIG. 12.

There is thus no need to ensure a large size for the opening 302a for housing the piston 307, and the large-diameter valve base (reference numeral 364 in FIG. 12), which is conventionally required, is made unnecessary. This contributes to cost reduction and enables improvement of the strength by lessening of pressure receiving members. The need to arrange the valve body 306 from several members due to reasons of assembly is also eliminated and the valve body 306 can be formed by just the piston 307 and the valve element 309 in the present embodiment, thereby enabling the structure of the exhaust valve to be simplified and cost reduction to be achieved as well.

In addition, with the present embodiment, the valve seat 312 is formed using a portion of the base member 302 of the air dryer; that is, the valve seat is formed integral to the base member 302 so that the exhaust valve can be made even simpler in structure to achieve cost reduction. Although the valve seat 312 is formed using a portion of the base member 302 in the present embodiment, it is not restricted thereto and may be provided on another member.

Further in addition, the valve body 306 has the structure of being pressed not in the valve closing direction but in the valve opening direction by the pressure of the compressed air supplied from the air compressor as described above. Also, the valve body 306 is configured such that the valve closed state is maintained by the urging force of the return spring 311 when the air compressor is in the loaded state, and the valve is thus opened when the pressure of the compressed air becomes an abnormal pressure when the air compressor is in the loaded state. The exhaust valve 305 can thus be used as a safety valve.

An embodiment of the present invention for resolving the fourth problem will now be described based on drawings.

FIG. 12 is a diagram of an example of a piping configuration of a truck or other vehicle that includes a valve device according to the present embodiment. Principal portions of the configuration of the present invention are illustrated, and other members and flow passages for gas are omitted from illustration.

As shown in FIG. 12, an air processing system 501 provided in a brake system of the vehicle of the present embodiment includes a regeneration valve device 510 (hereinafter referred to simply as "valve device") having an air feeding time adjusting function and a drying portion 505. The piping configuration of the air processing system 501 of the present embodiment may be used as an air brake system for a truck or other commercial vehicle or as an air conditioning system for a general automobile.

Specifically, the air processing system 501 includes a compressor 502, which is a gas compressor, a gas tank 507 for the system, the valve device 510, the drying portion 505, an exhaust valve 503, which is a gas discharging portion, and a silencer 504. Among these, the compressor 502 is provided to compress a gas and deliver the compressed gas. Also, the gas tank 507 can store a dried gas and is configured to be used, for example, in an air brake system, and the like. Yet further, the valve device 510 is put in a valve closed state when the pressure of the gas is not acting and is configured to be capable of being switched between a valve open state and closed state by a pilot command.

Also, the drying portion 505 has a drying agent 506 in the interior and is provided to be capable of drying the gas that passes through. Yet further, the exhaust valve 503 is normally put in a valve closed state and is configured to be capable of being switched between a valve open state and closed state by a pilot command from a non-illustrated pressure governor. Also, the silencer 504 is provided to reduce the noise generated when the gas is discharged.

One side of the valve device 510 with reference to the valve is connected to the gas tank 507 by a first flow passage 530. The other side is connected to the drying portion 505 by a second flow passage 532. Further, the first flow passage 530 and the second flow passage 532 are connected by a first check valve 508.

"Check valve" refers to a valve that is configured to be capable of allowing a flow in one direction and stopping a flow in the opposite direction.

In the present embodiment, the first check valve 508 is provided to allow the flow from the drying portion 505 to the gas tank 507 and stop the flow from the gas tank 507 to the drying portion 505.

The first check valve 508 is a valve with a spring. When a pressure not less than a predetermined pressure acts, the gas flows from the drying portion 505 to the gas tank 507 against the urging force of the spring.

Also, the compressor 502 and the exhaust valve 503 are connected to the side of the drying portion 505 opposite to the side connected to the valve device 510. Yet further, the silencer 504 is connected to the side of the exhaust valve 503 opposite to the side connected to the drying portion 505 and the compressor 502.

The configuration and operation of the valve device 510 will now be described in detail.

As will be described in detail below, the valve device 510 has a first hole portion 516 used for air venting and filling and a second check valve 529 having a function of a check valve in a third flow passage 533 parallel to the flow passage used for air venting and filling. In the present embodiment, a piston cup 521 (see FIG. 13 to FIG. 16) corresponds to the second check valve 529.

In a state where the exhaust valve 503 is closed, the compressed gas from the compressor 502 is delivered to the drying portion 505 and the compressed gas is dried by the drying portion 505. The dried compressed gas is then delivered into the gas tank 507 via the first check valve 508. In this process, the dried compressed gas also flows into the valve device 510 and switches the valve of the valve device 510 to the open state. Specifically, the dried compressed gas flows from the second flow passage 532 into a chamber of the valve device 510 main body via the second check valve 529 of the third flow passage 533 and the first hole portion 516. The valve of the valve device 510 is thereby switched to the open state. The dried compressed gas is thus delivered into the gas tank 507 via the valve device 510 as well.

Figure 17:
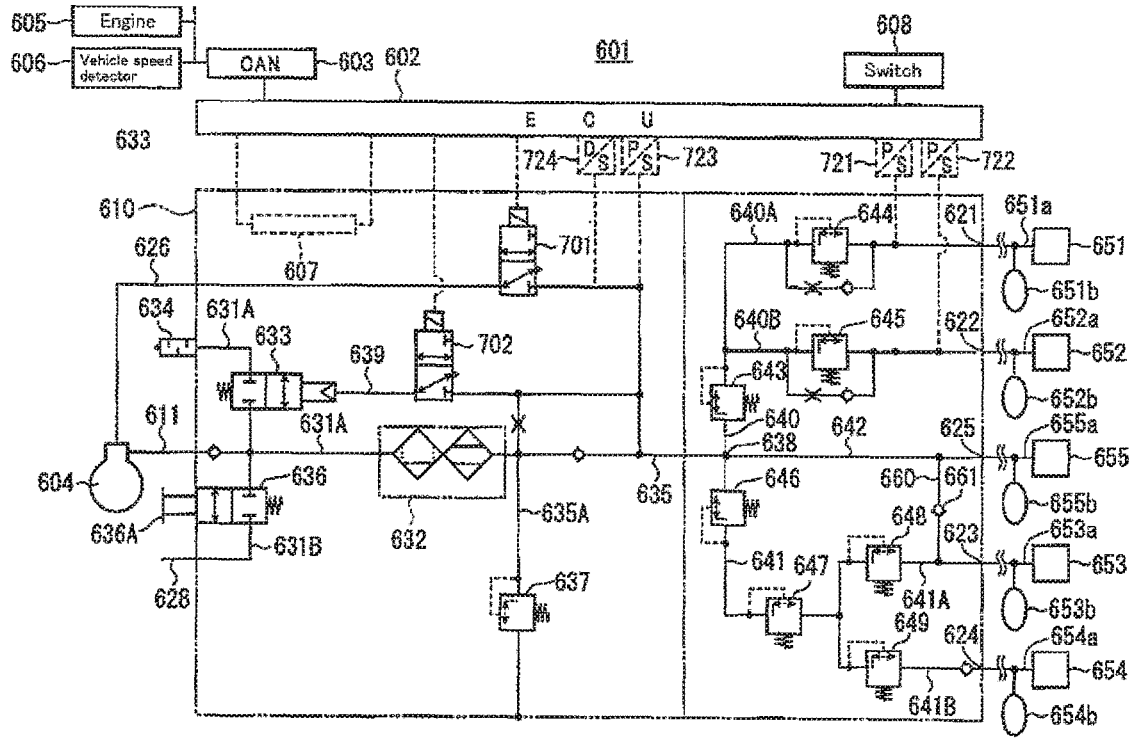
FIG. 17 is a diagram of a configuration of a compressed air supply system according to the present embodiment.

With the present configuration, the gas flows into the chamber not only via the first hole portion 516 but also via the second check valve 529 of the third flow passage 533. Therefore in comparison to the above-described configuration (see FIG. 17) in which the gas flows in only via the hole portion 42 (see FIG. 17), the valve of the valve device 510 can be switched from the closed state to the open state at a faster timing. The requirement of rapid air filling can thus be satisfied.

Also, with the present configuration, the dry compressed gas is stored in the gas tank 507. When the pressure in the gas tank 507 reaches a set pressure, the non-illustrated pressure governor generates the control pressure as an air pressure signal and switches the exhaust valve 503 to the open state. The compressed gas from the compressor 502 is thereby discharged to the atmosphere from the exhaust valve 503 and the silencer 504. Also, the dry compressed gas in the gas tank 507 flows through the valve device 510 in reverse for just a predetermined time to regenerate the drying agent 506 in the drying portion 505.

The valve device 510 is configured to activate the air feeding time adjusting function in this process to cause the dry compressed air to flow in reverse for the predetermined time. As will be described in detail below, when the valve of the valve device 510 is put in the open state and the dry compressed gas begins to flow in reverse, the gas flowing into the chamber is gradually vented from the first hole portion 516 into the second flow passage 532. As the air feeding time adjusting function, the valve device 510 is configured to be switched to the closed state when the predetermined time (for example, 30 seconds) elapses.

The gas used for regeneration is discharged to the atmosphere from the exhaust valve 503. Thereafter, when the value of the pressure in the gas tank 507 falls below the set value due to use of the air brake, and the like, the non-illustrated pressure governor switches the exhaust valve 503 to the closed state. The dry compressed air is thereby delivered to the gas tank 507 as described above and the pressure in the gas tank 507 reaches the set pressure.

Details of the valve device 510 having the air feeding time adjusting function will now be described.

Figure 13:
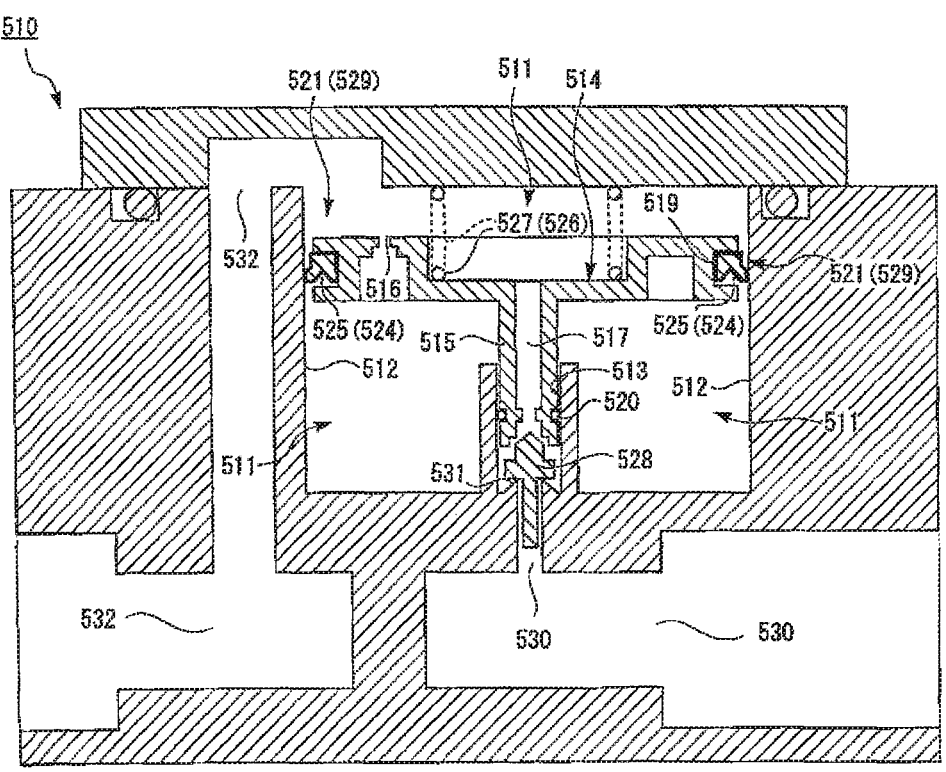
FIG. 13 is a schematic cross-sectional view of the valve device according to the present embodiment (closed state)

FIG. 13 is a schematic cross-sectional view of the valve device according to the present embodiment in the closed state.

As shown in FIG. 13, the valve device 510 of the present embodiment includes a chamber 511, a piston 514, a valve element 528, and a compression coil spring 527 as an urging means 526.

Of the above, the chamber 511 is provided so that the pressure of gas acts thereon.

Also, the piston 514 is configured to be slidable in the interior of the chamber 511 in the axial direction of a shaft portion 515 of the piston 514. Yet further, a first end (lower side in the drawing) in the movement direction of the piston 514 in the chamber 511 is connected to the first flow passage 530. Further, the valve element 528 is located at the first end of the piston 514. The valve element 528 is configured to move integrally with the piston 514 and contacts a valve seat portion 531 located at an opening portion of the first flow passage 530 to attain the valve closed state. Also, when the valve element 528 separates from the valve seat portion 531, the valve is switched to the open state.

Also, the compression coil spring 527 is located at the second end (upper side in the drawing) in the movement direction of the piston 514 in the chamber 511. It is configured to urge the piston 514 toward the first end (lower side in the drawing).

Yet further, the piston 514 has the first hole portion 516 of comparatively small diameter formed therein. This is an orifice. The first hole portion 516 is configured to make the gas flow from one side to the other side in accordance with the difference between the pressure of the gas at the first end (lower side in the drawing) in the chamber with reference to the piston 514 and the pressure of the gas at the second end (upper side in the drawing).

Specifically, if the pressure of the gas at the first end (lower side in the drawing) is higher than the pressure at the second end (upper side in the drawing), the gas flows from the first end (lower side in the drawing) to the second end (upper side in the drawing). In contrast, if the pressure of the gas at the second end (upper side in the drawing) is higher than the pressure at the first end (lower side in the drawing), the gas flows from the second end (upper side in the drawing) to the first end (lower side in the drawing). The length of time of the air feeding time adjusting function is configured to be determined by the amount of gas flowing per unit time via the first hole portion 516 from the first end (lower side in the drawing) to the second end (upper side in the drawing).

Also, the piston cup 521, which is formed of an elastic material, is mounted on the outer periphery of the piston 514. Specifically, a groove portion 519 is formed in the outer periphery of the piston 514 and the piston cup 521 is mounted so as to be fitted in the groove portion 519. The piston cup 521 can thus move integrally with the piston 514 in the axial direction while contacting a first sliding surface 512 of the chamber 511.

The piston cup 521 is provided with a sealing portion 524, which seals the gas at one side of the chamber 511 with reference to the piston 514, between the piston 514 and the first sliding surface 512. The sealing portion 524 is formed so as to be bifurcated toward the space to be sealed. In the present embodiment, the bifurcated portion will be referred to as an "opening 525." The piston cup 521 is mounted on the piston 514 so that the opening 525 of the piston cup 521 faces the first end (lower side in the drawing).

By the above, the gas is prevented from flowing out from the first end (lower side in the drawing) to the second end (upper side in the drawing) and the gas can be made to flow from the second end (upper side in the drawing) into the first end (lower side in the drawing) as will be described in detail below. In other words, by making the opening 525 face the first end (lower side in the drawing), the same effects as those of a check valve is obtained.

Also, an O-ring 520 is mounted on the shaft portion 515 of the piston 514. The O-ring 520 is provided so that the piston 514 and the shaft portion 515 move while it contacts a second sliding surface 513. Also, a through-penetrating second hole portion 517 is formed in the interior of the shaft portion 515. The second end (upper side in the drawing) of the second hole portion 517 is configured such that the gas at the second end (upper side in the drawing) of the chamber 511 can enter and exit. Yet further, the second end (upper side in the drawing) of the chamber 511 is connected to the second flow passage 532.

When the compressed gas is not delivered from the compressor 502 and the air feeding time adjusting function is not operating, the valve device 510 is put in the valve closed state by the compression coil spring 527.

The operation of the valve device 510 having the air feeding time adjusting function will now be described.

Figure 14:
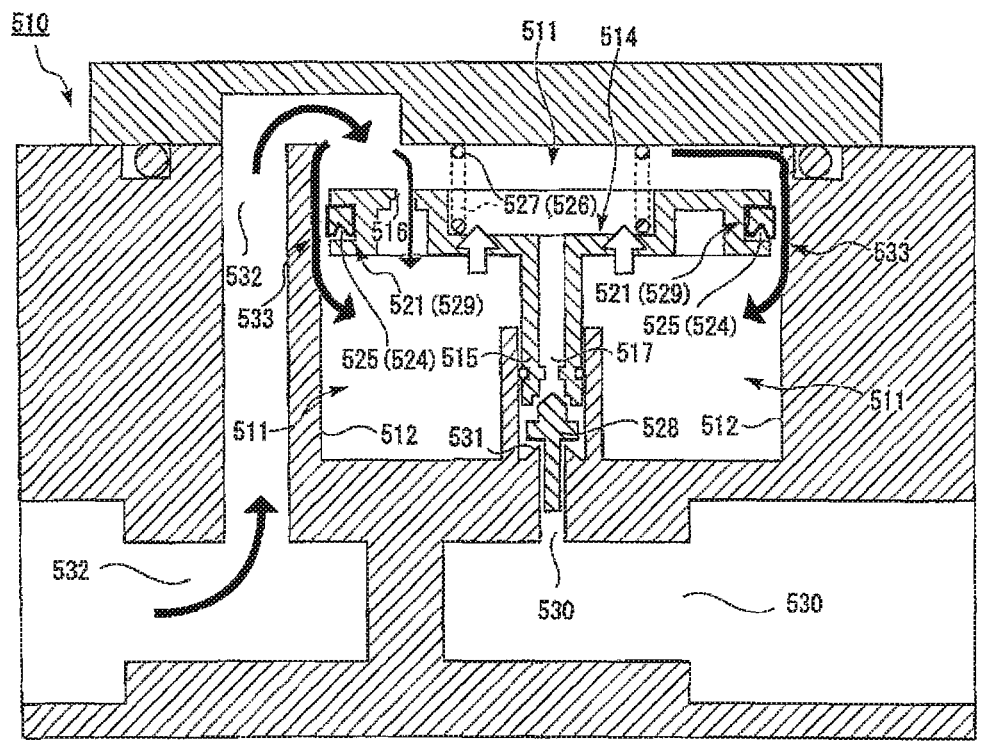
FIG. 14 is a cross-sectional view illustrating an operation of the valve device according to the present embodiment (start of air inflow)

FIG. 14 is a cross-sectional view illustrating the operation of the valve device 510 when the inflow of gas is started.

As shown in FIG. 14, by the dry compressed gas being delivered from the compressor 502, the dry compressed gas is delivered into the second end (upper side in the drawing) of the chamber 511 from the second flow passage 532. The dry compressed gas delivered into the second end (upper side in the drawing) flows via the first hole portion 516 into the first end (lower side in the drawing) of the chamber 511 with reference to the piston 514.

The dry compressed gas delivered into the second end (upper side in the drawing) of the chamber 511 flows into the first end (lower side in the drawing) of the chamber 511 with reference to the piston 514 via an interval between the piston cup 521 and the first sliding surface 512 of the chamber 511 as well. This is the third flow passage 533 described above. When the pressure of the dry compressed gas acts from the second end (upper side in the drawing) toward the first end (lower side in the drawing), it deforms the tip of the sealing portion 524 of the piston cup 521, which is branched and bifurcated to spread, in a closing manner. The above occurs because a suitable gap can thereby be formed between the piston cup 521 and the first sliding surface 512.

The gas can thus be accumulated in the first end (lower side in the drawing) of the chamber 511 with reference to the piston 514 and raise the pressure of the gas at the first end (lower side in the drawing) in a shorter time than the above-described configuration (see FIGS. 17(A) and 17(B)). The pressure of the gas at the first end (lower side in the drawing) moves the piston 514 and the shaft portion 515 toward the second end (upper side in the drawing) against the urging force of the compression coil spring 527. Consequently, the valve element 528 begins to separate from the valve seat portion 531 and the valve is switched from the closed state to the open state.

Figure 15:
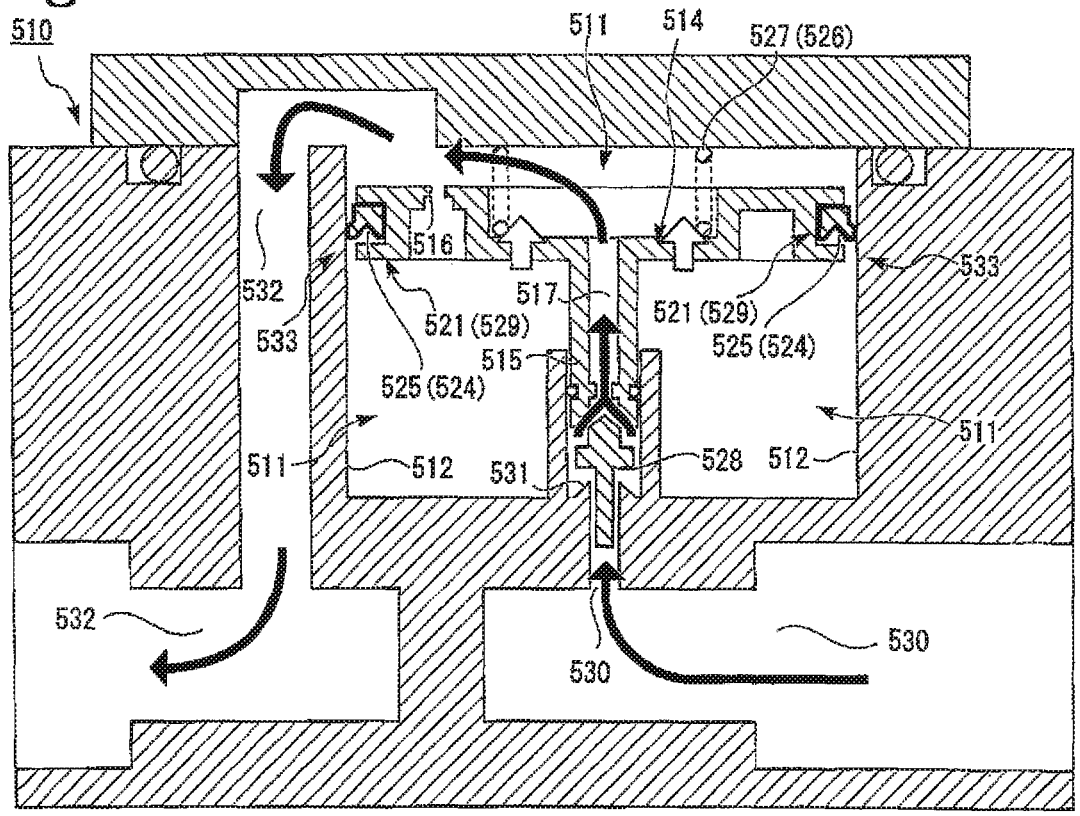
FIG. 15 is a cross-sectional view illustrating an operation of the valve device according to the present embodiment (open state (reverse flow))

FIG. 15 is a schematic cross-sectional view of the valve device 510 according to the present embodiment in the open state.

As shown in FIG. 15, the dry compressed gas delivered into the second end (upper side in the drawing) of the chamber 511 flows, from the state shown in FIG. 14, further into the first end (lower side in the drawing) of the chamber 511 with reference to the piston 514. The pressure of the gas at the first end (lower side in the drawing) is thereby increased further. The piston 514 and the shaft portion 515 are thus moved further toward the second end (upper side in the drawing).

Consequently, the valve is completely opened.

Then, as mentioned above, the pressure in the gas tank 507 reaches the set pressure and the non-illustrated pressure governor switches the exhaust valve 503 to the open state. The compressed gas from the compressor 502 is thereby discharged to the atmosphere from the exhaust valve 503 and the pressure at the second end (upper side in the drawing) of the chamber 511 decreases. The dry compressed gas in the gas tank 507 then flows into the interior of the chamber 511 via the first flow passage 530. Specifically, the gas flows from the valve seat portion 531 of the first flow passage 530, past the valve element 528 and the second hole portion 17 of the shaft portion 515, and into the second end (upper side in the drawing) of the chamber 511 with reference to the piston 514. The dry compressed gas then flows out from the second end (upper side in the drawing) of the chamber 511 to the second flow passage 532 and is delivered to the drying portion 505 to be used to regenerate the drying agent 506 in the drying portion 505. The gas used for regeneration is discharged to the atmosphere via the exhaust valve 503.

Figure 16:
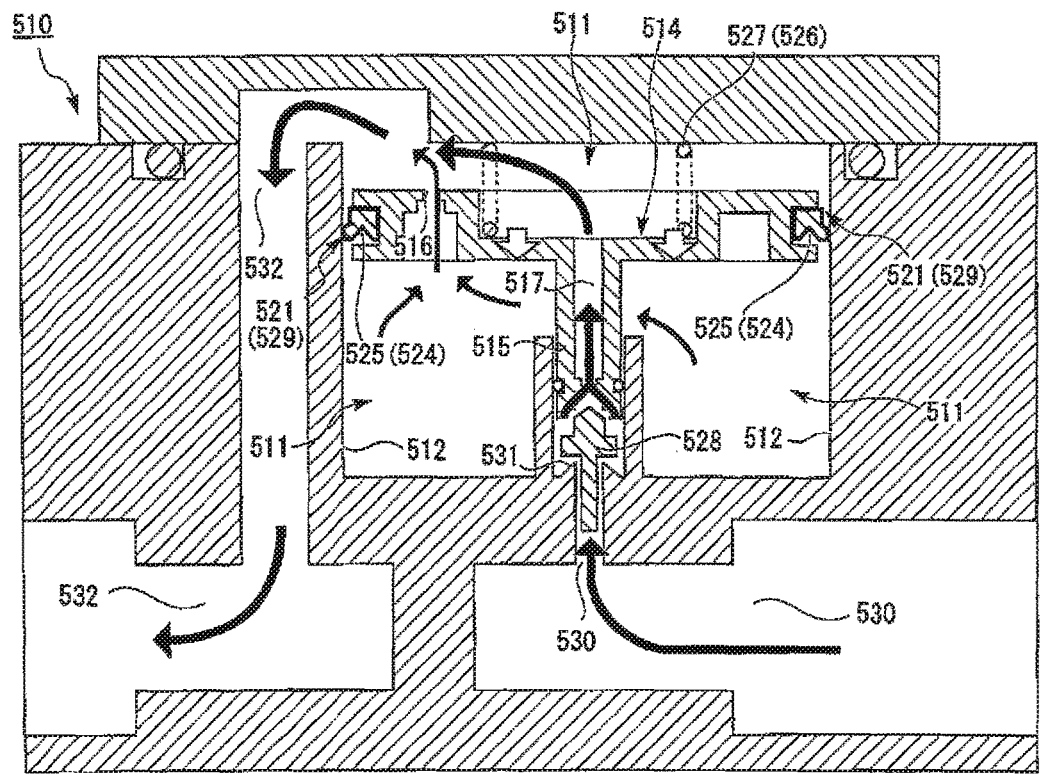
FIG. 16 is a cross-sectional view illustrating an operation of the valve device according to the present embodiment (during operation of an air feeding time adjusting function)

FIG. 16 is a cross-sectional view illustrating the operation of the valve device 510 according to the present embodiment during operation of the air feeding time adjusting function.

As shown in FIG. 16, the air feeding time adjusting function by the first hole portion 516 begins to operate from the point at which the valve of the valve device 510 is opened and the dry compressed gas begins to flow in reverse. Specifically, the gas at the first end (lower side in the drawing) of the chamber 511 with reference to the piston 514 gradually flows out via the first hole portion 516 to the second end (upper side in the drawing). The amount of gas flowing out per unit time is determined by the size of the first hole portion 516. The pressure of the gas at the first end (lower side in the drawing) of the chamber 511 with reference to the piston 514 then gradually decreases.

During the gradual decrease, the dry compressed gas in the gas tank 507 continues to flow through the first flow passage 530, the chamber 511, and the second flow passage 532 to the drying portion 505.

The pressure of the gas at the first end (lower side in the drawing) of the chamber 511 with reference to the piston 514 then gradually decreases and the magnitude of the force by which the pressure of the gas pushes the piston 514 becomes smaller than the magnitude of the force by which the compression coil spring 527 pushes the piston 514. The piston 514 and the shaft portion 515 are thus moved gradually toward the first end (lower side in the drawing) by the urging force of the compression coil spring 527.

Consequently, after elapse of the predetermined time (for example, 30 seconds) from the point at which the valve is opened and the dry compressed air begins to flow in reverse, the valve element 528 contacts the valve seat portion 531 and the valve is put in the closed state as shown in FIG. 13.

As described above, the valve device 510 is configured such that, as the air feeding time adjusting function, the dry compressed gas in the gas tank 507 flows in reverse via the valve just for the predetermined time (for example, 30 seconds).

Although in the present embodiment, the piston cup 521 is mounted in the predetermined direction on the piston 514 to make the amount of gas flowing per unit time into the valve device 510 from the second flow passage 532 greater than that of the configuration described above (see FIGS. 17(A) and 17(B)), the present invention is not restricted thereto. As far as the technical idea of the present invention is concerned, the valve device 510 may have a configuration having the third flow passage 533 and the second check valve 529 along the third flow passage 533 apart from the piston cup 521. The piston cup 521 is used in the present embodiment because the same actions and effects as the configuration having the third flow passage 533 and the second check valve 529 along the third flow passage 533 are obtained by simply changing the O-ring 546 (see FIGS. 17(A) and 17(B)) of the above-described configuration to the piston cup 521.

The regeneration valve device 510 for an air dryer according to the present embodiment is characterized by the chamber 511, the piston 514, the valve (528, 531), the urging means 526, the first hole portion 516, and the third flow passage 533. The chamber 511 is located between the drying portion 505, which performs the drying process on the compressed gas supplied from the compressor 502, which is a gas compressor, and the gas tank 507, which stores the dry-processed dry compressed gas. The pressure of the gas acts on the chamber 511. The piston 514 moves inside the chamber 511 and defines the interior of the chamber 511 into the first end space (lower side in the drawing) at the gas tank 507 side and the second end space (upper side in the drawing) at the drying portion 505 side. The valve (528, 531) is put in the closed state by the piston 514 moving toward the first end (lower side in the drawing) and put in the open state by the piston 514 moving toward the second end (upper side in the drawing). The urging means 526 urges the piston 514 in the direction in which the valve (528, 531) is closed. The first hole portion 516 is formed in the piston 514 and makes the gas flow from one side to the other side in accordance with the difference between the pressure of the gas inside the first end space (lower side in the drawing) and the pressure of the gas inside the second end space (upper side in the drawing). The third flow passage 533 is an auxiliary flow passage having in it the second check valve 529 as a restricting means. The second check valve 529 allows the flow of gas in the direction from the second end space (upper side in the drawing) to the first end space (lower side in the drawing) of the chamber 511 and restricts the flow of gas in the direction from the first end space (lower side in the drawing) to the second end space (upper side in the drawing).

Also, the present embodiment is characterized by the following configuration. That is, the third flow passage 533 is formed by the clearance between the outer peripheral surface of a flange portion of the piston 514 and the inner peripheral surface of the chamber 511. The restricting means (corresponding to the second check valve 529) is formed by the piston cup 521 as a cup seal housed in the groove portion 519 as a recessed portion, formed along the outer peripheral surface of the flange portion, in a manner such that the opening 525, which is an opening portion, faces the first end space (lower side in the drawing) and enlarging and reducing the opening 525 by elastic deformation. When flowing from the second end space (upper side in the drawing) in the chamber 511 into the first end space (lower side in the drawing) in the chamber 511, gas flows into the first end space (lower side in the drawing) via the first hole portion 516 and additionally via the third flow passage 533 by the opening 525 of the piston cup 521 being reduced to open the clearance. When flowing out from the first end space (lower side in the drawing) in the chamber 511 to the second end space (upper side in the drawing), gas flows out to the second end space (upper side in the drawing) only via the first hole portion 516 by the opening 525 of the piston cup 521 being enlarged to close the clearance.

Yet further, the present embodiment is characterized by the following configuration. The gas is delivered from the drying portion 505 to the second end space (upper side in the drawing) in the chamber 511. The gas delivered into the second end space (upper side in the drawing) flows into the first end space (lower side in the drawing) in the chamber 511, so that the pressure in the first end space (lower side in the drawing) of the chamber 511 increases. Accordingly, the piston 514 is moved by the pressure to the second end (upper side in the drawing) against the urging force of the urging means 526 and the valve (528, 531) is put in the open state by the movement of the piston 514. The gas in the first end space (lower side in the drawing) in the chamber 511 flows out to the second end space (upper side in the drawing) via the first hole portion 516. This lowers the pressure in the first end space (lower side in the drawing) in the chamber 511. Then, the urging force of the urging means 526 moves the piston 514 to the first end (lower side in the drawing) and the valve (528, 531) is put in the closed state by the movement of the piston 514.

An air dryer according to the present embodiment is an air dryer that includes the drying portion 505 having the regenerable drying agent 506 and the regeneration valve device 510 connected to a first end of the flow passage in the drying portion 505. The air dryer is characterized by the following configuration. That is, the compressor 502 and the exhaust valve 503 as a gas discharge portion are connected to the second end of the flow passage in the drying portion 505. The valve (528, 531) of the regeneration valve device 510 is put in the open state by the gas being delivered by the compressor 502 to the first end space (lower side in the drawing) inside chamber 511 via the first hole portion 516 and the third flow passage 533 of the regeneration valve device 510, By the exhaust valve 503 being put in the atmosphere released state, the dry compressed gas inside the gas tank 507 is delivered to the drying portion 505 via the valve (528, 531) of the regeneration valve device 510 and discharged from the exhaust valve 503.

The present invention is not restricted to the above-described embodiment, various modifications are possible within the scope of the invention described in the claims, and obviously such modifications are included within the scope of the present invention.

An embodiment of the present invention will now be described with reference to the drawings.

Figure 18:
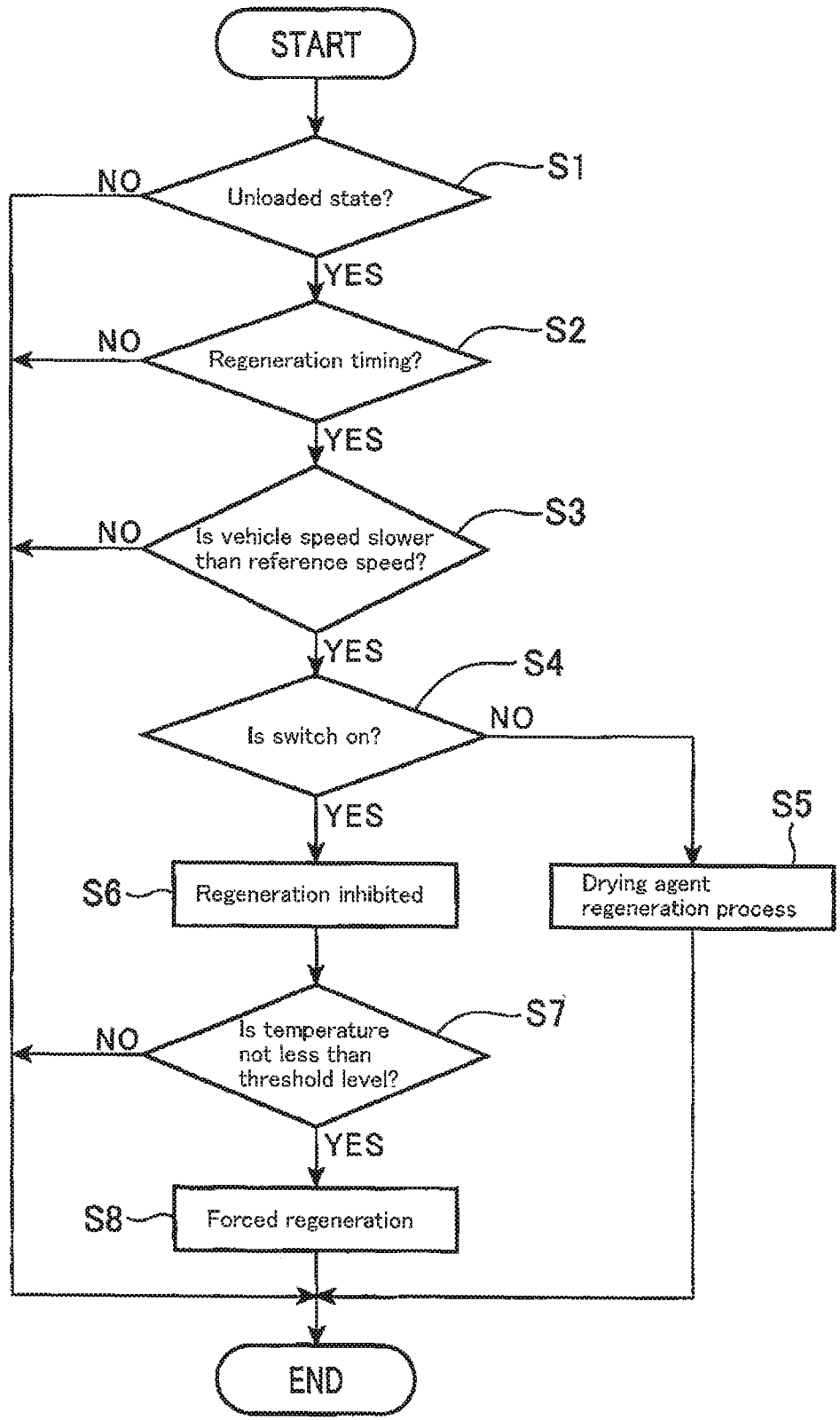
FIG. 18 is a flowchart of a regeneration inhibiting operation procedure.

FIG. 18 is a diagram of a configuration of a compressed air supply system 601 according to an embodiment to which the present invention is applied.

The compressed air supply system 601 (compressed air supply device for a vehicle) shown in FIG. 18 is a device for supplying compressed air for driving, for example, to a pneumatic brake device installed in a large vehicle, such as a truck or bus, and the like The system 601 is formed by a compressor 604 (air compressor), an ECU (regeneration control means) 602 controlling the compressor 604, and an air dryer module 610, which removes the moisture in the compressed air discharged from the compressor 604 and supplies the dried compressed air to a load (for example, the brake device) of the vehicle.

The ECU 602 is communicably connected via a CAN (controller area network) 603 to respective devices, such as an engine 605, a vehicle speed detector (vehicle speed detecting means) 606, and the like, of the vehicle in which the compressed air supply system 601 is installed and acquires information on the vehicle and controls operations of the respective devices through the CAN 603. Specifically, information related to traveling conditions of the vehicle, such as information related to the vehicle speed of the vehicle, information related to the traveling distance of the vehicle, and the like, and information related to operation conditions of an air dryer 632 to be described below are input into the ECU 602. Based on the input information, the ECU 602 controls the engine of the vehicle and controls the operations of the compressor 604 and the air dryer module 610. Reference numeral 607 is a heater for heating to prevent freezing of moisture inside the air dryer module 610 during cold months, and the like The air dryer module 610 includes an output port 621 to which a load 651 is connected, an output port 622 to which a load 652 is connected, an output port 623 to which a load 653 is connected, an output port 624 to which a load 654 is connected, and an output port 625 to which a load 655 is connected.

The loads 651 to 653 form the brake device. In the present embodiment, the load 651 is a main brake (service brake) for the front wheels, the load 652 is a main brake (service brake) for the rear wheels, and the load 653 is a parking brake. The loads 654 and 655 are accessories, such as a horn, clutch driving mechanism, and the like, that are driven by the compressed air.

Also, the loads 651 to 655 include compressed air circuits (service brake circuits, parking brake circuit) 651a to 655a, through which the compressed air flows, and air tanks 651b to 655b are respectively connected to the compressed air circuits 651a to 655b.

The air dryer module 610 includes a pressure controlling solenoid valve 701 and a regeneration solenoid valve 702, which are opened and closed by control by the ECU 602, pressure sensors 721, 722, and 723, which detect air pressures at respective portions of the air dryer module 610 and output the detection values to the ECU 602, and a humidity sensor 724, which detects the relative humidity of the compressed air further downstream than the air dryer 632 in the air dryer module 610 and outputs the detection values to the ECU 602. The detection values of the humidity sensor 724 include temperature information. The ECU 602 makes the pressure controlling solenoid valve 701 and the regeneration solenoid valve 702 open and close based on the detection values of the pressure sensors 721 to 723 and makes the regeneration solenoid valve 702 open and close based on the detection values of the humidity sensor 724.

The compressor 604 is coupled to the engine 605 via a non-illustrated auxiliary belt and compresses air using the driving force of the engine 605. The pressure controlling solenoid valve 701 is connected via a control line 626 to the compressor 604. The pressure controlling solenoid valve 701 switches the compressor 604 between a loaded state, in which the compressor 604 compresses air, and an unloaded state in which compression is not performed so that, for example, the detection value of the pressure sensor 723 is within a predetermined pressure range, and controls the operation of the compressor 604 by opening and closing in accordance with the detection value of the pressure sensor 723.

A discharge pipe (discharge line) 611 of the compressor 604 is connected to an inflow pipe 631 of the air dryer module 610, and the air dryer 632 is connected to the inflow pipe 631. The air dryer 632 houses a drying agent inside a case and moisture and other foreign matter contained in the compressed air discharged from the compressor 604 are removed by the drying agent.

A branch pipe 631A branching from the inflow pipe 631 is connected between the compressor 604 and the air dryer 632 and an exhaust valve 633 and an exhaust outlet 634 are connected in series to the branch pipe 631A. When the exhaust valve 633 opens, the compressed air in the main body of the air dryer 632 is discharged directly to the exterior from the exhaust outlet 634. The exhaust valve 633 is controlled by air pressure and a control line 639 thereof is connected to the regeneration solenoid valve 702. The regeneration solenoid valve 702 is a solenoid valve for controlling a drying agent regeneration operation of the air dryer 632, is opened and closed by control by the ECU 602, and applies the air pressure at the downstream side of the air dryer 632 to the exhaust valve 633 in the valve open state. The exhaust valve 633 is normally closed and opens to release the compressed air from the exhaust outlet 634 only when the air pressure from the regeneration solenoid valve 702 is applied thereto.

When the exhaust valve 633 opens in a state where the air pressure inside the air dryer module 610 is sufficiently high, the compressed air stored at a further downstream side of the air dryer 632 (for example, in a supply passage 635 or the air tank 655a) flows in reverse inside the case of the air dryer 632 and is released from the exhaust outlet 634. In this process, the air passing through the case becomes extremely dry due to the rapid pressure reduction and takes up the moisture from the drying agent inside the case and the drying agent is thus regenerated. After regeneration, the drying agent is recovered in adsorptive capacity for adsorbing moisture and is capable of removing the moisture in the compressed air. The regeneration operation is executed by opening of the regeneration solenoid valve 702 by the ECU 602 at a predetermined regeneration timing (predetermined timing), such as at each preset time or when the air pressure inside the air dryer module 610 meets a condition set in advance, and the like. In the present embodiment, the ECU 602, the regeneration solenoid valve 702, and the exhaust valve 633 function as a regeneration means.

Also, another branch pipe 631B, which branches from the inflow pipe 631, is connected between the compressor 604 and the air dryer 632, and the branch pipe 631B is connected to a supply port 628 via a pneumatic pressure supply valve 636. The pneumatic pressure supply valve 636 includes an operation switch 636A, which is operated on and off manually. When the operation switch 636A is pressed, the pneumatic pressure supply valve 636 opens to release the compressed air from the supply port 628. The supply port 628 is configured to be connectable, for example, to a valve (air supply port) of a tire of an automobile and air can be replenished to the tire by operation of the operation switch 636A. Also, a safety valve 637 is provided in a branch pipe 635A branched from the supply passage 635 at the downstream side of the air dryer 632. The safety valve 637 is a valve that is opened when the air pressure inside the supply passage 635 or in the air tanks 651b to 655b rises abnormally to release the pressure to the exterior.

A branch chamber 638 is connected to the supply passage 635 further downstream than the air dryer 632, and three supply passages 6640, 641, and 642 are connected to the branch chamber 638. A pressure reducing valve 643 is provided in the supply passage 640 and at the downstream side of the pressure reducing valve 643, the supply passage 640 branches into two supply passages 6640A and 640B, and the supply passages 6640A and 640B are respectively connected to the output ports 621 and 622 via service brake pressure protection valves 644 and 645. Also, another supply passage 641 connected to the branch chamber 638 is provided with a pressure reducing valve 646 and a pressure protection valve 647 and branches into two supply passages 641A and 641B at the downstream side of the pressure protection valve 647. The supply passages 641A and 641B are respectively connected to the output ports 623 and 624 via a parking brake pressure protection valve 648 and an accessory pressure protection valve 649. Further, the other supply passage 642 connected to the branch chamber 638 is connected to the output port 625.

In each of the service brake pressure protection valves 644 and 645, a throttle and a check valve are arranged in parallel. Each of the service brake pressure protection valves 644 and 645, the parking brake pressure protection valve 648, and the accessory pressure protection valve 649 closes when pressure loss occurs in the corresponding compressed air circuit among the circuits 651a to 654a, through which compressed air flows, in the corresponding load among the loads 6651 to 654 connected to the output ports 621 to 624, that is, when the air pressure in the corresponding circuit falls below a predetermined valve closing pressure value. Also, each of the service brake pressure protection valves 644 and 645, the parking brake pressure protection valve 648, and the accessory pressure protection valve 649 is configured to open when the air pressure inside the supply passage in which the pressure protection valve is located exceeds a predetermined valve opening pressure value.

Also, a bleed-back passage 660 is located between the supply passage 642 connected to the branch chamber 638 and a supply passage 641A at the downstream side of the parking brake pressure protection valve 648. The bleed-back passage 660 puts the respective supply passages 642 and 641A in communication. The bleed-back passage 660 includes a check valve 661 that prevents the flow of air from the supply passage 642 (that is, the branch chamber 638) to the output port 623. The check valve 661 opens when the air pressure inside the supply passage 641A falls below the air pressure inside the supply passage 642 and thereby functions to release the pressure inside the supply passage 641A (for example, the air tank 653b for the parking brake).

The pressure sensor 723 detects the air pressure in the supply passage 635, the pressure sensor 721 detects the air pressure at the downstream side of one service brake pressure protection valve 44, that is, the air pressure at the output port 621, and the pressure sensor 122 detects the air pressure at the output port 622 at the downstream side of the other service brake pressure protection valve 645. The detection values are output continually from the respective pressure sensors 721 to 723 to the ECU 602. Also, the humidity sensor 724 detects the relative humidity in the supply passage 635 and its detection value is continually output to the ECU 602.

With the parking brake device of the vehicle corresponding to the load 653, the braking force is released by air pressure to enable travel. Specifically, the parking brake has a configuration where the braking force is exhibited by expansion of a brake shoe by the force of a spring during parking and, during release, the brake shoe is closed against the force of the spring by the air pressure supplied from the air dryer module 610.

Therefore when the air tank 653b is sufficiently filled with compressed air, the parking brake device can release the parking brake by means of the air pressure. On the other hand, when pressure loss occurs at the compressed air circuit 653a corresponding to the parking brake, the supply of compressed air to the compressed air circuit 653a is interrupted by closing of the parking brake pressure protection valve 648 and the parking brake thus becomes unreleasable.

From the standpoint of safety, the parking brake device must be capable of being released when the main brake devices are usable, and it is preferable that the parking brake should not be released when the air pressures in the air tanks 651b and 652b corresponding to the main brake devices are insufficient.

Therefore, in an initial state (for example, when the pressures inside the air tanks 651b and 652b are not sufficient in a new car state or during a vehicle inspection, and the like), the supply of compressed air to the compressed air circuit 653a corresponding to the parking brake must be interrupted until the air pressures inside the air tanks 651b and 652b become sufficient. In the present configuration, the pressure protection valve 647 is located in the supply passage 641 connected to the branch chamber 638 and the valve opening pressure setting of the pressure protection valve 647 is set higher than the valve opening pressure settings of the service brake pressure protection valves 645 and 46 to enable prevention of the supplying of compressed air to the air tank 653b of the parking brake device before the air pressures inside the air tanks 651b and 652b of the main brake devices become sufficient.

Further, in the present configuration, the bleed-back passage 660 is provided to make the parking brake unreleasable when pressure loss occurs at the compressed air circuits 651a and 652a corresponding to the main brake devices. Specifically, when pressure loss occurs at the compressed air circuits 651a and 652a, the air pressure inside the supply passage 642 decreases, the check valve 661 of the bleed-back passage 660 opens, and the air inside the air tank 653b is released through the bleed-back passage 660. Further, in accompaniment with the decrease of air pressure inside the air tank 653b, the parking brake pressure protection valve 648 closes. The supply of compressed air to the compressed air circuit 653a is thereby interrupted and the parking brake is made unreleasable.

Also, the pressure protection valve 647 is configured to have the same structure as service brake pressure protection valves 644 and 645, the parking brake pressure protection valve 648, and the accessory pressure protection valve 649. The respective pressure protection valves can thus be standardized so that standardization of parts is achieved and a solenoid valve controlled according to a pressure detected by a service brake circuit and a line for outputting a command pressure from the solenoid valve as in a conventional control valve are made unnecessary, thereby enabling realization of simplification of the configuration.

As described above. the ECU 602 opens the regeneration solenoid valve 702 at the predetermined regeneration timing to apply the control air pressure to the exhaust valve 633 via the regeneration solenoid valve 702 and opens the exhaust valve 633 to perform regeneration of the drying agent of the air dryer 632. In the process of regenerating the drying agent, drain water that contains oil is discharged through the exhaust valve 633, and therefore at a location where the discharge of drain water is undesirable in terms of sanitation management, such as in premises of a food factory or a precision parts factory, it is preferable to avoid performing the regeneration of the drying agent.

Normally, in factory premises, the traveling speed of a vehicle is restricted to a low speed. Therefore with the present embodiment, the ECU 602 acquires the vehicle speed information detected by the vehicle speed detector 606 through the CAN 603, compares the vehicle speed information with a predetermined reference speed (for example, 20 km/h). If a state where the vehicle speed is slower than the reference speed is sustained for a predetermined time, the ECU 602 assumes that the vehicle is travelling within factory premises or is stopped within factory premises and inhibits the regeneration operation while this state is sustained. In the present embodiment, the ECU 602 functions as a regeneration inhibiting control means. Also, the reference speed and the predetermined time are stored in a non-illustrated nonvolatile storage means (for example, an EEPROM), which is configured to enable rewriting according to vehicle model, and the like On the other hand, if regeneration is inhibited over a long period of time, the adsorptive capacity of the drying agent of the air dryer 632 decrease gradually, and therefore the relative humidity of the compressed air inside the supply passage 635 and the air tanks 651b to 655b increase. This causes adverse effects (for example, inoperability due to promotion of corrosion or freezing of the drain, and the like) on equipment further downstream of the air dryer 632. Therefore, even in the state where the regeneration operation is inhibited, if the detection value of the humidity sensor 724 exceeds a reference value at which dew condensation may occur inside the supply passage 635 or the air tanks 651b to 655b, the ECU 602 opens the regeneration solenoid valve 702 and forcibly executes the drying agent regeneration operation. In this case, the ECU 602 functions as a forcible regeneration means.

Also, even during travel outside factory premises, a situation can occur in which the vehicle speed remains slower than the reference speed for the predetermined time due to a road traffic jam, and the like. In this case, if the regeneration of the drying agent is inhibited uniformly under the condition that the vehicle speed is slower than the reference speed, the adsorptive capacity of the drying agent will decrease. Therefore with the present embodiment, a configuration is possible where a switch 608 that is manually operable by a driver is connected to the ECU 602 and the ECU 602 inhibits the regeneration of the drying agent if the switch 608 is in the on state and the state in which the vehicle speed is slower than the reference speed is sustained for the predetermined time. The switch 608 is located close to the driver seat and an appropriate regeneration operation can be performed by operating the switch in accordance with road conditions.

Also, besides the switch 608, whether or not the regeneration is to be inhibited may be determined from the position information of the vehicle itself and the vehicle speed information. For example, a configuration is possible where factory premises or other regeneration inhibited area is set in advance in the map information of a navigation device (non-illustrated) connected to the CAN 603 and the ECU 602 inhibits the regeneration of the drying agent if the position of the vehicle itself that is acquired by a GPS (global positioning system) of the navigation device, and the like, is within the regeneration inhibited area and the state in which the vehicle speed is slower than the reference speed is sustained for the predetermined time. In this case, a regeneration inhibited area is set by designating a plurality of coordinates that indicate a boundary of the area on the map information and is set as the area surrounded by the respective coordinates. If the precision of the position information of the vehicle itself that is acquired by a GPS, and the like, improves, it is also possible to determine being in or outside a regeneration inhibited area from the position information of the vehicle itself alone to restrict the regeneration of the drying agent.

The drying agent regeneration process by the ECU 602 will now be described with reference to FIG. 19.

First, the ECU 602 determines whether or not the compressor 604 is in the unloaded state (step S1). This is because if the drying agent regeneration is performed with the compressor 604 being in the loaded state, the compressed air amount may be insufficient. If the compressor 604 is determined not to be in the unloaded state here (step S1: No), the process is ended, while if it is determined to be in the unloaded state (step S1: Yes), the ECU 602 determines whether or not a regeneration timing that has been set in advance has arrived (step S2).

If it is determined that it is presently not the regeneration timing (step S2: No), the process is ended, while if it is presently the regeneration timing (step S2: Yes), the ECU 602 determines whether or not the vehicle speed detected by the vehicle speed detector 606 is slower than the predetermined reference speed (for example, 20 km/h) (step S3). To avoid chattering in the process of making this determination, it is preferable for the ECU 602 to determine that the vehicle speed is slower than the reference speed if the state where the vehicle speed is slower than the reference speed is sustained for a predetermined time. It is also preferable for the vehicle speed to be determined to be faster than the reference speed if the state where the vehicle speed is faster than the reference speed is sustained for a predetermined time.

If the vehicle speed is determined to be faster than the reference speed here (step S3: No), the process is ended, while if the vehicle speed is determined to be slower than the reference speed (step S3: Yes), the ECU 602 determines whether or not the switch 608 is on (step S4). The switch 608 is a switch for selecting whether or not to inhibit the regeneration process based on the vehicle speed. For example, if the vehicle speed is slow simply because of a road traffic jam, the regeneration process is not inhibited accordingly and the normal regeneration process is executed.

If the switch 608 is determined not to be on here (step S4: No), the ECU 602 performs the normal drying agent regeneration process in accordance with the regeneration timing (step S5). Control of the regeneration process in consideration of the traveling state can thereby be executed.

Also, if the switch 608 is on (step S4: Yes), the ECU 602 inhibits the drying agent regeneration process regardless of the regeneration timing (step S6). By this configuration, the timing of the drying agent regeneration operation can be controlled easily based on the vehicle speed, and the regeneration operation is suppressed at locations, for example, within factory premises, where the traveling speed is restricted and the discharge of drain water is undesirable.

Thereafter, the ECU 602 determines whether or not the humidity level detected by the humidity sensor 724 is not less than a threshold level set in advance (step S7). The threshold level is set in advance to a humidity level at which the possibility of dew formation inside the supply passage 635 or any of the air tanks 651b to 655b is high and a high humidity abnormality will occur if driving is sustained as it is.

If it is determined that the humidity level of the compressed air is less than the predetermined threshold level (step S7: No), the process is ended, while if it is determined that it is not less than the humidity level of the compressed air (step S7: yes), the ECU 602 outputs a valve opening signal to the regeneration solenoid valve 702 to open the exhaust valve 633 and forcibly execute drying agent regeneration process (step S8) and then ends the process. The compressed air of high humidity inside the supply passage 635 or any of the air tanks 651b to 655b is thereby discharged and the compressed air from which moisture is removed through the regenerated drying agent flows into the supply passage 635 to enable the respective equipment downstream of the air dryer 632 to operate normally.

As described above, the present embodiment, the compressed air supply system 601 includes the compressor 604 installed in the vehicle and the air dryer 632 removing moisture and other foreign matter contained in the compressed air discharged from the compressor 604. The system 601 supplies the compressed air that has passed through the air dryer 632 to the brake device of the vehicle. The system 601 includes the regenerating means regenerating the drying agent in the air dryer 632 at the predetermined timing and the vehicle speed detector 606 detecting the vehicle speed of the vehicle. The ECU 602 inhibits the regeneration of the drying agent regardless of the predetermined timing if the detected vehicle speed is slower than a predetermined reference speed. The timing of the drying agent regeneration operation can thus be controlled easily based on the vehicle speed and the regeneration operation is suppressed at locations, for example, within factory premises, where the traveling speed is restricted and the discharge of drain water is undesirable.

Also, the regenerating means includes the exhaust valve 633 located in the air dryer 632 and the regeneration solenoid valve 702 applying the air pressure for control to the exhaust valve 633 via the control line 626. The ECU 602 opens the regeneration solenoid valve 702 at the predetermined timing to apply the air pressure to the exhaust valve 633 to open the exhaust valve 633 and performs regeneration control of the drying agent in the air dryer 632. Therefore in comparison to the conventional configuration where regeneration is performed when receiving an air pressure signal from a pressure governor, the control of whether or not to regenerate the drying agent can be performed readily and the timing of the drying agent regeneration operation can be controlled easily.

Also, with the present embodiment, the humidity sensor 724 is located downstream of the drying agent and if the humidity level detected by the humidity sensor 724 indicates a humidity level not less than the threshold set in advance, the ECU 602 forcibly executes the drying agent regeneration even if the drying agent regeneration is inhibited so that the compressed air of high humidity inside the supply passage 635 or any of the air tanks 651b to 655b is thereby discharged and the compressed air from which moisture is removed through the regenerated drying agent flows into the supply passage 635 to resolve a state where a humidity level becomes no less than the threshold set in advance and enable the respective equipment downstream of the air dryer 632 to operate normally.

The above-described embodiment illustrates an embodiment to which the present invention is applied and the present invention is not restricted to the above embodiment. For example, although the embodiment is configured such that if the humidity level indicates a humidity level not less than the threshold set in advance, the ECU 602 forcibly executes the drying agent regeneration even if the drying agent regeneration is inhibited, the present invention is not restricted thereto. For example, a configuration is also possible where, if the drying agent regeneration is inhibited, the ECU 602 puts the regeneration operation on standby until the inhibition is canceled (the vehicle speed becomes not less than the reference value, the switch 608 is turned on, or the position information of the vehicle itself falls outside the regeneration inhibited area) and forcibly performs the regeneration regardless of the regeneration timing when the inhibition is canceled. With this configuration, the discharge of drain water within factory premises is prevented because the regeneration operation is suppressed within factory premises or other regeneration inhibited area, and the state in which the relative humidity of the compressed air in the supply passage 635 and the air tanks 651b to 655b is raised is avoided from being sustained for a long period of time and adverse effects on equipment downstream of the air dryer 632 is reduced because once the inhibition is cancelled, the regeneration is performed forcibly regardless of the regeneration timing.

Also, the vehicle to which the compressed air supply device for a vehicle according to the present invention is applicable is not restricted in particular and may be any of large vehicles, small vehicles, special vehicles, trailers, two-wheeled vehicles, and three-wheeled vehicles and the scale and form thereof are arbitrary.

An embodiment of the present invention will now be described based on drawings.

Figure 19:
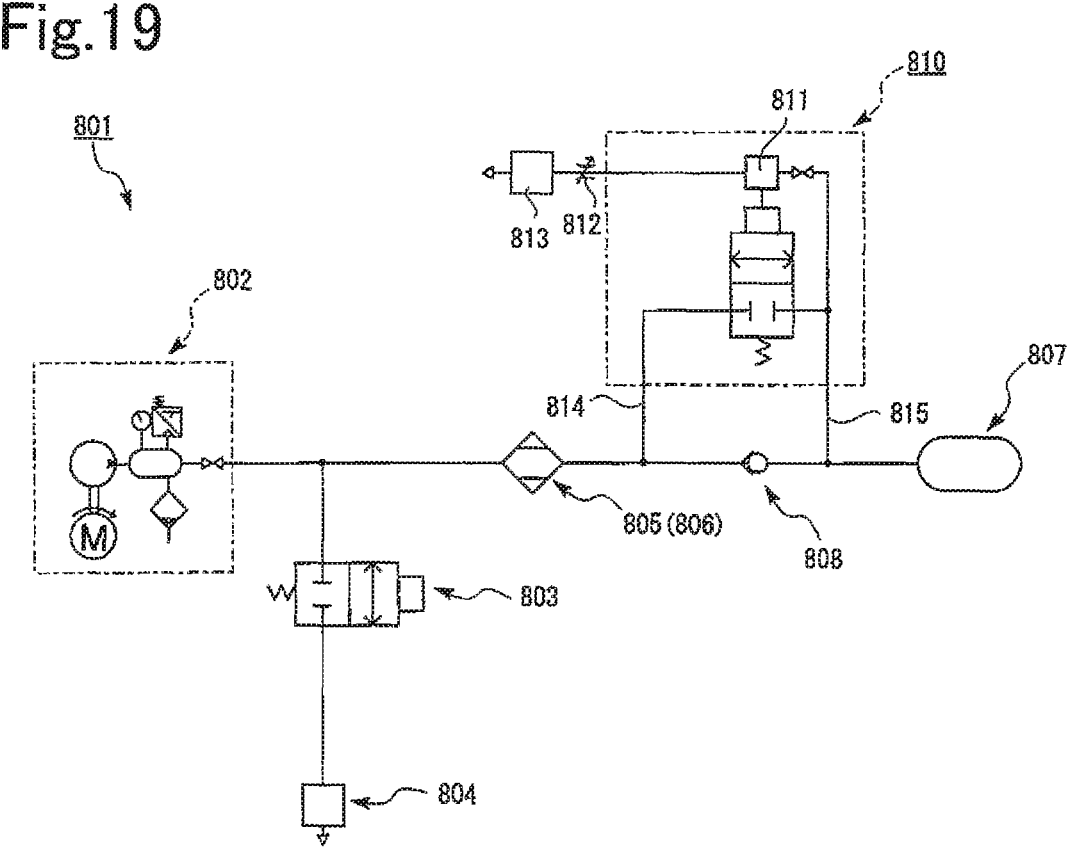
FIG. 19 is a schematic view of a piping of an air processing system that includes a valve device according to the present embodiment.

FIG. 19 is a schematic view of a piping of an air processing system 801 that includes a valve device 810 according to the present embodiment. Principal portions of the configuration of the present invention are illustrated and other members and flow passages for gas are omitted from illustration.

As shown in FIG. 19, the air processing system 801 of the present embodiment includes the valve device 810 having an air feeding time adjusting function. As an example, this will be described as the valve device 810 for regeneration of an air dryer (805).

The air processing system 801 of the present invention includes the valve device 810 and the drying portion 805.

The piping configuration of the air processing system 801 of the present embodiment may be used as an air brake system for a truck or other commercial vehicle or as an air conditioning system for a general automobile.

Specifically, the air processing system 801 includes a compressor 802, which is a gas compressor, a gas tank 807 for the system, the valve device 810, the drying portion 805, an exhaust valve 803, which is a gas discharging portion, and a silencer 804.

Among these, the compressor 802 is provided to compress a gas and feed the compressed gas. Also, the gas tank 807 can store a dried gas and is configured to be used, for example, in an air brake system, and the like. Yet further, the valve device 810 is put in a state where a first valve 822 (see FIG. 20 to FIG. 23) to be described in detail below is closed when the pressure of the gas is not acting and is configured to be capable of switching the first valve 822 between a valve open state and closed state by a pilot command.

Also, the drying portion 805 has a drying agent 806 in the interior and is provided to be capable of drying the gas that passes through. Yet further, the exhaust valve 803 is normally put in a valve closed state and is configured to be capable of being switched between a valve open state and closed state by a pilot command from a non-illustrated pressure governor. Also, the silencer 804 is provided to reduce the noise generated when the gas is discharged.

One side of the valve device 810 with reference to the first valve 822 is connected to the drying portion 805 by a first flow passage 814. The other side is connected to the gas tank 807 by a second flow passage 815. Further, the first flow passage 814 and the second flow passage 815 are connected by a check valve 808.

"Check valve" refers to a valve that is configured to be capable of allowing a flow in one direction and stopping a flow in the opposite direction.

In the present embodiment, the check valve 808 is provided to allow the flow from the drying portion 805 to the gas tank 807 and stop the flow from the gas tank 807 to the drying portion 805.

Also, the compressor 802 and the exhaust valve 803 are connected to the side of the drying portion 805 opposite to the side connected to the valve device 810. Yet further, the silencer 804 is connected to the side of the exhaust valve 803 opposite to the side connected to the drying portion 805 and the compressor 802.

The configuration and operation of the valve device 810 in the air processing system 801 will now be described briefly.

As will be described in detail below, the valve device 810 is connected to a throttle valve 812 and an atmosphere exhaust outlet 813 used for air venting.

In a state where the exhaust valve 803 is closed, the compressed gas from the compressor 802 is delivered to the drying portion 805 and the compressed gas is dried by the drying portion 805. The dried compressed gas is then delivered into the gas tank 807 via the first check valve 808.

In this process, the dried compressed gas also flows into the valve device 810 from the first flow passage 814. A second valve 825 (see FIG. 20 to FIG. 23) is thereby opened by a second piston 824 (see FIG. 20 to FIG. 23). The compressed gas in the gas tank 807 thus flows into a volume chamber 811 from the second flow passage 815 and via the second valve 825.

The dried compressed gas delivered into the gas tank 507 is stored in the gas tank 807. When the gas pressure in the gas tank 807 reaches a set predetermined value, the non-illustrated pressure governor generates the control pressure as an air pressure signal and switches the exhaust valve 803 to the open state. The compressed gas from the compressor 802 is thereby discharged to the atmosphere from the exhaust valve 803 and the silencer 804. Also, the dry compressed gas in the gas tank 807 flows via the valve device 810 to the drying portion 805 for just a predetermined time to regenerate the drying agent 806.

The valve device 810 is configured to activate the air feeding time adjusting function in this process, thereby making the dry compressed air flow to the drying portion 805 for just the predetermined time. As will be described in detail below, when the exhaust valve 803 is switched to the open state, the first valve 822 of the valve device 810 is put in the open state and the dry compressed gas begins to flow to the drying portion 805. The gas flowing into the volume chamber 811 is then gradually vented to the atmosphere via the throttle valve 812 and the atmosphere exhaust outlet 813. As the air feeding time adjusting function, the first valve 822 of the valve device 810 is configured to be switched to the closed state when the predetermined time (for example, 30 seconds) elapses.

The gas used for regeneration is discharged to the atmosphere from the exhaust valve 803. Thereafter, when the value of the gas pressure in the gas tank 807 falls below the set value due to use of the air brake, and the like, the non-illustrated pressure governor switches the exhaust valve 803 to the closed state. The dry compressed air is thereby delivered to the gas tank 807 as described above and the gas pressure in the gas tank 807 reaches the set gas pressure.

The piping connections of the valve device 810 in the air processing system 801 and the structure of the valve device 810 will now be described.

Figure 20:
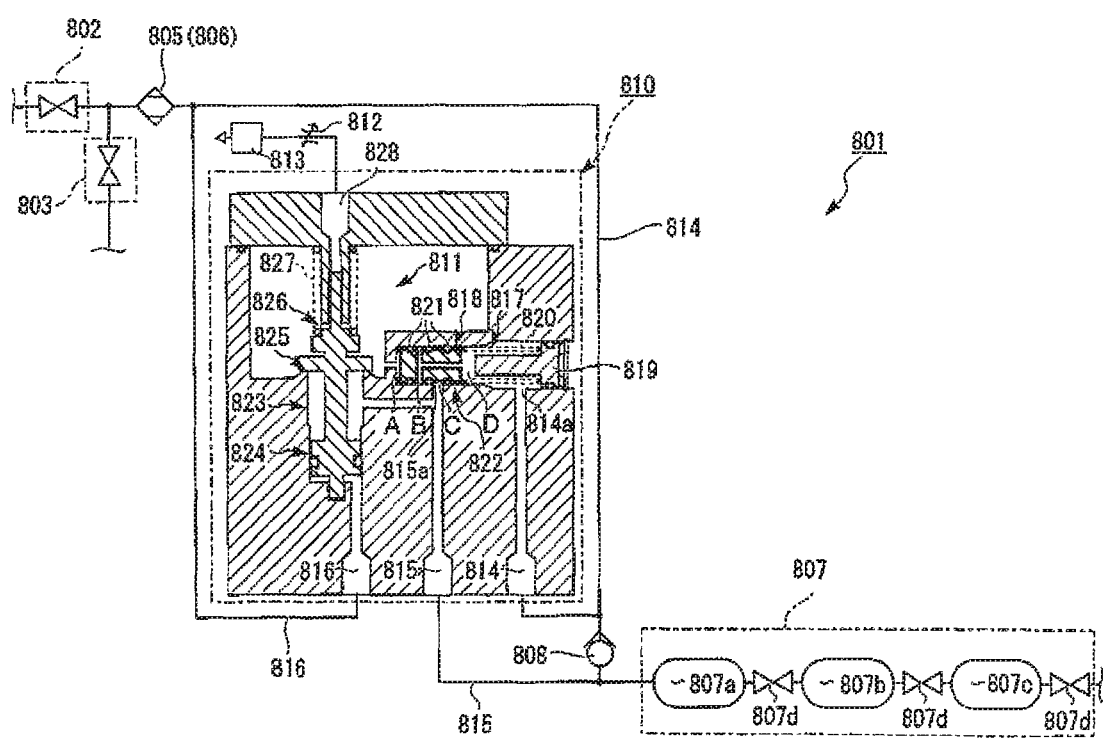
FIG. 20 is a schematic cross-sectional view of the valve device according to the present embodiment.

FIG. 20 is a schematic cross-sectional view of the valve device 810 according to the present embodiment.

As shown in FIG. 20, the valve device 810 has the volume chamber 811, a hole portion 828, a first cylinder portion 817, a first piston 818, a second cylinder portion 823, a second piston 824, the first flow passage 814, the second flow passage 815, and the third flow passage 816. Of these, the volume chamber 811 is provided to accumulate the compressed air as mentioned above. Also, the hole portion 828 is configured to enable the compressed gas in the volume chamber 811 to flow out from the volume chamber 811.

Yet further, a first end of the first cylinder portion 817 is connected to the volume chamber 811. The first piston 818 is provided to be slidable in the interior of the first cylinder portion 817. Three O-rings 821 are mounted as sealing members on the outer periphery of the first piston 818. The three O-rings 821 are configured to partition the internal space of the first cylinder portion 817 into four compartments in the movement direction of the first piston 818. The compartments are a first compartment A, a second compartment B, a third compartment C, and a fourth compartment D starting from the compartment at the first end connected to the volume chamber 811.

The first piston 818 is formed so that the second compartment B is connected to the fourth compartment D in the interior of the first piston 818. On the other hand, the third compartment C is arranged so as not to be connected to the fourth compartment D. The fourth compartment D is connected to the first flow passage 814. In other words, the fourth compartment D is a space having a first opening 814a, which is an opening of the first flow passage 814, at its inner side. Also, one of either of the second compartment B and the third compartment C is configured to become connected to the second flow passage 815 by sliding of the first piston 818. In other words, one of either of the second compartment B and the third compartment C is configured to have a second opening 815a, which is an opening of the second flow passage 815, in its interior by the sliding of the first piston 818.

Specifically, when the first piston 818 slides to a second end (fourth compartment D) that is the side opposite to the first end (first compartment A) and the second compartment B becomes connected to the second flow passage 815, the second flow passage 815 is connected to the first flow passage 814 via the interior of the second compartment B1 first piston 818 of the first cylinder portion 817 and the fourth compartment D. This is the open state of the first valve 822. On the other hand, when the first piston 818 slides to the first end (first compartment A) and the third compartment C becomes connected to the second flow passage 815, the connection of the second flow passage 815 and the first flow passage 814 is interrupted by the first piston 818. This is the closed state of the first valve 822.

A stopper member 819 is located at the second end of the first cylinder portion 817. A first spring 820, which is a compression spring, is located between the stopper member 819 and the first piston 818. The first spring 820 urges the first piston 818 toward the first end (first compartment A) by a comparatively small force. Therefore, when there is no difference between the gas pressure in the first compartment A, which is the first end with reference to the first piston 818, and the gas pressure in the fourth compartment D, which is the second end, the first piston 818 is put in a state of being moved to the first end by the force of the first spring 820. That is, the first valve 822 is put in the closed state.

Yet further, one end of the second cylinder portion 823 is connected to the volume chamber 811 and the other end is connected to the third flow passage 816. Also, the second piston 824 is provided to be slidable along the second cylinder portion 823 and is configured to partition a space on the side corresponding to the volume chamber 811 and a space on the side corresponding to the third flow passage 816 in the second cylinder portion 823. Also, the second valve 825 and the third valve 826 are formed by the second piston 824.

Among these, the second valve 825 is provided so as to be switchable between an open state in which the volume chamber 811 and the second cylinder portion 823 are connected and a closed state in which the connection of the volume chamber 811 and the second cylinder portion 823 is interrupted.

On the other hand, the third valve 826 is provided so as to be switchable between an open state in which the volume chamber 811 and the hole portion 828 are connected and a closed state in which the connection of the volume chamber 811 and the hole portion 828 is interrupted.

The opening/closing operation of the second valve 825 is linked with the opening/closing operation of the third valve 826. When the second valve 825 is in the open state, the third valve 826 is in the closed state. On the other hand, when the second valve 825 is in the closed state, the third valve 826 is in the open state.

Also, the second piston 824 is urged by the urging force of the second spring 827 in the direction in which the second valve 825 is put in the closed state and the third valve 826 is put in the open state.

Yet further, the space on the side corresponding to the volume chamber 811, which is partitioned by the second piston 824 in the second cylinder portion 823, and the second flow passage 815 are configured to be connected.

Also, as mentioned above, the first flow passage 814 is configured to connect the fourth compartment D of the first cylinder portion 817 to the compressor 802 and the exhaust valve 803. As one example, the connection to the compressor 802 and the exhaust valve 803 is made via the drying portion 805. Also, as mentioned above, the second flow passage 815 is configured to connect one of either of the second compartment B and the third compartment C of the first cylinder portion 817 to the gas tank 807. It is further configured to connect the space on the side corresponding to the volume chamber 811, which is partitioned by the second piston 824 in the second cylinder portion 823, to the gas tank 807 as well.

Also, the third flow passage 816 is configured to be connected to the first flow passage 814, which is connected to the drying portion 805.

Yet further, the hole portion 828 is connected to the throttle valve 812 and the throttle valve 812 is configured to be capable of adjusting the flow rate of gas per unit time. Also, the throttle valve 812 is connected to the atmosphere exhaust outlet 813, and the atmosphere exhaust outlet 813 is provided to be capable of discharging the gas to the atmosphere.

The gas tank 807 has a first tank 807*a*, a second tank 807*b*, and a third tank 807*c*. The first tank 807*a* to the third tank 807*c* are connected in series and valves 807*d* are respectively located between the first tank 807*a* and the second tank 807*b* and between the second tank 807*b* and the third tank 807*c*.

The operation of the valve device 810 in the air processing system 801 will now be described in detail.

Figure 21:
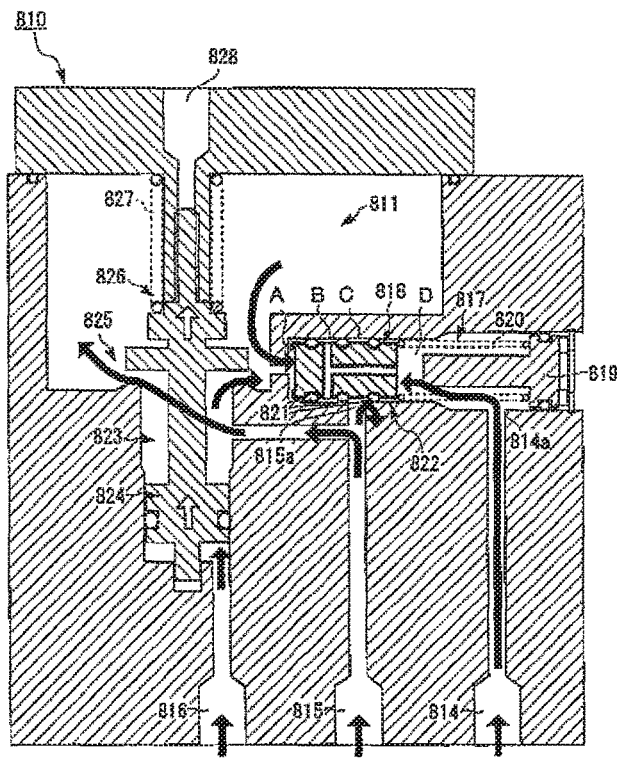
FIG. 21 is a cross-sectional view illustrating an operation of the valve device according to the present embodiment (start of air inflow)

FIG. 21 is a cross-sectional view illustrating the operation of the valve device 810 according to the present embodiment at the start of air inflow.

As mentioned above, when in the state where the exhaust valve 803 is closed, compressed air is delivered from the compressor 802, the compressed air is dried by the drying portion 805 and delivered to and stored in the gas tank 807 via the check valve 808.

In this process, the compressed air flows from the first flow passage 814 into the fourth compartment D of the first cylinder portion 817 as shown in FIG. 21.

The compressed air also flows from the second flow passage 815 into the space on the side corresponding to the volume chamber 811, which is partitioned by the second piston 824 in the second cylinder portion 823. The gas pressure in the space on the side corresponding to the volume chamber 811, which is partitioned by the second piston 824 in the second cylinder portion 823, is thereby made higher than the gas pressure in the volume chamber 811.

Although the compressed air flows from the second flow passage 815 into the third compartment C of the first cylinder portion 817, the first valve 822 is in the closed state. The compressed air that has flowed into the third compartment C thus does not at all act on the first piston 818.

Further, the compressed air flows from the third flow passage 816 into the space on the side corresponding to the third flow passage 816, which is partitioned by the second piston 824 in the second cylinder portion 823. The gas pressure in the space on the side corresponding to the third flow passage 816, which is partitioned by the second piston 824 in the second cylinder portion 823, is thereby made higher than the gas pressure in the volume chamber 811.

The gas pressure in the space on the side corresponding to the third flow passage 816, which is partitioned by the second piston 824 in the second cylinder portion 823 and the gas pressure in the space on the side corresponding to the volume chamber 811 move the second piston 824 against the urging force of the second spring 827. The second valve 825 is thus put in the open state and the third valve 826 is put in the closed state.

Consequently, the compressed air flows at once from the second flow passage 815 into the volume chamber 811 via the space on the side corresponding to the volume chamber 811, which is partitioned by the second piston 824 in the second cylinder portion 823. The gas pressure in the volume chamber 811 thus increases at once. At this point, the compressed air flows from the volume chamber 811 into the first compartment A of the first cylinder portion 817. The gas pressure in the first compartment A of the first cylinder portion 817 and the gas pressure in the fourth compartment D are equal and the first piston 818 thus does not move. That is, the first valve 822 stays in the closed state.

Figure 22:
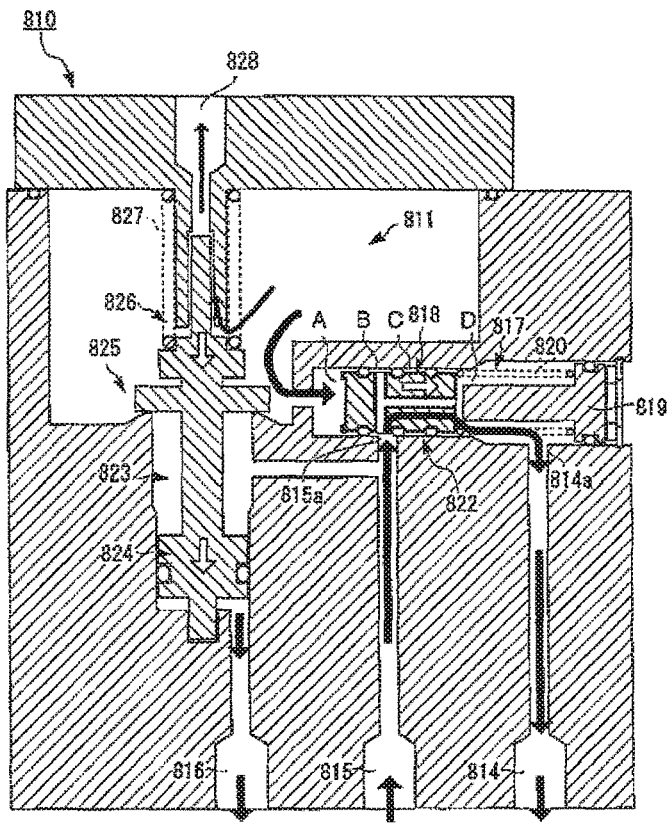
FIG. 22 is a cross-sectional view illustrating an operation of the valve device according to the present embodiment (immediately after opening)

FIG. 22 is a cross-sectional view illustrating the operation of the valve device 810 of the present embodiment immediately after opening.

As mentioned above, when the gas pressure in the gas tank 807 reaches the predetermined value, the pressure governor (non-illustrated) puts the exhaust valve 803 in the open state.

Then as shown in FIG. 22, the gas pressure in the first flow passage 814 decreases at once and the gas pressure in the fourth compartment D decreases at once with respect to the gas pressure in the first compartment A of the first cylinder portion 817. That is, the balance is disrupted.

The first piston 818 thus slides towards the fourth compartment D against the urging force of the first spring 820. The second compartment B and the second flow passage 815 are thereby connected. That is, the first valve 822 is put in the open state. In this state, the second flow passage 815 is connected to the gas tank 807 in a high pressure state. On the other hand, the first flow passage 814 is in a low pressure state in comparison to the second flow passage 815 because the exhaust valve 803 is in the open state. The compressed gas stored in the gas tank 807 thus flows from the second flow passage 815 into first flow passage 814 via the second compartment B of the first cylinder portion 817, the interior of the first piston 818, and the fourth compartment D. Further, the compressed gas flows into the drying portion 805, regenerates the drying agent 806 of the drying portion 805, and is discharged via the exhaust valve 803 and the silencer 804.

In this process, the gas pressure in the third flow passage 816 decreases at once as does the gas pressure in the first flow passage 814. The gas pressure in the space on the side corresponding to the third flow passage 816, which is partitioned by the second piston 824 in the second cylinder portion 823, rapidly becomes lower than the gas pressure in the volume chamber 811.

The difference between the gas pressure in the space on the side corresponding to the third flow passage 816, which is partitioned by the second piston 824 in the second cylinder portion 823, and the gas pressure in the volume chamber 811, together with the urging force of the second spring 827, moves the second piston 824. The second valve 825 is thus put in the closed state and the third valve 826 is put in the open state.

Consequently, the compressed air begins to flow out from the volume chamber 811 to the hole portion 828 via the third valve 826. The compressed air that has flowed out is discharged from the atmosphere exhaust outlet 813 while being adjusted in flow rate by the throttle valve 812. A residual pressure does not act on the discharge destination and thus the compressed air continues to flow out until the gas pressure in the volume chamber 811 becomes equal to the atmospheric pressure. That is, no matter how many times the outflow is repeated, the amount of compressed air that flows out is stabilized.

Although the compressed air from the gas tank 807 acts to flow from the second flow passage 815 into the second cylinder portion 823, there is no possibility that it will move the second piston 824 in the direction of opening the second valve 825. This is because the first valve 822 is in the open state, the gas pressure in the first flow passage 814 is significantly lower than the gas pressure in the second flow passage 815, and the compressed air from the gas tank 807 actively flows from the second flow passage 815 to the first flow passage 814 via the first cylinder portion 817.

Figure 23:
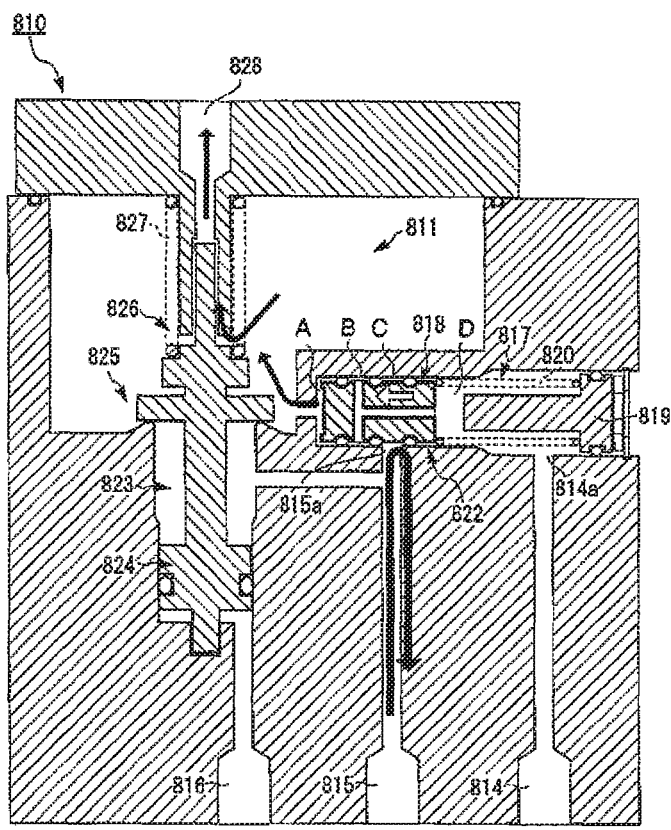
FIG. 23 is a cross-sectional view illustrating an operation of the valve device according to the present embodiment (during operation of an air feeding time adjusting function)

FIG. 23 is a cross-sectional view illustrating the operation of the valve device 810 of the present embodiment during operation of the air feeding time adjusting function.

When, from the state shown in FIG. 22, the compressed air in the volume chamber 811 continues to be discharged from the atmosphere exhaust outlet 813 via the third valve 826, the hole portion 828, and the throttle valve 812 as shown in FIG. 23, the air pressure in the volume chamber 811 gradually decreases and becomes equal to the atmospheric pressure. The first compartment A of the first cylinder portion 817 is connected to the volume chamber 811 as mentioned above. The gas pressure in the first compartment A also decreases until it becomes equal to the atmospheric pressure.

A state where the gas pressure in the first compartment A and the gas pressure in the fourth compartment D are balanced or a state where the gas pressure in the first compartment A is less than the gas pressure in the fourth compartment D is then attained. The first piston 818 is then made to slide toward the first compartment A by the comparatively small urging force of the first spring 820. That is, the first valve 822 is put in the closed state.

Consequently, the flow of the compressed air in the gas tank 807 from the second flow passage 815 to the first flow passage 814 via the first cylinder portion 817 is interrupted.

As described above, the valve device 810 of the present embodiment is arranged with the air feeding time adjusting function so that when the predetermined time (for example, 30 seconds) elapses from the point at which the exhaust valve 803 is put in the open state and the compressed air begins to flow out from the volume chamber 811 via the hole portion 828, the dry compressed air in the gas tank 807 flows in reverse with respect to the drying portion 805.

Also, the first piston 818, which switches the first valve 822 between the open and closed states, is located in the first cylinder portion 817, which is independent of the volume chamber 811. In regard to "independence," a connection may be made so that the gas can flow from one to the other of the first cylinder portion 817 and the volume chamber 811. It suffices to be a relationship where the first piston 818 slides in the interior of the first cylinder portion 817 but does not slide in the interior of the volume chamber 811.

The first piston 818 can thus be increased in flexibility of shape. Specifically, there is no need to arrange a large diameter portion and a small diameter portion that differ greatly in diameter, and the piston may be formed by portions of substantially uniform diameter. Consequently, the possibility of occurrence of axial deviation, in which the attitude of the first piston 818 becomes inclined with respect to the movement direction, is reduced. The possibility of significant increase of the sliding load due to axial deviation can also be reduced.

Also, the first spring 820 that urges the first piston 818 is configured to slide the first piston 818 with a comparatively small force when the gas pressure in the first compartment A and gas pressure in the fourth compartment D are balanced. Therefore, even upon repeated use, there is no possibility for the spring force of the first spring 820 to settle and become unable to move the first piston 818 properly.

Yet further, in comparison to another configuration described above (see FIG. 28), the amount of inflow of compressed air per unit time into the volume chamber 811 (reference numeral 843 in FIG. 28) can be made greater by providing the second valve 825 and the third valve 826. In other words, the compressed air of the predetermined amount can be accumulated in the volume chamber 811 (reference numeral 843 in FIG. 28) in a short time.

With the other configuration described above (see FIG. 28), substantially the same length of time (for example, 30 seconds) as the time (for example, 30 seconds) during which the air feeding time adjusting function is activated to switch from the open state to the closed state is required to accumulate the predetermined amount of compressed air. Although the time required for the drying agent regeneration differs variously according to system and is determined by the opening diameter of the hole portion 842 (see FIG. 28) in the other configuration, the time for filling the volume chamber with air (time until the valve is opened) is also determined by the opening diameter of the hole portion 842 in the other configuration. The timing of the drying agent regeneration is thus influenced by the air filling time and therefore the requirement of rapid air filling and flexibility of time setting of the air feeding time adjusting function for the regeneration process cannot be achieved at the same time. For example, if only 15 seconds are available as the time for filling with air, sufficient air filling cannot be performed for activating the air feeding time adjusting function for 30 seconds and the air feeding time adjusting function is activated incompletely for just 15 seconds. The drying agent cannot be regenerated sufficiently in this case.

With the configuration of the present embodiment, the requirement of rapid air filling and flexibility of time setting of the air feeding time adjusting function for the regeneration process is achieved at the same time.

Although in the embodiment described above, the hole portion 828 and the throttle valve 812 are arranged separately, these may be configured together.

Also, although the first valve 822 of the embodiment is a normally closed valve, which is normally in the closed state, attains the open state just for a predetermined time (for example, 30 seconds) by a predetermined operation, and thereafter returns to the closed state, it may be of an opposite configuration. Specifically, it may be of a normally open configuration, which is normally in the open state, attains the closed state just for a predetermined time (for example, 30 seconds) by a predetermined operation, and thereafter returns to the open state. This can be arranged, for example, by forming the first piston 818 in the embodiment so that the third compartment C and the fourth compartment D are in communication and the second compartment B and the fourth compartment D are not in communication.

A valve device (810) having the normally open configuration opens and closes a bypass flow passage (814, 815) bypassing a flow passage of gas between a gas compressor (802) and a gas tank (807) storing the gas supplied from the gas compressor (802). The valve device (810) is characterized by a volume chamber (811) and a first valve (822). The internal pressure of the volume chamber (811) is increased in internal pressure by gas being supplied from at least one of either of the gas compressor (802) and the gas tank (807) and is decreased by the gas flowing out over a predetermined time (for example, 30 seconds) from a hole portion (828) in accompaniment with pressure reduction on the side corresponding to the gas compressor (802). The first valve (822) is in communication with the volume chamber (811), closes the bypass flow passage (814, 815) in accordance with pressure reduction on the side corresponding to the gas compressor (802) in a state where a predetermined pressure is reached at the volume chamber (811), and thereafter opens the bypass flow passage (814, 815) in accordance with reduction of the internal pressure of the volume chamber (811). The first valve (822) is configured to open and close the bypass flow passage (814, 815) by a piston (818) sliding inside a cylinder portion (817) formed independently of the volume chamber (811).

The valve device (810) is further characterized by the following configuration. At least three ring-shaped sealing members (821) are arranged at appropriate intervals in the movement direction of the piston (818) on the outer periphery of the piston (818) to partition the interior of the cylinder portion (817) into at least four portions of first to fourth spaces (first compartment A, second compartment B, third compartment C, and fourth compartment D) in that order in the movement direction of the piston (818). A first opening (814*a*) in communication with the gas compressor side flow passage (814) in the bypass flow passage (814, 815) and a second opening (815*a*) in communication with the gas tank side flow passage (815) in the bypass flow passage (814, 815) are formed at a predetermined interval in the movement direction of the piston (818) in the inner wall of the cylinder portion (817). The first space (A) is a space that is constantly in communication with the volume chamber (811) regardless of the position of the piston (818). The fourth space (D) is a space having the first opening (814*a*) at its inner side regardless of the position of the piston (818). The second space (B) is a closed space. The third space (C) is a space that is constantly put in communication with the fourth space (D) by a communication passage formed inside the piston (818). The piston (818) is urged in the direction of closing the first valve (822) by an urging means (820). The first valve (822) is put in the open state by a state where the second opening (815*a*) is positioned inside the third space (C) being maintained by balancing of the pressure acting on the piston (818) in the first space (A) and the pressure acting on the piston (818) in the fourth space (D) in the state where the gas is supplied from the gas compressor (802). The first valve (822) is put in the closed state, when, due to pressure reduction on the side corresponding to the gas compressor (802), the pressure acting on the piston (818) in the first space (A) overcomes the pressure acting on the piston (818) in the fourth space (D) to move the piston (818) until the second opening (15*a*) is positioned inside the second space (B). The first valve (822) is thereafter put in the open state when, due to reduction of the internal pressure of the volume chamber (811), the pressure acting on the piston (818) in the first space (A) decreases and the piston (818) is returned by the urging force of the urging means (820) until the second opening (815*a*) is positioned inside the third space (C).

Yet further, the compressed air flowing into the volume chamber 811 may be supplied from the compressor 802 or may be supplied from the gas tank 807. Also, the compressed air may also be supplied from both the compressor 802 and the gas tank 807.

The valve device 810 of the present embodiment opens and closes the bypass flow passage (814, 815) bypassing the flow passage of gas between the compressor 802 that is a gas compressor and the gas tank 807 storing the gas supplied from the compressor 802. The valve device 810 is characterized by the volume chamber 811 and the first valve 822. The internal pressure of the volume chamber 811 is increased by gas being supplied from at least one of either of the compressor 802 and the gas tank 807 and is decreased by the gas flowing out over a predetermined time (for example, 30 seconds) from the hole portion 828 in accompaniment with pressure reduction on the side corresponding to the compressor 802. The first valve 822 is in communication with the volume chamber 811, opens the bypass flow passage (814, 815) due to pressure reduction on the side corresponding to the compressor 802 in the state where the predetermined pressure is reached at the volume chamber 811, and thereafter closes the bypass flow passage (814, 815) due to reduction of the internal pressure of the volume chamber 811. The first valve 822 is configured to open and close the bypass flow passage (814, 815) by the first piston 818 sliding inside the first cylinder portion 817, which is a cylinder portion formed independently of the volume chamber 811.

The valve device (810) is further characterized by the following configuration. The O-rings 821 are provided as at least three ring-shaped sealing members at appropriate intervals in the movement direction of the first piston 818 on the outer periphery of the first piston 818 to partition the interior of the first cylinder portion 817 into the at least four portions of the first compartment A, the second compartment B, the third compartment C, and the fourth compartment D, which are the first to fourth spaces in that order in the movement direction of the first piston 818. The first opening 814*a* in communication with the first flow passage 814, which is a flow passage on the side corresponding to the compressor 802 in the bypass flow passage (814, 815), and the second opening 815*a* in communication with the second flow passage 815, which is a flow passage on the side corresponding to the gas tank 807 in the bypass flow passage (814, 815), are formed at the predetermined interval in the movement direction of the first piston 818 in the inner wall of the first cylinder portion 817. The first compartment A, which is the first space, is constantly in communication with the volume chamber 811 regardless of the position of the first piston 818. The fourth compartment D, which is the fourth space, has the first opening 814*a* at its inner side regardless of the position of the first piston 818. The second compartment B, which is the second space, is constantly put in communication with the fourth compartment D by the communication passage formed inside the first piston 818. The third compartment C, which is the third space, is a closed space. The first piston 818 is urged in the direction of closing the first valve 822 by the first spring 820, which is an urging means. The first valve 822 is put in the closed state by the state where the second opening 815*a* is positioned inside the third compartment C being maintained by balancing of the pressure acting on the first piston 818 in the first compartment A and the pressure acting on the first piston 818 in the fourth compartment D in the state where the gas is supplied from the compressor 802. The first valve 822 is put in the open state, when, due to pressure reduction on the side corresponding to the compressor 802, the pressure acting on the first piston 818 in the first compartment A overcomes the pressure acting on the first piston 818 in the fourth compartment D to move the first piston 818 until the second opening 815*a* is positioned inside the second compartment B. The first valve 822 is thereafter put in the closed state when, due to the reduction of the internal pressure of the volume chamber 811, the pressure acting on the first piston 818 in the first compartment A decreases and the first piston 818 is returned by the urging force of the first spring 820 until the second opening 815*a* is positioned inside the third compartment C.

Yet further, the present embodiment is characterized by the second valve 825 for filling the volume chamber 811 with the gas and the third valve 826 for discharging the gas from the volume chamber 811 via the hole portion 828.

Also, the present embodiment is characterized in being configured such that the gas discharged from the volume chamber 811 via the hole portion 828 is discharged to the atmosphere from the atmosphere exhaust outlet 813.

The air dryer (805) of the present embodiment includes the drying portion 805 having the regenerable drying agent 806 and the regeneration valve device 810 connected to one end of the flow passage in the drying portion 805. The air dryer (805) is characterized in that the drying portion 805 is located between i) the compressor 802 and the exhaust valve 803 and ii) the regeneration valve device 810, and the drying agent 806 is dried using the gas in the gas tank 807 that flows in reverse when the exhaust valve 803 is opened and the first valve 822 is in the open state.

Also, the valve device 810 of the present embodiment is characterized by the volume chamber 811, an intake inlet (formed by the third flow passage 816) and an exhaust outlet (formed by the hole portion 828) provided in the volume chamber 811, and a valve (first valve 822) in communication with the volume chamber 811. The first valve 822 opens or closes for a predetermined time in accordance with a change of pressure in the volume chamber 811.

The present embodiment is also characterized by the following configuration. In a compressed air supply system (air processing system 801), the air dryer 805 is located in the supply flow passage between the compressor 802 as a gas compressor and the gas tank 807 storing the gas supplied from the compressor 802. The check valve 808, which allows the flow of gas from the side corresponding to the air dryer 5 to the side corresponding to the gas tank 807, is located in the supply passage between the gas tank 807 and the air dryer 805. An intake inlet (formed by the third flow passage 816) and an exhaust outlet (formed by the hole portion 828) are provided in the volume chamber 811. A valve (the first valve 822) is provided that is in communication with the volume chamber 811 and opens and closes in accordance with the pressure inside the volume chamber 811. The first valve 822 is provided for opening and closing a purge flow passage that puts a point between the gas tank 807 and the check valve 808 and a point between the drying agent of the air dryer 805 and the check valve 808 in communication.

Additional Embodiment 1

Piping connections of a valve device 830 in the air processing system 801 of an additional embodiment and the structure of the valve device 830 will now be described.

Figure 24:
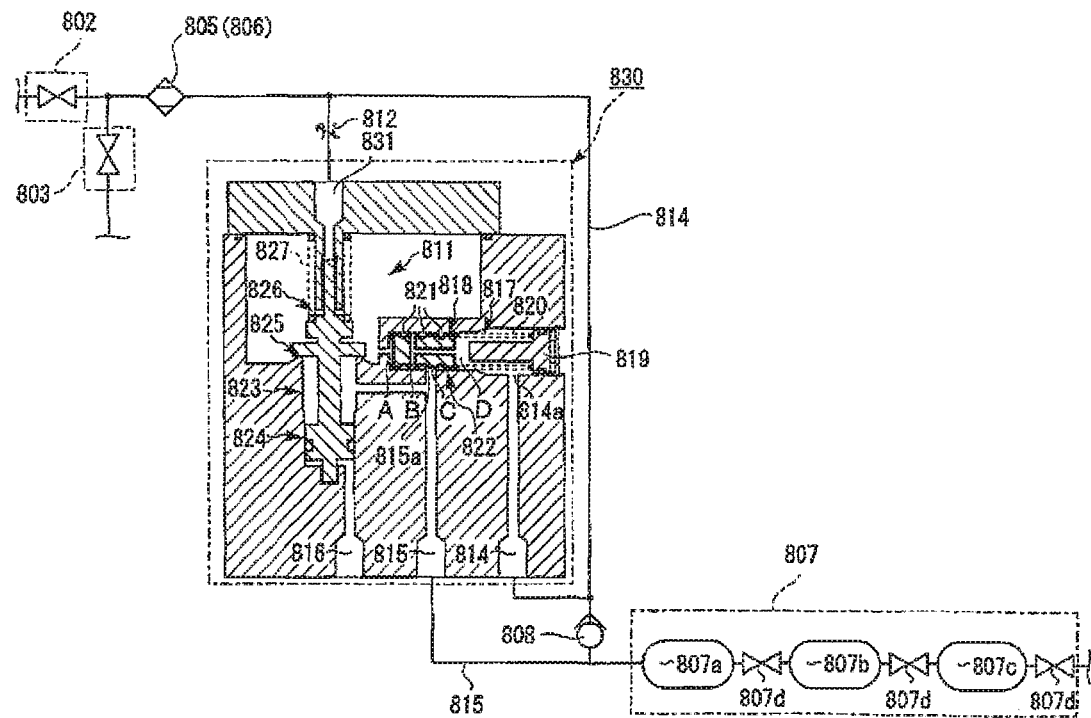
FIG. 24 is a schematic cross-sectional view of a valve device according to an additional embodiment.

FIG. 24 is a schematic cross-sectional view of the valve device 830 according to the additional embodiment.

As shown in FIG. 24, the valve device 830 of the additional embodiment has the volume chamber 811, a hole portion 831, the first cylinder portion 817, the first piston 818, the first flow passage 814, and the second flow passage 815.

For components that are the same as those of the embodiment described above, the same reference numerals will be used and description thereof will be omitted.

There are several points in the valve device 830 of the additional embodiment that differ from the above-described embodiment. Whereas with the above-described embodiment (see FIG. 20 to FIG. 23), the third flow passage 816 is used, this is not used in the additional embodiment.

In the above-described embodiment (see FIG. 20 to FIG. 23), the second piston 824 of the second cylinder portion 823 is moved to switch between opening and closing of the second valve 825 and the third valve 826. In contrast, in the additional embodiment, the second piston 824 is not moved. In the additional embodiment, the second valve 825 stays in the closed state and the third valve 826 stays in the open state. That is, the second valve 825 and the third valve 826 are not used as valves that open and close. These are illustrated for reference to facilitate the understanding of other points of difference.

Yet further, in the above-described embodiment (see FIG. 20 to FIG. 23), the hole portion 828 is connected via the throttle valve 812 to the atmosphere exhaust outlet 813. In the additional embodiment, the hole portion 831 is connected via the throttle valve 812 to the first flow passage 814.

The operation of the valve device 830 in the air processing system 801 of the additional embodiment will now be described in detail.

Figure 25:
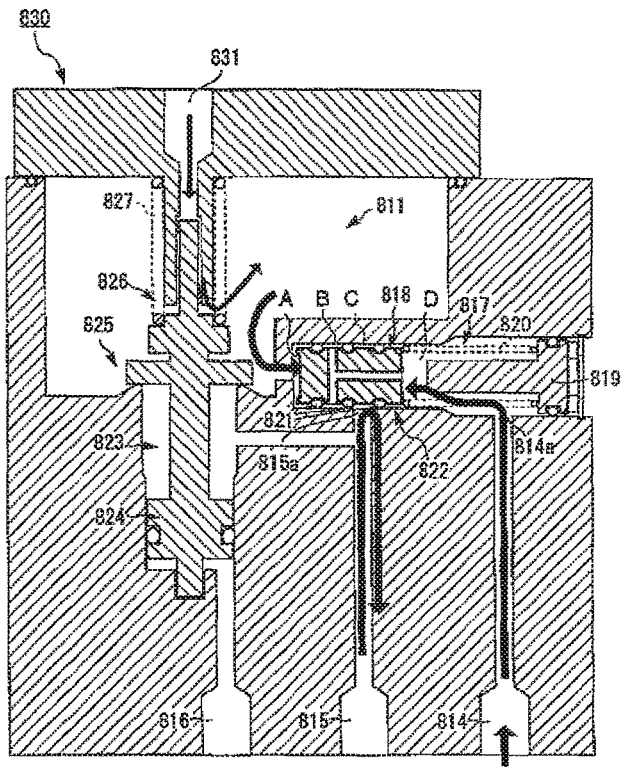
FIG. 25 is a cross-sectional view illustrating an operation of the valve device according to the additional embodiment (start of air inflow)

FIG. 25 is a cross-sectional view illustrating an operation of the valve device 830 according to the additional embodiment at the start of air inflow.

As with the above-described embodiment, when the compressed air from the compressor 802 is delivered in the state where the exhaust valve 803 is closed, the compressed air is dried by the drying portion 805 and is delivered to and stored at the gas tank 807 via the check valve 808.

In this process, the compressed air flows from the first flow passage 814 into the fourth compartment D of the first cylinder portion 817 as shown in FIG. 25.

Although the compressed air also flows from the second flow passage 815 into the third compartment C of the first cylinder portion 817, the first valve 822 is in the closed state. The compressed air that has flowed into the third compartment C thus does not act at all on the first piston 818.

Yet further, the compressed air gradually flows into the volume chamber 811 via the first flow passage 814, the throttle valve 812, and the hole portion 831. The gas pressure in the volume chamber 811 thus increases gradually. The inflow is gradual because the amount of inflow per unit time is adjusted by the throttle valve 812.

In this state, the compressed air flows from the volume chamber 811 into the first compartment A of the first cylinder portion 817. The relationship between the gas pressure in the first compartment A of the first cylinder portion 817 and the gas pressure in the fourth compartment D will now be described. In the process in which the compressed air begins to flow from the hole portion 831 into the volume chamber 811, the gas pressure in the first compartment A is lower than the gas pressure in the fourth compartment D when the inflow begins because the gas pressure in the volume chamber 811 increases gradually. Thereafter, the gas pressure in the volume chamber 811 increases gradually and the gas pressure in the first compartment A becomes equal to the gas pressure in the fourth compartment D. From the beginning, the first piston 818 is positioned on the side corresponding to the first compartment A by the urging force of the first spring 820. Therefore until the gas pressure in the first compartment A increases gradually and becomes equal to the gas pressure in the fourth compartment D, the first piston 818 does not move. That is, the first valve 822 stays in the closed state.

Figure 26:
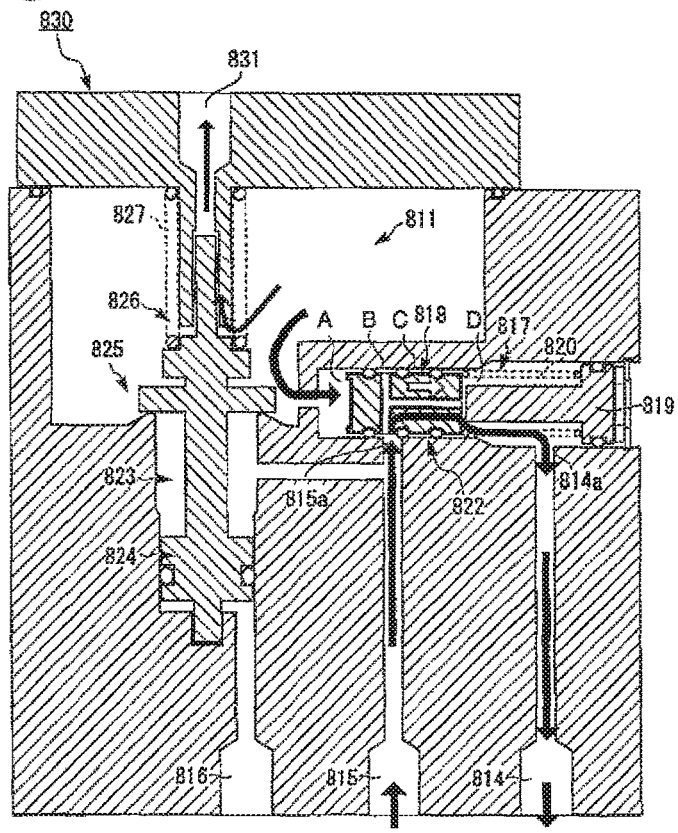
FIG. 26 is a cross-sectional view illustrating an operation of the valve device according to the additional embodiment (immediately after opening)

FIG. 26 is a cross-sectional view illustrating the operation of the valve device 830 according to the additional embodiment immediately after opening.

As with the embodiment described above, when the gas pressure in the gas tank 807 reaches the set predetermined value, the pressure governor (non-illustrated) puts the exhaust valve 803 in the open state. The gas pressure in the first flow passage 814 thus decreases at once. The gas pressure in the fourth compartment D then decreases at once.

On the other hand, although the compressed air in the volume chamber 811 begins to flow out via the hole portion 831, the amount of outflow per unit time is restricted because the outflow occurs via the throttle valve 812. The gas pressure in the volume chamber 811 thus decreases gradually.

Therefore, immediately after the exhaust valve 803 is put in the open state, the gas pressure in the fourth compartment D decreases at once with respect to the gas pressure in the first compartment A of the first cylinder portion 817. That is, the balance is disrupted.

Therefore as shown in FIG. 26, the first piston 818 slides to the fourth compartment D side against the urging force of the first spring 820. The second compartment B and the second flow passage 815 are thereby connected. That is, the first valve 822 is put in the open state.

Consequently, as in the above-described embodiment, the compressed gas stored in the gas tank 807 flows from the second flow passage 815 into first flow passage 814 via the second compartment B of the first cylinder portion 817, the interior of the first piston 818, and the fourth compartment D. Further, the compressed gas flows into the drying portion 805, regenerates the drying agent 806 of the drying portion 805, and is discharged via the exhaust valve 803 and the silencer 804.

Although the compressed air from the gas tank 807 acts to flow from the second flow passage 815 into the second cylinder portion 823, there is no possibility that it will move the second piston 824 in the direction of opening the second valve 825. This is because the first valve 822 is in the open state, the gas pressure in the first flow passage 814 is significantly lower than the gas pressure in the second flow passage 815, and the compressed air from the gas tank 807 actively flows from the second flow passage 815 to the first flow passage 814 via the first cylinder portion 817. Another reason is that the urging force of the second spring 827 is acting. Yet another reason is that the gas pressure in the volume chamber 811 is high.

Figure 27:
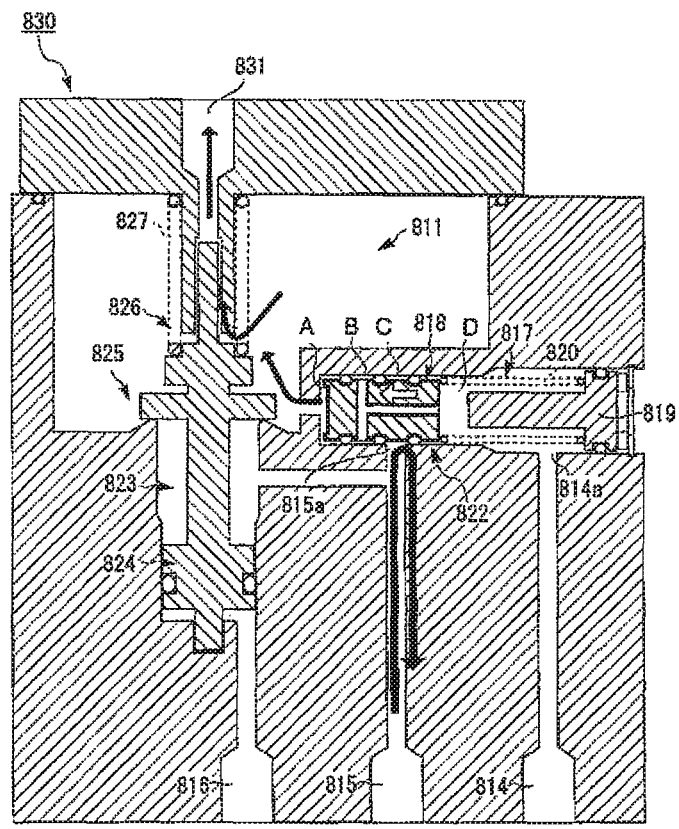
FIG. 27 is a cross-sectional view illustrating an operation of the valve device according to the additional embodiment (during operation of an air feeding time adjusting function)

FIG. 27 is a cross-sectional view illustrating the operation of the valve device 830 according to the additional embodiment during operation of the air feeding time adjusting function.

When, from the state shown in FIG. 26, the compressed air in the volume chamber 811 continues to be discharged from the exhaust valve 803 via the hole portion 831 and the throttle valve 812 as shown in FIG. 27, the air pressure in the volume chamber 811 gradually decreases. The air pressure then becomes equal to the atmospheric pressure.

Therefore, as in the above-described embodiment, the gas pressure in the first compartment A and the gas pressure in the fourth compartment D are balanced. The first piston 818 is then made to slide toward the first compartment A by the comparatively small urging force of the first spring 820. That is, the first valve 822 is put in the closed state.

Consequently, the flow of the compressed air in the gas tank 807 from the second flow passage 815 to the first flow passage 814 via the first cylinder portion 817 is interrupted.

As described above, the valve device 830 of the additional embodiment has the air feeding time adjusting function. That is, when the predetermined time (for example, 30 seconds) elapses from the point at which the exhaust valve 803 is put in the open state and the compressed air begins to flow out from the volume chamber 811 via the hole portion 831, the dry compressed air in the gas tank 807 flows in reverse with respect to the drying portion 805.

Also, the first piston 818, which switches the first valve 822 between the open and closed states, is located in the first cylinder portion 817, which is independent of the volume chamber 811. The first piston 818 can thus be increased in the flexibility of shape and in regard to this point, the same actions and effects as the above-described embodiment are obtained.

Also, the first spring 820, which urges the first piston 818, is configured to slide the first piston 818 with a comparatively small force when the gas pressure in the first compartment A and gas pressure in the fourth compartment D are balanced. The same actions and effects as the above-described embodiment can thus be obtained.

With the additional embodiment, although the second cylinder portion 823, the second piston 824, the second valve 825, and the third valve 826 used in the above-described embodiment are illustrated, these are not used. In regard to the technical idea of reducing the axial deviation, and the like, the third flow passage 816, the second cylinder portion 823, the second piston 824, the second valve 825, and the third valve 826 do not have to be provided.

Additional Embodiment 2

Figure 28:
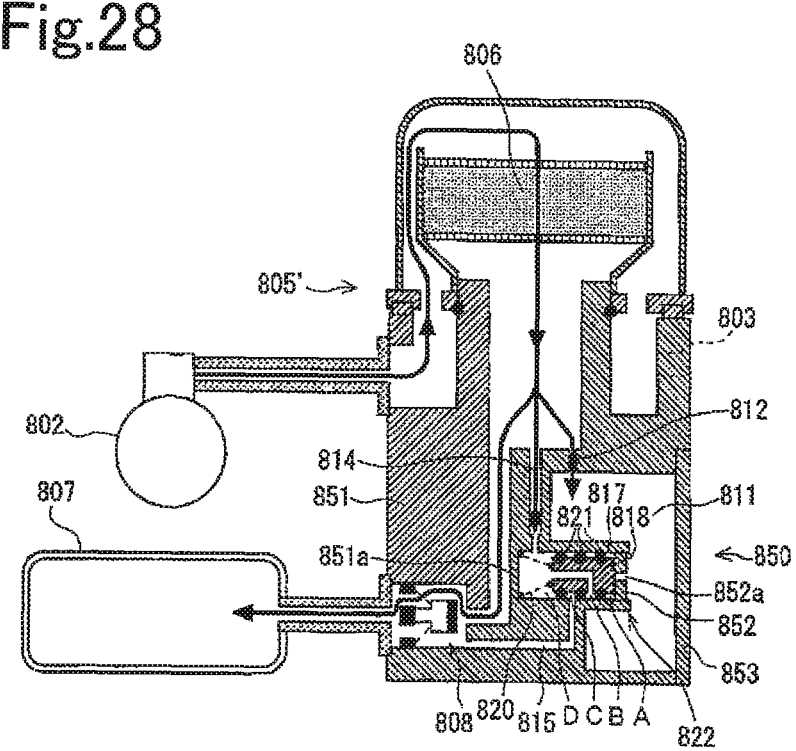
FIG. 28 is a cross-sectional view illustrating an operation of a valve device according to another additional embodiment.
Figure 29:
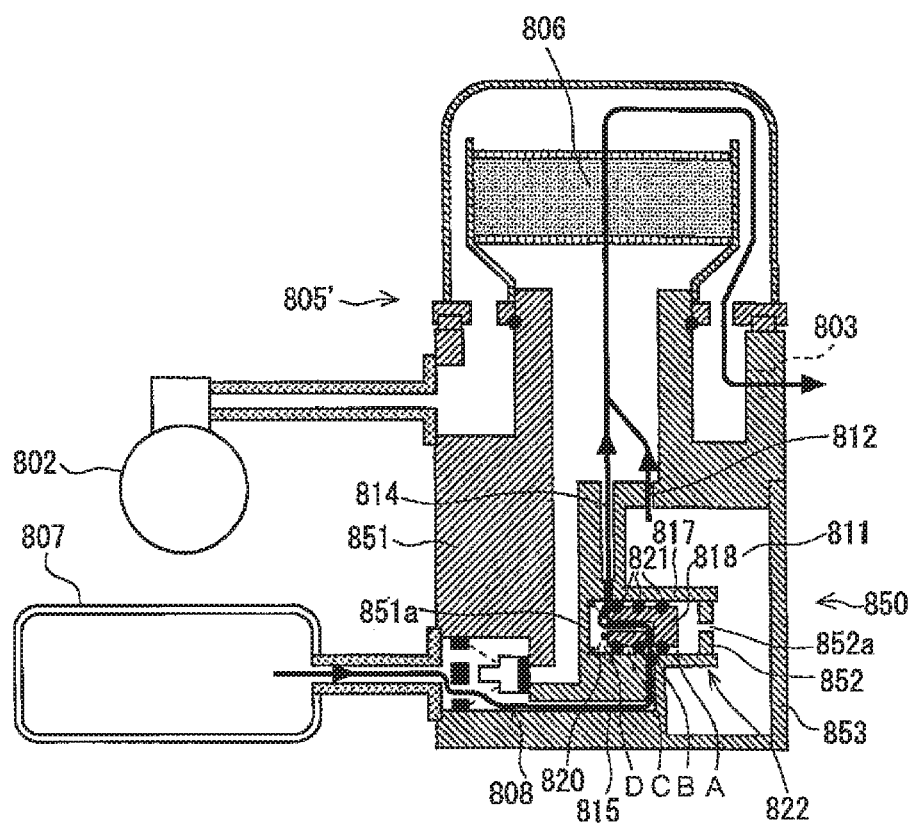
FIG. 29 is a cross-sectional view illustrating an operation of a valve device according to the additional embodiment of FIG. 28.
Figure 30:
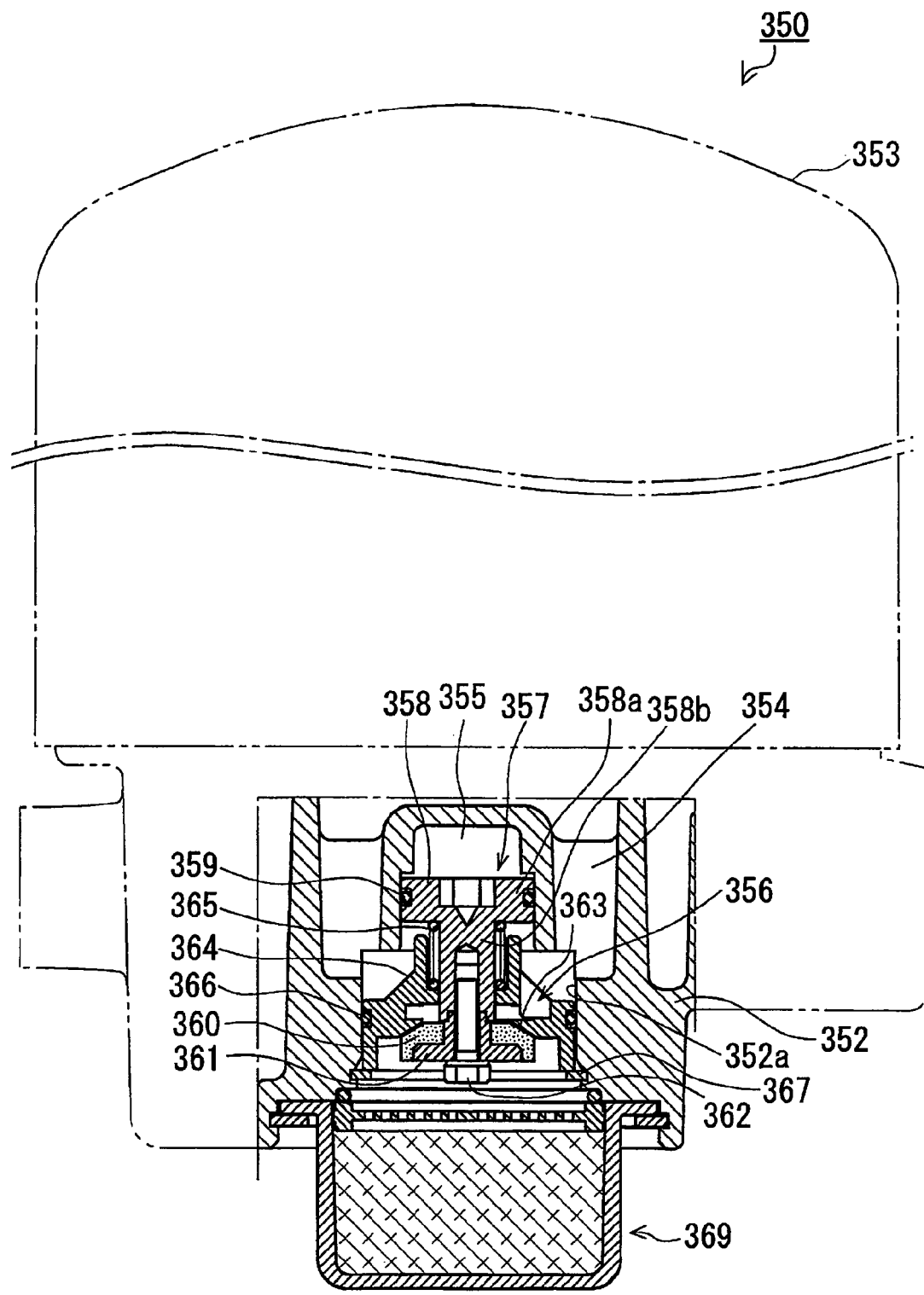
FIG. 30 is a cross-sectional view of an exhaust valve according to a conventional art.
Figure 31:
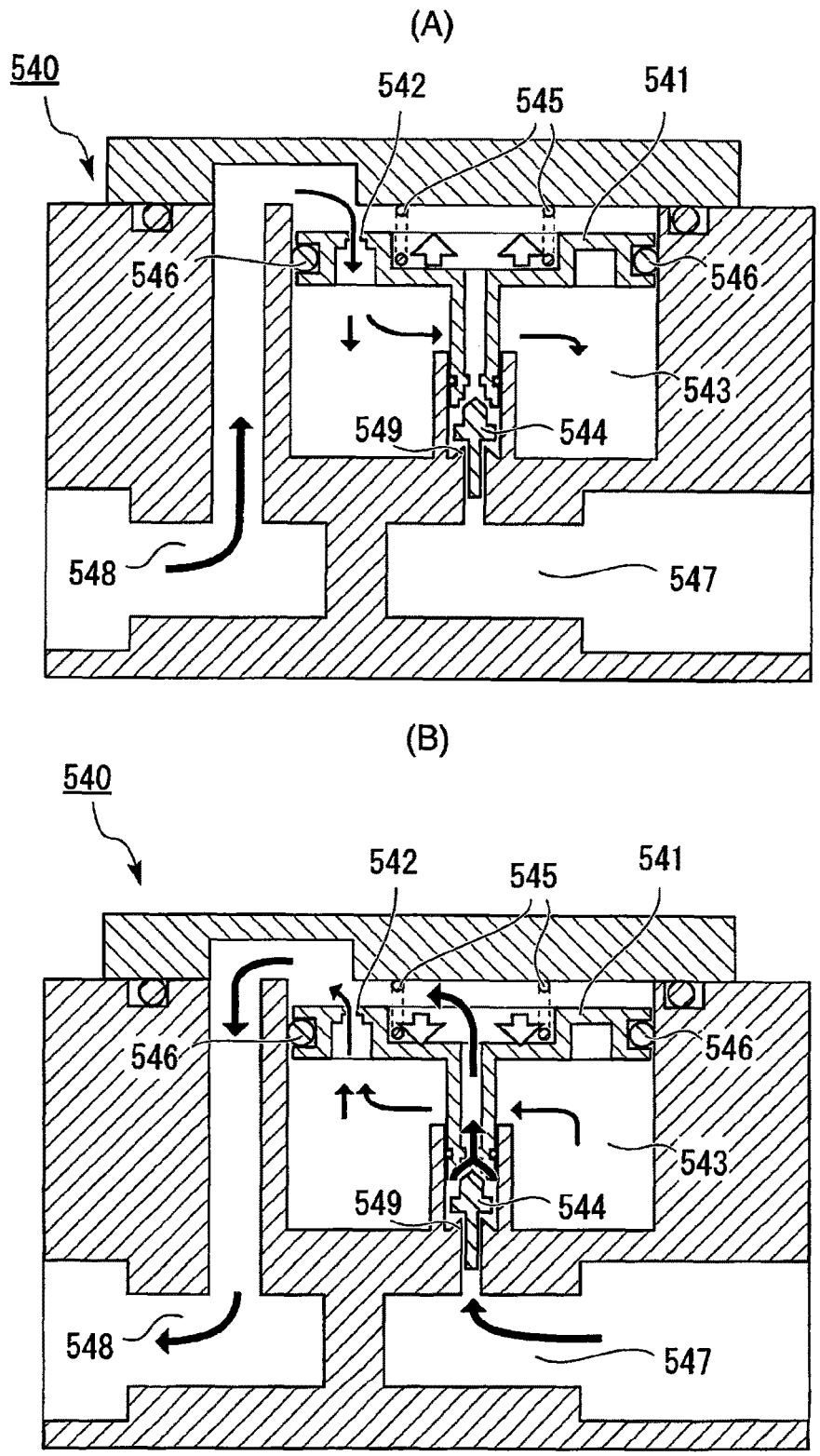
FIG. 31 illustrates a conventional valve device, with (A) and (B) being cross-sectional views thereof.

A valve device 850 according to another additional embodiment will now be described with reference to FIGS. 28 and 29. FIGS. 28 and 29 are cross-sectional views of an air dryer 805' in which the valve device 850 according to the additional embodiment is installed. With the air dryer 805' and the valve device 850 shown in FIGS. 28 and 29, the same configurations as those of the already-described embodiment are provided with the same reference numerals and description thereof will be omitted below.

Unlike the above-described embodiment, with the valve device 850 shown in FIGS. 28 and 29, the stopper member 819 is eliminated and the O-ring provided in the stopper member and fixing ring for mounting the stopper member 819 are also eliminated to achieve reduction of the number of parts and reduction of cost.

To be more specific, reference numeral 51 in FIGS. 28 and 29 denotes a base member that forms a base of the valve device 850 (base of the air dryer 5'), and the volume chamber 811 and the first cylinder portion 817 are formed in the base member 851.

The first piston 818 is housed in the first cylinder portion 817 and a lid member 852 is mounted and fixed thereabove on the opening of the first cylinder portion 817 by a non-illustrated fixing means. An opening portion 852a formed in the lid member 852 puts the first cylinder portion 817 and the volume chamber 811 in communication. The volume chamber 811 is closed by a lid member 853, which is mounted and fixed on the base member 851 by a non-illustrated screw.

With the valve device 850 with the above configuration, when the compressed air is delivered from the compressor 802, the gas tank 807 is filled with the dry-compressed air that has been dry-processed by the drying agent 806 and the volume chamber 811 is filled with the compressed air (arrows in FIG. 28) in the same manner as in the valve device 810 described above.

In this state, the first valve 822 is closed.

Thereafter, when the pressure inside the gas tank 807 reaches a predetermined value and the exhaust valve 803 opens, the first valve 822 opens and the compressed air inside the volume chamber 811 flows to the drying agent 806 via the throttle valve 812 for a predetermined time (arrows in FIG. 29). The first valve 822 is open during this state and the dry air in the gas tank 807 thus flows toward the exhaust valve 803 via the drying agent 806 during this state. The drying process of the drying agent 806 is thereby performed.

The operation of the entirety including the valve device 850 is thus the same as that of the already-described embodiment.

The valve device 850 in the present embodiment is configured such that the base member 851 (bottom portion 851a of the first cylinder portion 817) itself is used in place of the stopper member 819 in the embodiment shown in FIG. 20 and therefore the stopper member 819 and the fixing ring, and the like, for mounting the stopper member 819 is eliminated to achieve reduction of the number of parts and reduction of cost.

The present invention is not restricted to the above-described embodiments, various modifications are possible within the scope of the invention described in the claims, and obviously such modifications are included within the scope of the present invention.

With the present invention, a better silencing effect is obtained in the silencer provided in the air dryer for performing the drying process on compressed air. Yet further, for the second object of obtaining a silencer that does not require a large occupied volume, the silencer 230, which reduces the air discharge noise from the exhaust valve 209 that discharges the drain generated by the drying process in the air dryer 201 for performing the drying process on compressed air, includes the expansion chamber 232, which has the plurality of inner walls 233A to 233C respectively facing the plurality of slits 225A to 225C, which are drain and air discharging outlets, and the noise absorbing material housing chamber 236, which is connected to the expansion chamber 232 and houses the noise absorbing material 237. The air discharged from the plurality of slits 225A to 225C respectively hits the plurality of inner walls 233A to 233C and thereafter passes through the noise absorbing material 237 and are discharged from the micropores 241.

For the third object of achieving simplification of structure and low cost in an exhaust valve provided in an air dryer that performs a drying process on compressed air supplied from an air compressor, the exhaust valve 305 has the valve, in which the piston 307 and the valve element 309 are formed integrally. The valve is provided to be pressed in the valve opening direction by the pressure of the compressed air supplied from the air compressor. The exhaust valve 305 includes the return spring 311 as the urging means that urges the valve in the valve closing direction against the pressure of the compressed air supplied from the air compressor. When the air compressor is in the load state, the valve closed state is maintained by the urging force of the return spring 311 and the valve is opened by receiving the control command pressure from the pressure governor.

For the fourth object of providing a regeneration valve device for an air dryer that takes into consideration the simultaneous achievement of the requirement of rapid air filling and flexibility of time setting of the air feeding time adjusting function for the drying agent regeneration process, the regeneration valve device 510 for an air dryer includes the piston 514, the valve (528, 531), the urging means 526, the hole portion (516), and the auxiliary passage (533). The piston 514 defines in the interior of the chamber 511 the first end space on the side corresponding to the gas tank and the second end space on the side corresponding to the drying portion. The valve (528, 531) is closed by the movement of the piston toward the first end and is opened by the movement of the piston toward the second end. The urging means 526 urges the piston in the direction of closing the valve. The hole portion (516) is formed in the piston and makes the gas flow from one side to another side in accordance with the difference between the pressure of the gas inside the first end space and the pressure of the gas inside the second end space. The auxiliary flow passage (533) has the restricting means (521, 529). The restricting means (521, 529) allows the flow of gas in the direction from the second end space to the first end space and restricts the flow of gas in the direction from the first end space to the second end space.

To achieve the fifth object of providing a compressed air supply device for a vehicle with a simplified configuration, the compressed air supply system 601 is provided, which includes the compressor 604 installed in the vehicle and the air dryer 632. The air dryer 632 removes moisture and other foreign matter contained in the compressed air discharged from the compressor 604. The compressed air supply system 601 supplies the compressed air passed through the air dryer 632 to the brake device of the vehicle. The system 601 further includes the regeneration means for regenerating the drying agent of the air dryer 632 at the predetermined timing and the vehicle speed detector 606 for detecting the vehicle speed of the vehicle. The ECU 602 inhibits the regeneration of the drying agent regardless of the predetermined timing if the detected vehicle speed is slower than the reference speed.

For the sixth object of providing a valve device that takes into consideration the sliding of a piston for performing opening and closing of a valve having an air feeding time adjusting function, the valve device 810 is provided that includes the volume chamber 811 and the first valve 822. The internal pressure of the volume chamber 811 is increased by gas being supplied from at least one of either of the gas compressor (802) and the gas tank 7 and is decreased by the gas flowing out over the predetermined time from the hole portion 828 in accompaniment with pressure reduction on the side corresponding to at the gas compressor The first valve 822 is in communication with the volume chamber, opens the bypass flow passage (814, 815) due to pressure reduction on the side corresponding to the gas compressor in the state where the predetermined pressure is reached at the volume chamber, and thereafter closes the bypass flow passage (814, 815) due to reduction of the internal pressure of the volume chamber. The first valve 822 is configured to open and close the bypass flow passage (814, 815) by the piston (818) sliding inside the cylinder portion (817) formed independently of the volume chamber 11.

DESCRIPTION OF THE REFERENCE NUMERALS

1 Air circuit
5 Protection valve
6~9 Air tank
10, 201, 632 Air dryer
58, 506, 806 Drying agent
211, 308, 520, 546, 821 O-ring
604, 802 Compressor (air compressor)
209, 305, 803 Exhaust valve
231 Silencer case portion
232, 320 Expansion chamber
303 Control chamber
304 Pressure chamber
321 Noise absorbing material housing chamber
504 Silencer
601 Compressed air supply system (compressed air supply device for a vehicle)
602 ECU (regeneration control means, regeneration inhibiting means, forcible regeneration means)
605 Engine

606 Vehicle speed detector (vehicle speed detecting means)
608 Switch
610 Air dryer module
721~723 Pressure sensor

The invention claimed is:

1. A compressed air supply device for a vehicle comprising:
   an air compressor installed in a vehicle; and
   an air dryer configured to remove moisture and other foreign matter contained in compressed air discharged from the air compressor and to supply the compressed air that has passed through the air dryer to a load of the vehicle,
   wherein the compressed air supply device is configured to:
      regenerate a drying agent in the air dryer at a predetermined timing,
      detect a vehicle speed of the vehicle, and
      inhibit regeneration of the drying agent at the predetermined timing if the detected vehicle speed is lower than a predetermined reference speed.

2. The compressed air supply device according to claim 1, further comprising:
   an exhaust valve arranged in the air dryer; and
   a solenoid valve to apply air pressure for control to the exhaust valve via a control line,
   wherein the compressed air supply device is further configured to:
      open the solenoid valve at the predetermined timing to apply the air pressure to the exhaust valve to open the exhaust valve, and
      regenerate the drying agent in the air dryer.

3. The compressed air supply device according to claim 1, further comprising:
   a humidity sensor located downstream of the drying agent,
   wherein the compressed air supply device is further configured to, if the humidity sensor detects a humidity level equal to or greater than a predetermined threshold, regenerate the drying agent even if the regeneration of the drying agent is inhibited.

4. The compressed air supply device according to claim 1, further comprising:
   a humidity sensor located downstream of the drying agent,
   wherein the compressed air supply device is further configured to postpone the regeneration of the drying agent until the inhibition of the regeneration of the drying agent is cancelled.

5. The compressed air supply device according to claim 1, wherein the air dryer further comprises an exhaust valve and a silencer, the silencer comprising:
   an expansion chamber having a plurality of inner walls respectively facing a plurality of slits that are discharge outlets that discharges drain and air from the exhaust valve in the air dryer; and
   a noise absorbing material housing chamber that is connected to the expansion chamber and houses a noise absorbing material.

6. The compressed air supply device according to claim 5, wherein an angle and/or a distance by which the air discharged from a first slit of the plurality of slits hits a first inner wall inside the expansion chamber differs from an angle and/or a distance by which the air discharged from a second slit of the plurality of slits hits a second inner wall inside the expansion chamber.

7. The compressed air supply device according to claim 5, wherein the noise absorbing material is a porous material.

8. The compressed air supply device according to claim 5, wherein a final discharge outlet that discharges the drain and the air exterior to the compressed air supply device opens only vertically downward.

9. The compressed air supply device according to claim 5, wherein the discharge outlets of the exhaust valve at which the slits are formed, the expansion chamber, and the noise absorbing material housing chamber are formed integrally on a base of the air dryer.

10. The compressed air supply device according to claim 5, wherein a distance from a first slit of the plurality of slits to a portion that connects the expansion chamber to the noise absorbing material housing chamber differs from a distance from a second slit of the plurality of slits to the portion that connects the expansion chamber to the noise absorbing material housing chamber.

11. The compressed air supply device according to claim 5, wherein the expansion chamber has a rectangular shape, and the plurality of slits are provided on a cylindrical body in the expansion chamber.

12. The compressed air supply device according to claim 5, wherein a flow passage is provided at a portion that connects the expansion chamber to the noise absorbing material housing chamber, and the discharged air flows the expansion chamber to the noise absorbing material housing chamber via the flow passage.

* * * * *